(12) United States Patent
Watanabe et al.

(10) Patent No.: US 7,747,242 B2
(45) Date of Patent: Jun. 29, 2010

(54) WIRELESS COMMUNICATION SYSTEM, BASE STATION, PACKET CONTROL FUNCTION APPARATUS, NODE APPARATUS AND ACCOUNTING SERVER

(75) Inventors: Koji Watanabe, Kokubunji (JP); Yosuke Takahashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 995 days.

(21) Appl. No.: 11/196,751

(22) Filed: Aug. 4, 2005

(65) Prior Publication Data
US 2006/0159044 A1   Jul. 20, 2006

(30) Foreign Application Priority Data
Jan. 17, 2005 (JP) ............................. 2005-008511

(51) Int. Cl.
*H04M 11/00* (2006.01)
(52) U.S. Cl. ..................... 455/408; 455/405; 455/406; 455/67.11; 455/67.13; 455/561; 709/217; 709/224
(58) Field of Classification Search ......... 455/405–409, 455/67.11, 67.13, 561; 709/217, 224, 236, 709/238, 219, 223, 227, 228, 237
See application file for complete search history.

(56) References Cited

U.S. PATENT DOCUMENTS

| | | | |
|---|---|---|---|
| 6,360,271 B1 * | 3/2002 | Schuster et al. | 709/231 |
| 6,934,751 B2 * | 8/2005 | Jayapalan et al. | 709/224 |
| 6,999,449 B2 * | 2/2006 | Barna et al. | 370/352 |
| 7,113,997 B2 * | 9/2006 | Jayapalan et al. | 709/229 |

FOREIGN PATENT DOCUMENTS

JP   2002-158656   5/2002

OTHER PUBLICATIONS

"Support for End-to End QoS", 3rd Generation Partnership Project 2, 3GPP2, Version 1.0, May 13, 2004 pp. 1-11.
"cdma2000 Wireless IP Network Standard: Quality of Service and Header Reduction", 3rd Generation Partnership Project 2, 3GPP2, vol. 0.4, pp. 1-52.
"cdma2000 Wireless IP Network Standard: Accounting Services and 3GPP2 Radius VSAs", 3rd Generation Partnership Project 2, 3GPP2, vol. 0.4, pp. 1-56.

* cited by examiner

*Primary Examiner*—Tuan A Tran
(74) *Attorney, Agent, or Firm*—Antonelli, Terry, Stout & Kraus, LLP.

(57) ABSTRACT

A communications system which performs accounting according to the actual provided communication quality in a QoS authentication service. A radio system has mobile stations, a radio base station, a packet function control apparatus, a node apparatus and an accounting server, performs user accounting according to an actual communication quality. At least one of the wireless base station, packet control function apparatus and node apparatus has a memory unit which stores a granted communication quality, the communication quality which can be provided and accounting data. Further, at least one of the wireless base station, packet control function apparatus and node apparatus has a control unit which measures the communication quality, and transmits a message when the present accounting differs from the accounting for the measured communication quality, and the accounting server has a control unit which performs accounting using the measured communication quality.

20 Claims, 34 Drawing Sheets

FIG.8

| QoS LEVEL | RAN QoS PARAMETER | IP QoS PARAMETER | ACCOUNTING GRADE |
|---|---|---|---|
| L0 | RAN_PEAK_RATE_L0<br>RAN_AVE_RATE_L0<br>RAN_MAX_LATENCY_L0<br>RAN_MAX_LOSS_RATE_L0<br>RAN_PRIORITY_L0 | IP_PEAK_RATE_L0<br>IP_AVE_RATE_L0<br>IP_MAX_LATENCY_L0<br>IP_MAX_LOSS_RATE_L0<br>IP_PRIORITY_L0 | GRADE 0 |
| L1 | RAN_PEAK_RATE_L1<br>RAN_AVE_RATE_L1<br>RAN_MAX_LATENCY_L1<br>RAN_MAX_LOSS_RATE_L1<br>RAN_PRIORITY_L1 | IP_PEAK_RATE_L1<br>IP_AVE_RATE_L1<br>IP_MAX_LATENCY_L1<br>IP_MAX_LOSS_RATE_L1<br>IP_PRIORITY_L1 | GRADE 1 |
| L2 | RAN_PEAK_RATE_L2<br>RAN_AVE_RATE_L2<br>RAN_MAX_LATENCY_L2<br>RAN_MAX_LOSS_RATE_L2<br>RAN_PRIORITY_L2 | IP_PEAK_RATE_L2<br>IP_AVE_RATE_L2<br>IP_MAX_LATENCY_L2<br>IP_MAX_LOSS_RATE_L2<br>IP_PRIORITY_L2 | GRADE 2 |

Columns labeled 250, 251, 252, 253.

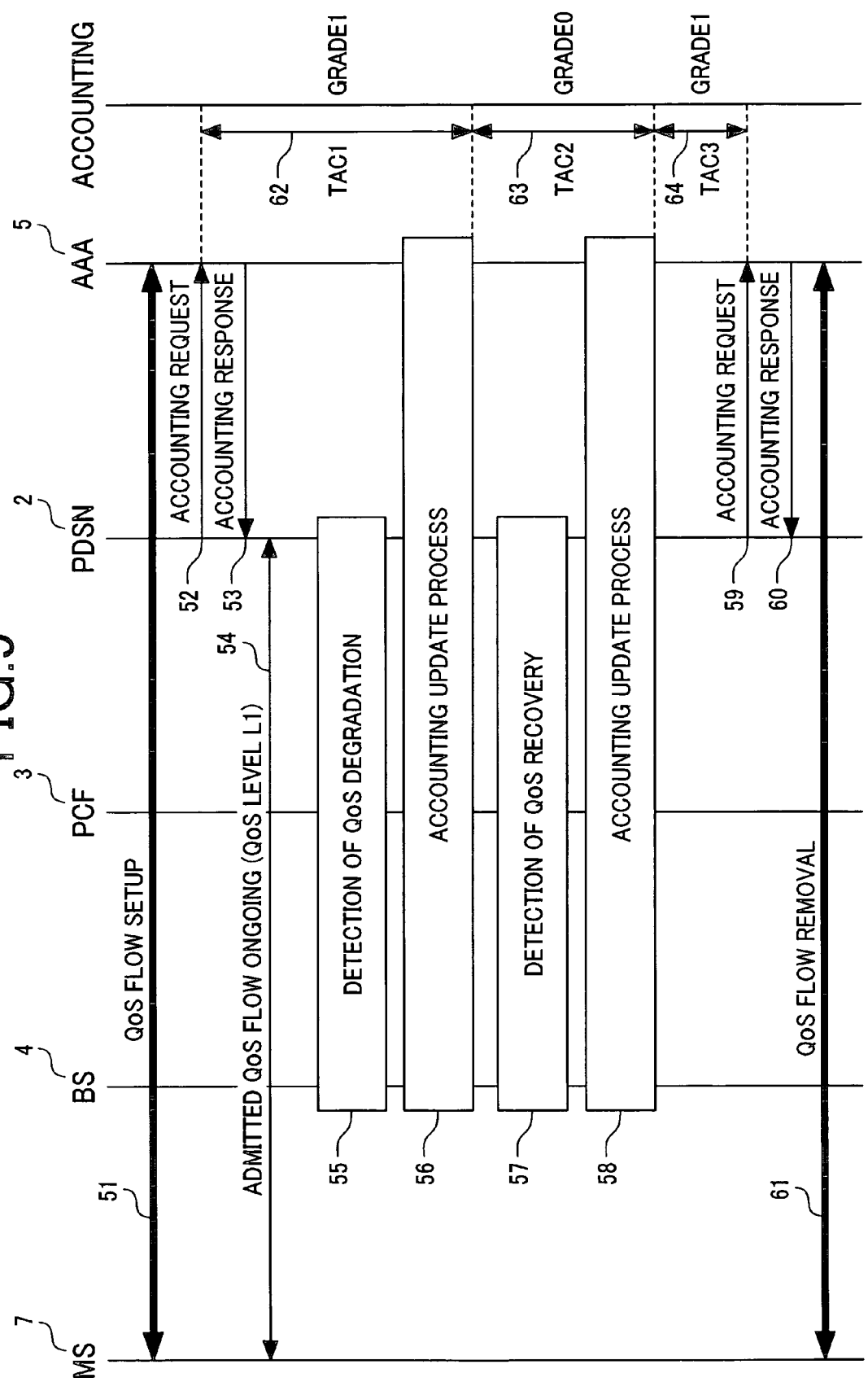

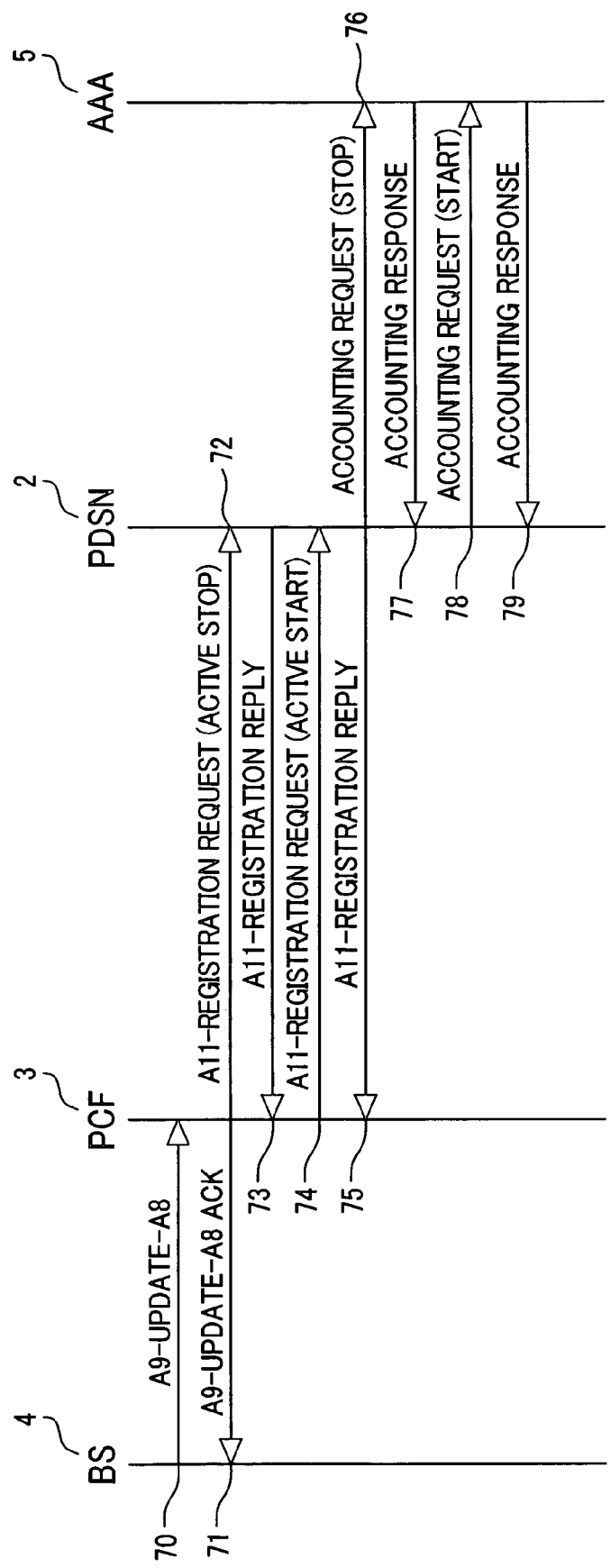

ACCOUNTING REQUEST (76,78)

ACCOUNTING RESPONSE (77,79)

ATTRIBUTES 105, ACCT-STATUS-TYPE 110

ATTRIBUTES 105: STOP

ATTRIBUTES 105: START

3GPP2 RADIUS ATTRIBUTES
(120,121,122,123,124,125,126)

3GPP2 RADIUS ATTRIBUTES 111: UDR

A11-REGISTRATION REQUEST (72,74)

A11-REGISTRATION REPLY (73,75)

APPLICATION DATA 157 :
ACTIVE STOP AIRLINK RECORD

A9-UPDATE-A8 (70)

A9-UPDATE-A8 ACK (71)

PROVIDED RAN QoS 168

PROVIDED IP QoS

FIG. 30

BS,PCF CONTROL TABLE (RAN PROVIDED/GRANTED QoS)

| | | PROVIDED RAN QoS PARAMETERS | | GRANTED RAN QoS PARAMETERS | | GRANTED QoS LEVEL | ACCOUNTING GRADE |
|---|---|---|---|---|---|---|---|
| FLOW ID | SR ID | LENGTH | RAN QoS PARAMETERS | LENGTH | RAN QoS PARAMETERS | | |
| FLOW ID 1 | SR_ID 1 | LENGTH R | RAN QoS PARAMETERS 1 | LENGTH R | RAN QoS PARAMETERS 1' | L0 | GRADE 0 |
| FLOW ID 2 | SR_ID 2 | LENGTH R | RAN QoS PARAMETERS 2 | LENGTH R | RAN QoS PARAMETERS 2' | L1 | GRADE 1 |

RAN_PEAK_RATE
RAN_AVE_RATE
RAN_LATENCY
RAN_LOSS_RATE
RAN_PRIORITY

FIG.31

RAN CONTROL TABLE AT PDSN (PROVIDED/GRANTED RAN QoS)

| | | PROVIDED RAN QoS PARAMETERS | | GRANTED RAN QoS PARAMETERS | | | |
|---|---|---|---|---|---|---|---|
| FLOW ID | SR ID | LENGTH | RAN QoS PARAMETERS | LENGTH | RAN QoS PARAMETERS | GRANTED QoS LEVEL | ACCOUNTING GRADE |
| FLOW ID 1 | SR_ID 1 | LENGTH R | RAN QoS PARAMETERS 1 | LENGTH R | RAN QoS PARAMETERS 1' | L0 | GRADE 0 |
| FLOW ID 2 | SR_ID 2 | LENGTH R | RAN QoS PARAMETERS 2 | LENGTH R | RAN QoS PARAMETERS 2' | L1 | GRADE 1 |

FIG.32

IP CONTROL TABLE AT PDSN (PROVIDED/GRANTED IP QoS)

| FLOW ID | SR ID | PROVIDED IP QoS PARAMETERS | | | GRANTED IP QoS PARAMETERS | | | GRANTED QoS LEVEL | ACCOUNTING GRADE |
|---|---|---|---|---|---|---|---|---|---|
| | | LENGTH | IP QoS PARAMETERS 1 | IP QoS PARAMETERS 2 | LENGTH | IP QoS PARAMETERS 1' | IP QoS PARAMETERS 2' | | |
| FLOW ID 1 | SR_ID 1 | LENGTH I | IP QoS PARAMETERS 1 | | LENGTH I | IP QoS PARAMETERS 1' | | L0 | GRADE 0 |
| FLOW ID 2 | SR_ID 2 | LENGTH I | | IP QoS PARAMETERS 2 | LENGTH I | | IP QoS PARAMETERS 2' | L1 | GRADE 1 |

FIG.33

PDSN,MS CONTROL TABLE (FLOW MAPPING)

| FLOW ID (251) | SR ID (252) | BS ID (253) | MOBILE ID (254) |
|---|---|---|---|
| FLOW ID 1 | SR_ID 1 | BS_ID 1 | MS_ID 1 |
| FLOW ID 2 | SR_ID 2 | BS_ID 1 | MS_ID 1 |

FIG.34

AAA CONTROL TABLE (USER LOG)

| MOBILE ID (255) | SR ID (256) | BS ID (257) | ACTIVE TIME (258) | ACCOUNTING GRADE (259) |
|---|---|---|---|---|
| MS_ID 1 | SR_ID 2 | BS_ID 1 | TAC1 | GRADE 1 |
| MS_ID 1 | SR_ID 2 | BS_ID 1 | TAC2 | GRADE 0 |
| MS_ID 1 | SR_ID 2 | BS_ID 1 | TAC3 | GRADE 1 |

FIG.36

AAA CONTROL TABLE (USER LOG)

| MOBILE ID (255) | SR ID (256) | BS ID (257) | ACTIVE TIME (258) | ACCOUNTING GRADE (259) |
|---|---|---|---|---|
| MS_ID 1 | SR_ID 2 | BS_ID 1 | TAC4 | GRADE 0 |

BS/PCF/PDSN ACCOUNTING-UPDATE-ACK
(302,304,306,308,310,312)

| MESSAGE TYPE | — 326 |
| FLOW ID | — 327 |

330

| CIR | DR |
|---|---|
| CIR1 | DR1 |
| CIR2 | DR2 |
| ... | ... |
| CIRn | DRn |

335

| RRI | DR |
|---|---|
| RRI1 | DR1 |
| RRI2 | DR2 |
| ... | ... |
| RRIn | DRn | ns between the MS is
WIRELESS COMMUNICATION SYSTEM, BASE STATION, PACKET CONTROL FUNCTION APPARATUS, NODE APPARATUS AND ACCOUNTING SERVER

CLAIM OF PRIORITY

The present application claims priority from Japanese application JP 2005-008511, filed on Jan. 17, 2005, the content of which is hereby incorporated by reference into this application.

FIELD OF THE INVENTION

The present invention relates to a wireless communication system which guarantees a communication quality and performs accounting according to an actual communication quality.

BACKGROUND OF THE INVENTION (Patent Document 1)

JP-A 2002-158656 (Patent document 1) mentions a technique for performing accounting according to communication quality. In this example, accounting of data is reported according to the time when an access router obtains the communication quality requested by a terminal to an accounting server. The terminal user is charged based on the communication quality and communication time when data was reported to the accounting server. The document however does not disclose how, after receiving the communication quality requested by the terminal, deterioration of the provided quality due to changes in the transmission path are dealt with. In the document, only QoS (IP QoS) control by three-layer protocols, such as RSVP and MPLS, is considered, and the QoS of a radio link layer is not taken into consideration in the example, either.

(Nonpatent Document 1)

In 3GPP2 (3rd Generation Partnership Project 2), QoS (Quality of Service) control between the end points of a MS (Mobile Station) and a CN (Correspondent Node) ((3GPP2 and S.R0079-0 Version 1.0 (May 2004), p. 4 (Nonpatent document 1)), is discussed. A typical system configuration is shown in FIG. 1 of the appended drawings, wherein the system includes an IP network 1, a PDSN (Packet Data Service Node) 2, a PCF (Packet Control Function) 3, a BS (Base Station) 4, and an authorizing and accounting server 5. Since this server performs Authentication, Authorization, and Accounting, it is referred to by the symbol AAA. There are also a RAN (Radio Access Network) 6, and MS (Mobile Stations) 7 and 8. CN designates a node, which is a communication partner of the MSs 7 and 8.

(Nonpatent Document 2)

In 3GPP2, X.P0011-004-D, v.0.4 (July 2004), p. 4 (Nonpatent document 2), the flow of data from PDSN to MS is described. One example of the flow of data is shown in the appended FIG. 2. n flows 250 are transmitted in PPP sessions 251 and 255 between one PDSN and MS (Point to Point Protocol). Here, a flow is a sequence of IP (Internet Protocol) packets which a certain application transmits and receives, for example. The data between the RAN and PDSN are transmitted and received by a R-P (RAN-PDSN) session 252. The BS and MS communicate through the logical substance of one or more service instances (SI: Service Instance) 254. A SR_ID (Service Reference Identifier) is given to each SI as a unique identifier. The SI and PDSN are connected by a R-P connection 253. The R-P connection 253 of the same MS is transmitted and received in one R-P session 252. Also, in X.P0011-004-D, v.0.4, (July 2004), p. 45, an example of a call flow between the MS, BS/PCF, PDSN and AAA, which has set up a flow of a certain QoS, is shown.

A RSVP (ReSerVation Protocol) based on an IETF (Internet Engineering Task Force) as an end to end QoS control system is known in the art. In RSVP, QoS control for every flow is performed using a group of parameters referred to as flowspec. RSVP is QoS control of the IP layer. In the MS and PDSN, mapping of IP QoS and a wireless link layer QoS is performed by 3GPP2, and QoS control between the MS is performed from the PDSN. The structure of a parameter between the MS referred to as QoS_BLOB is defined from the PDSN, and it controls the communication quality of the radio link layer.

(Nonpatent Document 3)

In 3GPP2, X.P0011-005-D, v.0.4 (July 2004) (Nonpatent document 3), p. 3, Section 3.1, an accounting method, wherein the PDSN generates a UDR (Usage Data Record) and sends it to a server, is disclosed. RAN 6 generates Airlink Records 9 containing the parameter related to the wireless link layer, and sends it to the PDSN2. The PDSN2 combines the parameter and Airlink Records related to the IP layer, generates UDR10 and sends it to the server 5.

Airlink Records are disclosed by 3GPP2, X.P0011-005-D, v.0.4 (July 2004) (Nonpatent document 3), pp. 5-8. In the prior art, a parameter showing the actually provided QoS is not contained in the Airlink Records, and there is no structure which notifies the provided QoS to PDSN2 or the server 5.

UDR is disclosed by 3GPP2, X.P0011-005-D, v.0.4 (July 2004) (Nonpatent document 3), pp. 8-10. Fields referred to as IP QoS (I1), Airlink priority (I4), and Granted QoS Parameter (I5) are specified as parameters expressing the QoS. The method of using I1 is not disclosed. In I4, a priority for every user is specified. In I5, a granted QoS for the flow is specified. In the prior art, there is a parameter showing what is contained in the UDR.

[Patent document] JP-A 2002-158656

[Nonpatent document 1] 3GPP2 and S.R0079-0, Version 1.0 (May 2004), p. 4

[Nonpatent document 2] 3GPP2, X.P0011-004-D, v.0.4 (July 2004), p. 4

[Nonpatent document 3] 3GPP2, X.P0011-005-D, v.0.4 (July 2004), pp. 3, 5-10

SUMMARY OF THE INVENTION

For higher quality communication, accounting of larger sums must naturally be performed. Due to the spread of QoS guarantee services, which were not available in the prior art, it is thought that they are becoming more sensitive to the provided communication QoS. A demand is expected to emerge for functions to authenticate whether the requested quality is granted, and whether suitable accounting has been performed according to the service received.

An operator is requested to report to the user as to whether the requested communication quality has been provided. If the requested communication quality cannot be provided, however, clear accounting which matches the provided quality is required. The task is to provide a communications system which performs accounting according to the actual provided communication quality in the QoS authentication service.

Therefore, it is a particular object of the present invention to provide a safe, reliable accounting method for use when a service that has been determined to be able to provide a given communication quality actually could not be provided. In radio links where the communication path may be unstable, it may not be possible to maintain the communication quality of the service received during the communications service period. If deterioration of the communication quality is detected, QoS negotiation can be performed again by exchanging messages between terminals and the network, and the authenticated QoS level may then be lowered and connection re-established. However, if a terminal temporarily separates from coverage and the transmission path conditions worsen so that communication cannot be performed, message exchange procedures between terminals and the network cannot be performed. Moreover, it is not certain that, each time the communication quality changes, QoS negotiation can be performed, and that the granted level of QoS can be updated. It is therefore a problem to reflect the actually provided quality in accounting when the granted QoS level is fixed.

The radio system of the present invention, which comprises a mobile station (MS), a radio base station (BS), a packet function control apparatus (PCF), a node apparatus (PDSN) and an accounting server (AAA), establishes a connection with a granted communication quality, and it performs accounting for the communications service user corresponding to the communication quality. At least one of the radio base station (BS), packet function control apparatus (PCF) and node apparatus (PDSN) comprises a control unit which measures the communication quality, and the accounting server (AM) comprises a control unit which performs accounting using the measured communication quality.

At least one of the radio base station (BS), packet function control apparatus (PCF) and node apparatus (PDSN) of the present invention comprises a control unit which measures communication quality and computes the time average of the communication quality. The accounting server (AAA) comprises a control unit which performs accounting using the time average of the measured communication quality.

Further, at least one of the wireless base station (BS), packet control function apparatus (PCF) and node apparatus (PDSN) of the present invention comprises a memory unit which stores the granted communication quality the provided communication quality and accounting data, and a control unit which measures the communication quality, and transmits a message when the present accounting differs from the accounting for the measured communication quality. The accounting server (AAA) comprises a control unit which updates the accounting using this message.

The accounting server (AAA) of the present invention is a component element of a radio system which makes a connection having a granted communication quality, and it performs accounting for the communications service user according to the communication quality. The accounting server comprises a means to receive a message including measurement data concerning communication quality, and a control unit which performs accounting using these measurement data.

The accounting server (AAA) of the present invention comprises a means to receive a message containing the time average of the measurement data concerning communication quality, and a control unit which performs accounting using the time average of these measurement data.

The granted communication quality is the communication quality assigned to the relevant flow when the flow is set up. The communication quality which can be provided is the communication quality determined by a contract between a user and a communication provider, and which the communication provider can provide to the user. The accounting server (AAA) controls the communication quality which can be provided, for example, as a profile for every user, and the accounting server (AAA) may send this profile to at least one of the radio base station (BS), the packet function control apparatus (PCF) and the node apparatus (PDSN) when the flow is set up. The actually provided communication quality is the communication quality with which a user was provided as a result of the system performing QoS control based on the granted communication quality. The actually provided communication quality is estimated from a measurement result in the radio base station (BS), packet function control apparatus (PCF) or node apparatus (PDSN).

The radio system of the present invention monitors QoS in a radio access network, collects these data in an accounting server, and performs accounting accordingly. For this reason, safe and reliable accounting, according to the quality with which the user was actually provided, can be performed. For example, even in the case where data loss due to lost packets does not take place in the PDSN, but radio transmission path conditions worsen so that lost packets occur in the BS or PCF, accounting can still be performed appropriately. At this time, for example, accounting may be waived for lost packets, and packet loss in the BS or PCF may be avoided, although accounting was performed using the QoS data of the PDSN. Likewise, for example, when the latency time in the PDSN cannot be controlled in the required time, and congestion occurs in the BS or PCF so that the latency time exceeds the requirement, accounting can be performed appropriately according to communication conditions in the BS or PCF. Likewise, for example, when the data rate (bandwidth) in the PDSN is controlled as required, and congestion occurs in the BS or PCF so that it is less than the required data rate, accounting can be performed appropriately according to the communications conditions in the BS or PCF.

The present invention monitors the actual communication quality, collates these data in an accounting server, and performs accounting accordingly. The network operator can grasp the QoS with which the user was actually provided. The network operator, at the user's request, can disclose and describe this data.

The BS, PCF, PDSN of the present invention comprise a memory unit which stores the granted communication quality, the communication quality which can be provided and accounting data; and, when it is found by measuring the communication quality that the present accounting differs from the measured communication quality, they transmit a message containing this measurement data. It is not necessary for the BS, PCF and PDSN to always transmit measurement data in real time. Compared with the case where measurement data are transmitted in real time, the data amount transmitted by the BS, PCF and PDSN can be suppressed.

The BS, PCF and PDSN of the present invention comprise a control unit which measures the communication quality and computes the time average of the measured communication quality, and the accounting server comprises a control unit which performs accounting using the time average of the measured communication quality. Since the accounting server performs accounting using not an instantaneous value, but the average of the actual communication quality, even when the accounting communication quality fluctuates with time, an accounting suitable for the actual communication quality can be performed with high precision.

In the QoS setup of the flow mentioned in Nonpatent document 2, the MS and the network perform message exchanging via a radio medium. When conditions change, such as when the MS moves to a place where radio waves do not easily reach and it is necessary to update the QoS setting, since radio resources are tight, it may be impossible to perform message exchanging to reset the QoS via the radio medium. Since the radio system of the present invention does not require message exchanging via a radio medium, the measured communication quality can be reflected in the accounting even in such a case. Further, the BS of the present invention computes the communication quality using wireless control data, and reflects it in accounting. The BS can compute the communication quality using control data that is usually used for wireless communications without increasing the data transmitted by the radio medium. Even after radio resources have become tight, it is not necessary to increase the data amount transmitted by the radio medium in order for the BS and the MS to have the communication quality reflected in the accounting.

BRIEF DESCRIPTION OF THE DRAWINGS

FIG. 8 is a table which shows an example of QoS level setting and accounting values according to the present invention FIG. 9 is a process flow diagram which shows an example of an accounting process call flow according to the present invention.

FIG. 10 is a process flow diagram which shows an example of the accounting process call flow according to the present invention.

FIG. 30 is a table which shows an example of a BS and PCF control values according to the present invention.

FIG. 31 is a table which shows an example of a PDSN control values according to the present invention.

FIG. 32 is a table which shows an example of a PDSN control values according to the present invention.

FIG. 33 is a table which shows an example of MS and PDSN control values according to the present invention.

FIG. 34 is a table which shows an example of a AAA control values according to the present invention.

FIG. 36 is a table which shows an example of a AAA control values according to the present invention.

DETAILED DESCRIPTION OF THE PREFERRED EMBODIMENTS

Figure 1:
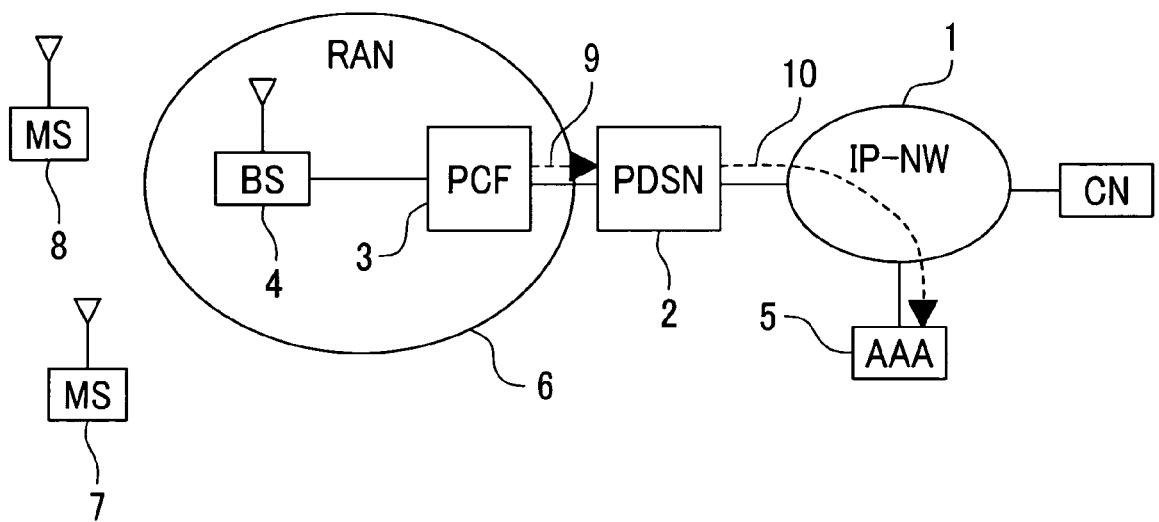
FIG. 1 is a block diagram which shows an example of a prior wireless communication system.
Figure 2:
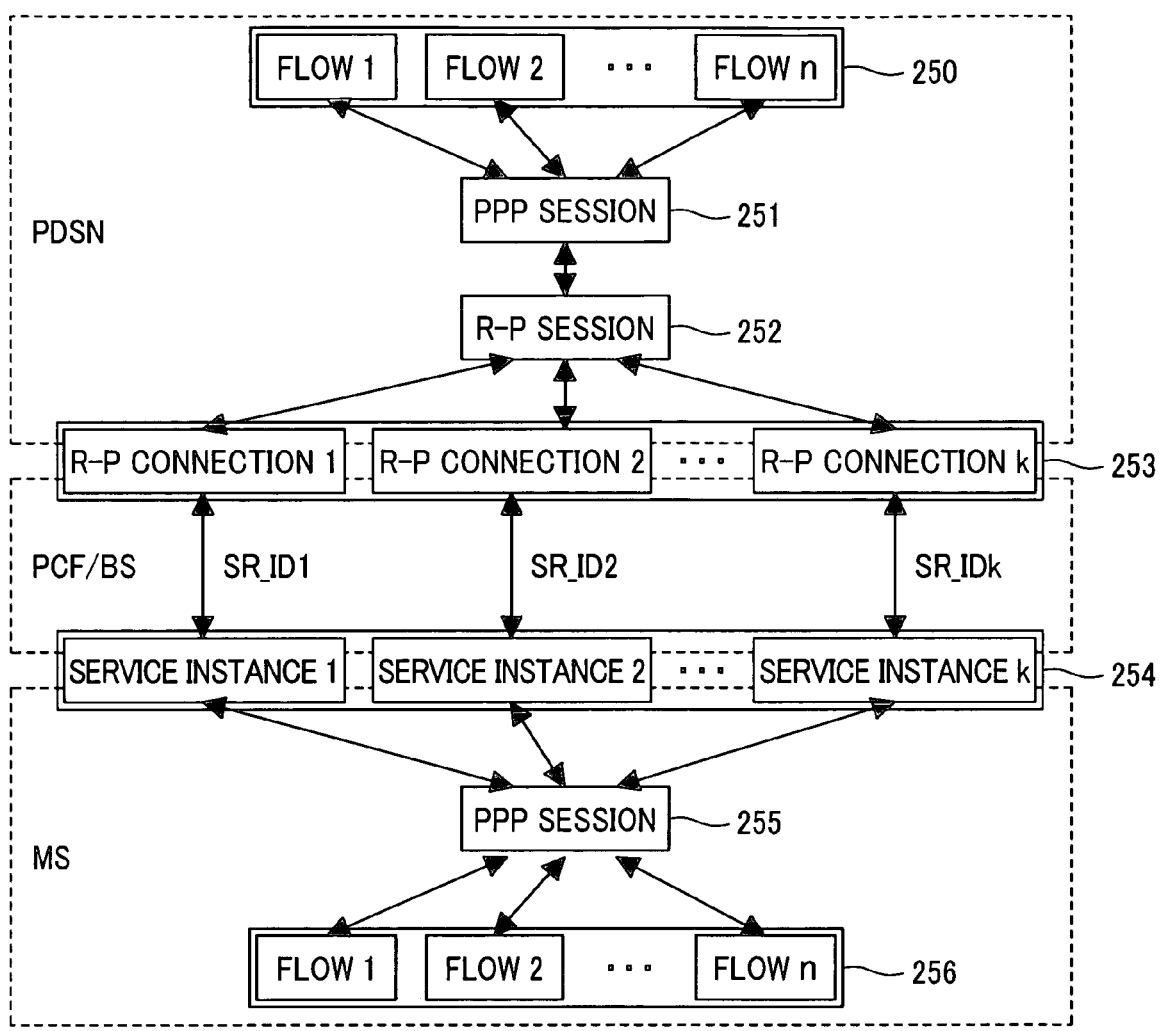
FIG. 2 is a diagram which shows an example of data flow in the prior wireless communication system.
Figure 3:
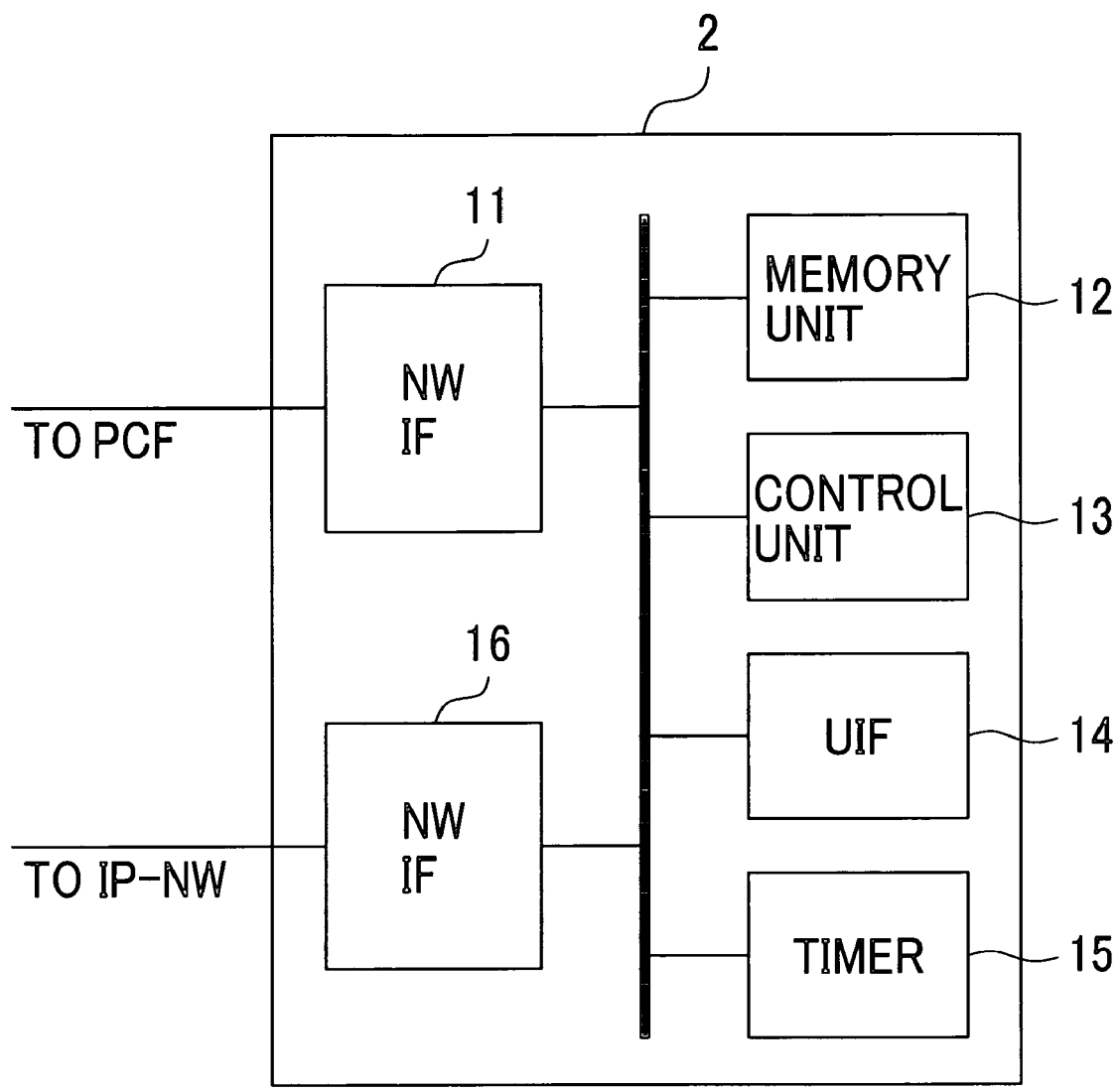
FIG. 3 is a block diagram which shows an example of a PDSN according to the present invention.

An example of the PDSN2 of the present invention is shown in FIG. 3. The PDSN2 receives IP packets from an IP network (IP NW) 1. The PDSN2 creates A10 or A11 packets and transmits them to a PCF3. User data is stored in the A10 packets, and control data is stored in the A11 packets. The PDSN2 receives A10 or A11 packets from the PCF3. The PDSN2 generates IP packets and transmits them to the IP NW1. An example of an interface between the PDSN and PCF (A8/A9 interface) is disclosed in 3GPP2, A.S0016-B, Version 1 (April 2004). A network interface (NW IF) 11 has a network for connecting to the PCF3. The NW IF16 is a network interface for connecting to the IP network 1. A memory unit 12 holds the IP packets, A10/A11 packets and control data which are transmitted and received. A control unit 13 performs control of the data held in the memory unit 12, transmission/reception control of packets, such as assembly, disassembly and loss of A10/A11 packets and IP packets, and measurement of the reception time and latency time of A10 packets. UIF14 is a user interface. A timer 15 is a counter which increases with time.

Figure 4:
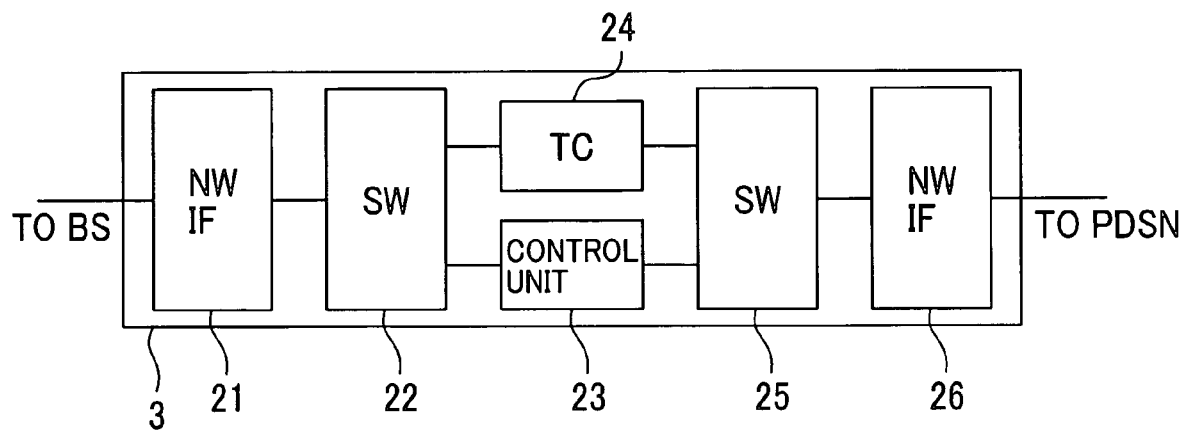
FIG. 4 is a block diagram which shows an example of a PCF according to the present invention.
Figure 5:
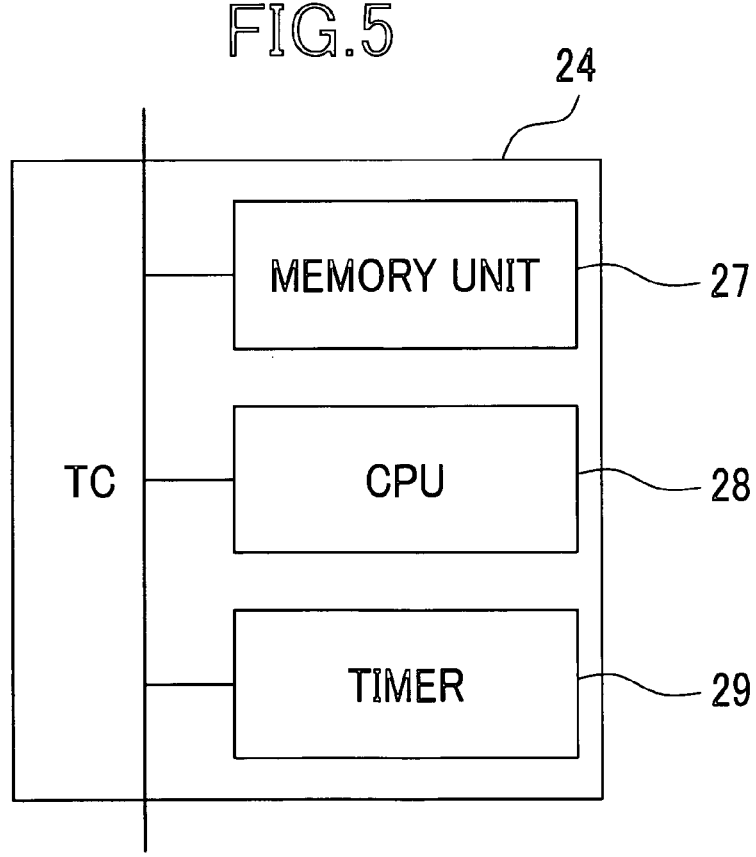
FIG. 5 is a block diagram which shows an example of a traffic control unit according to the present invention.

An example of the PCF3 of the present invention is shown in FIG. 4. The PCF3 receives A10 or A11 packets from the PDSN2. The PCF3 generates A8 or A9 packets and transmits them to the BS4. User data is stored in the A8 packets, and control data is stored in the A9 packets. The PCF3 receives the A8 or A9 packets from the BS4. The PCF3 generates A10 or A11 packets and transmits them to the PDSN2. An example of the interface between the PCF and the BS (A10/A11 interface) is disclosed in 3GPP2, A.S0017-B, Version 1 (April 2004). NW IF21 is a network interface for connecting to the BS4, and the unit 26 is a network interface for connecting to the PDSN2. Also, SW22 and SW25 are switches which exchange signals. A control unit 23 performs overall control of the PCF3. A TC (Traffic Controller) 24 is a traffic control unit which performs assembly, decomposition and transmission/reception of A8 and A10 packets. One example of the TC24 of the present invention is shown in FIG. 5. A memory unit 27 holds the packet data and control data which are transmitted and received. A CPU 28 performs control of the data held in the memory unit 27, carries out packet transmission/reception, such as assembly, disassembly and loss of A8, A9, A10, A11 packets, and performs measurement of the reception time and latency time of A8 packets, A10 packets by means of a timer 29. The timer 29 is a counter which increases with time.

Figure 6:
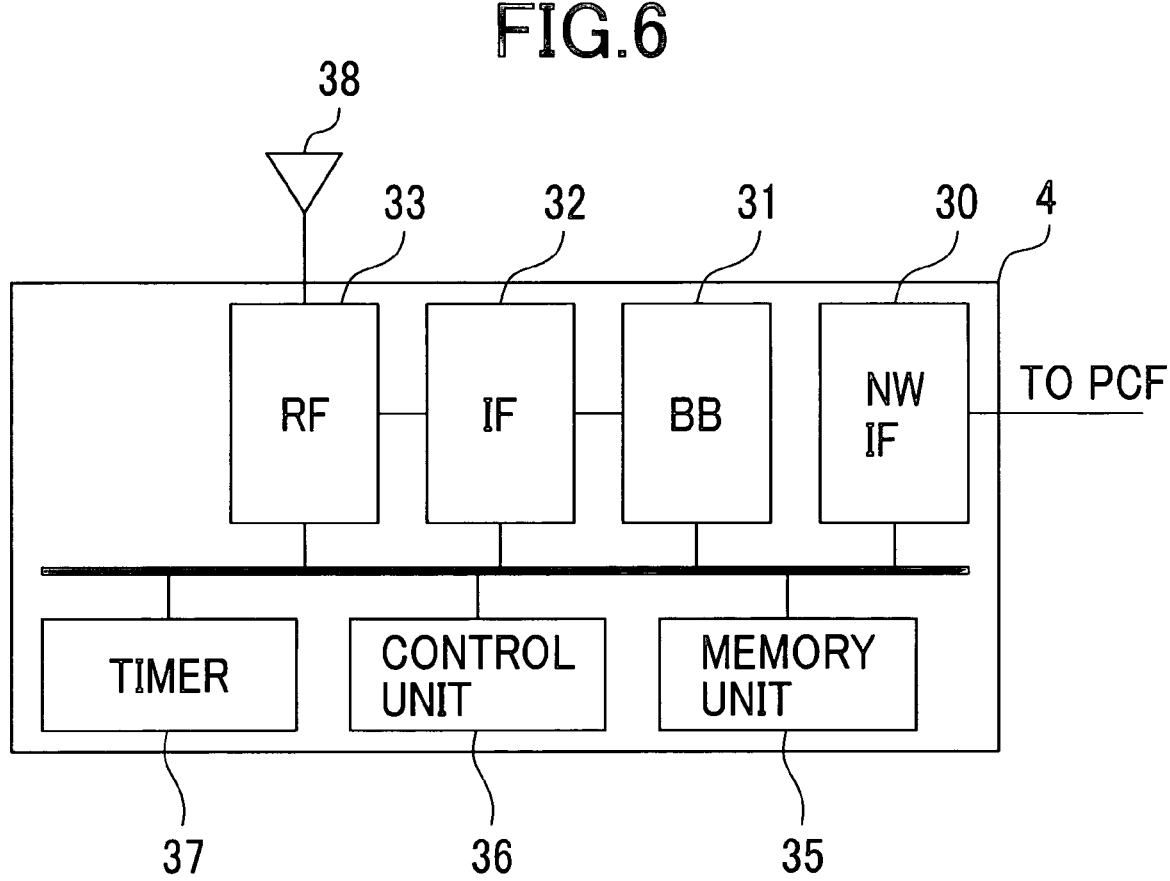
FIG. 6 is a block diagram which shows an example of a BS according to the present invention.

An example of the BS4 of the present invention is shown in FIG. 6. The BS4 transmits and receives A8 or A9 packets to and from the PCF3. The BS4 is a radio base station which acts as an access point of the MS7, MS8 in RAN6. The NW IF30 is an interface with the network for connecting to the PCF3. A BB31 performs baseband processing. The transmitted signal is modulated, and synchronous compensation and recovery of the received signal are performed.

An IF32 performs signal analysis of an intermediate frequency (IF: Intermediate Frequency). The IF32, after DA (Digital to Analog) conversion of the baseband signal inputted from the BB31, converts it to an intermediate frequency and outputs it to the RF33. The IF32 also performs AD (Analog to Digital) conversion of the signal inputted from the RF33, and it outputs it to the BB31. A RF (wireless unit) 33 performs signal analysis of a radio frequency (RF: Radio Frequency). The RF33 up-converts the signal inputted from the IF32 at the radio frequency, and, after amplifying the transmitted electric power, outputs it to an antenna 38. The RF33 down-converts the radio signal inputted from the antenna 38 to an intermediate frequency, and it outputs it to the IF32. The control unit 36 has the function overall control of the BS4. It performs transmission timing control of radio transmission units using a timer 37, and carries out assembly, disassembly and loss of radio transmission units and A8, A9 packets, and performs data control of the memory unit 35. The control unit 36 also performs measurement of the reception time and latency time of A8 packets and radio transmission units by the timer 37. The memory unit 35 holds the data and control data which are transmitted and received. The timer 37 is a counter which increases with time.

Figure 7:
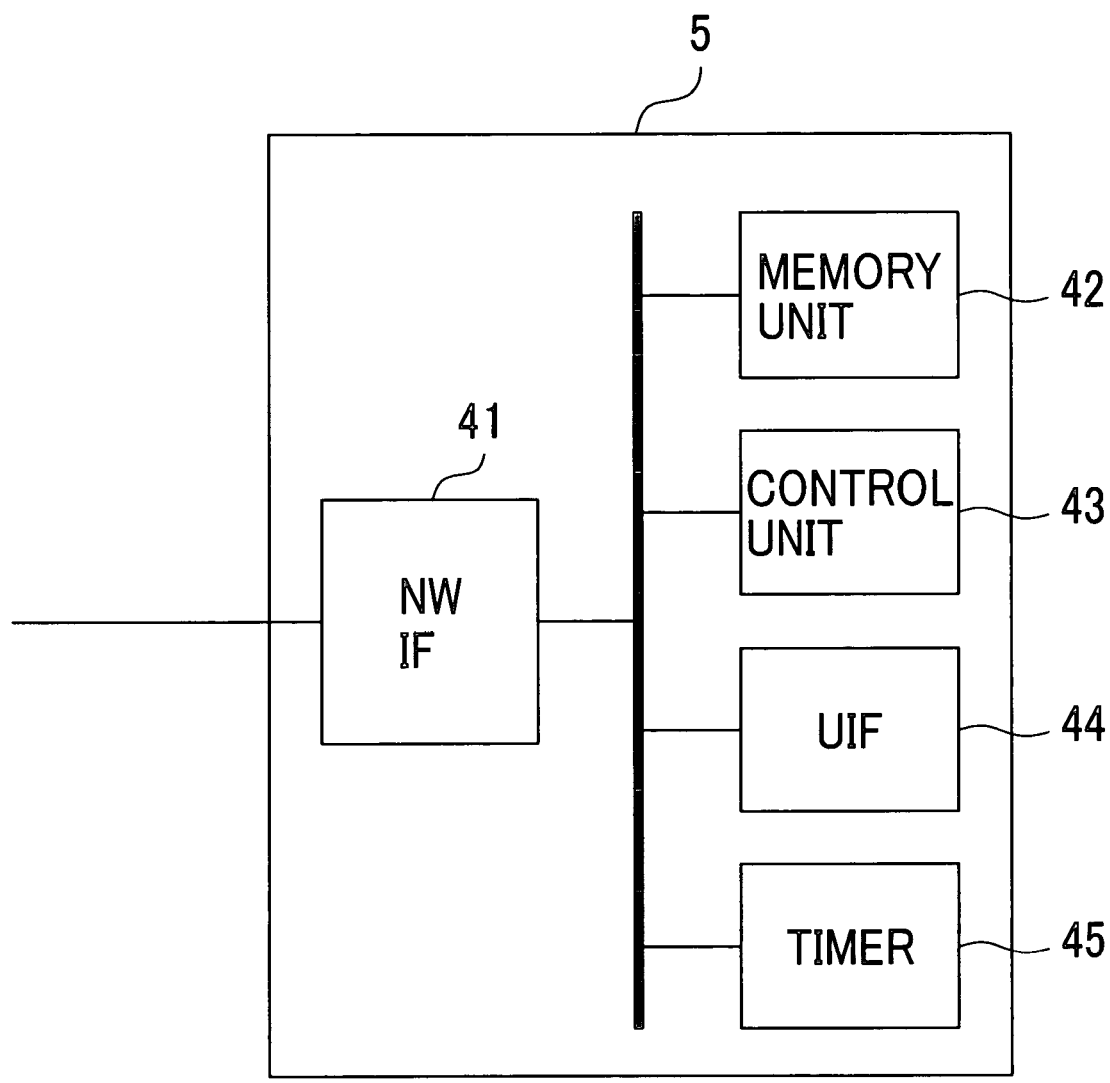
FIG. 7 is a block diagram which shows an example of an AAA according to the present invention.

An example of an AAA5 of the present invention is shown in FIG. 7. The AAA5 is a server which performs authentication and accounting. A protocol referred to as RADIUS (Remote Authentication Dial In User Service) is a known accounting and authentication method. RADIUS is standardized by IETF (Internet Engineering Task Force). A document identified as RFC2139 has been published relating to accounting data transmission protocols. In RFC2139, a transmission protocol for transmitting accounting data between a Network Access Server and an accounting server is described. The AAA5 performs authentication and accounting according to the RADIUS protocol. NW IF14 is a network interface linked to the IP network 1. A memory unit 42 holds the IP packets and control data which are transmitted and received. A control unit 43 performs control of the data held in the memory unit 42, carries out control of IP packet transmission and reception, and performs authentication/accounting using the transmitted and received data. UIF44 is a user interface. A timer 55 is a counter which increases with time. The AAA measures an accounting start time and accounting finish time by use of the timer 55, and it performs accounting according to time.

An example of a QoS level and an accounting setup is shown in the table of FIG. 8. FIG. 8 shows an example of the tables held by the BS, PCF, PDSN, and AAA. The column 250 shows a QoS level and the column 253 shows an accounting grade. Grade 0 accounting is performed on the flow of QoS level L0, Grade 1 accounting is performed on QoS level L1, and Grade 3 accounting is performed on QoS level L3. The QoS level progressively becomes a higher quality in the order QoS level L0, L1, L2, and it progressively become more costly in the order Grades 0, 1, 2, respectively. A minimum communication quality (QoS parameter) that should be granted is specified for every QoS level. A RAN QoS parameter 251 specifies the communication quality of the radio link layer. An IP QoS parameter 252 specifies the communication quality of the IP layer.

A RAN_Peak_Rate_L0 is a peak rate of the radio link layer granted on the QoS level L0. A RAN_Ave_Rate_L0 is an average rate of the radio link layer granted on the QoS level L0. A RAN_Max_Latency_L0 is the maximum latency of the radio link layer granted on the QoS level L0. A RAN_Loss_Rate_L0 is a data loss rate of the radio link layer granted on the QoS level L0. A RAN_Priority_L0 is a peak rate of the radio link layer granted on the QoS level L0. The communication quality of the radio link layer is similarly specified for the QoS levels L1 and L2. The communication quality of the IP layer is similarly specified for every QoS level.

[Example of Flow]

An example of the accounting processing of the present invention is shown in is FIG. 9.

Between the MS7, BS4, PCF3, PDSN2 and AAA5, the flow of QoS parameters required by MS7 is set up by a QoS flow setup 51. The QoS flow setup 51 comprises plural signals, and an exchange procedure follows, for example, the call flow of Annex F, X.P0011-004-D, v0.4. After the signal exchange of the QoS flow setup 51, the MS7, BS4, PCF3 and PDSN2 hold the tables of the QoS parameters required by the MS7 and the granted QoS parameters for each flow. Here, it will be assumed that the MS7 requests a flow of QoS level L1, and that the request was accepted so that a flow of QoS level 1 is set up. The PDSN2 transmits the message for an accounting start request to the AAA5 by a signal 52.

The AAA5 starts the accounting, referring to the QoS parameters contained in 52.

Since the granted QoS level is L1, the AAA5 begins Grade 1 accounting in proportion to the connect time. The AAA5 transmits a response message to the signal 52, to the PDSN2 by means of a signal 53. It will be assumed that the QoS level of the actually provided communications service then falls to L0. In a Step 55, a deterioration of the communication quality is detected in at least one of the BS4, PCF3 and PDSN2. A message containing the QoS parameters actually provided in the Step 56 is sent from the BS4, the PCF3 or the PDSN2 to the AAA5, an accounting update process is performed, and the AAA5 performs Grade 0 accounting in proportion to the connect time for which the actually provided QoS level is L0.

Next, it will be assumed that the QoS level of the actually provided communications service recovers to L1. Then, a recovery of the communication quality, which had deteriorated in at least one of the BS4, PCF3 and PDSN2, is detected in a Step 57. In a Step 58, a message containing the QoS parameters actually provided is sent from the BS4, the PCF3 or the PDSN2 to the AAA5, an accounting update process is performed, and the AAA5 performs Grade 1 accounting in proportion to the connect time. When the application which is run by the MS7 terminates and the PDSN2 detects termination of service, the PDSN2 transmits an accounting termination request message to the AAA5 by means of a signal 59. The AAA5 terminates the accounting, and it transmits a response message corresponding to the signal 59, to the PDSN2 by means of a signal 60. Flow cancellation is performed by a flow cancellation procedure 61. The flow cancellation procedure 61 comprises plural signals, and the exchange procedure follows, for example, the call flow of Annex F, X.P0011-004-D, v0.4.

An example of the accounting update processes 56, 58 of the present invention is shown in FIG. 10. Assume that deterioration or recovery of the actual communication quality was detected by the BS4. The BS4 sends a signal 70, including BS actual communication quality data 175, to the PCF3. The PCF3 sends a response 71 to the signal 70, to the BS4. The PCF3 transmits a signal 72, showing that the QoS parameter was updated, to the PDSN2. The PDSN2 transmits a response 73 to the signal 72 to the PCF3. The PCF3 copies the BS actual communication quality data 175 contained in the signal 70 to 168 of a signal 74. Alternatively, the PCF3 may add the data for the communication quality measured by the PCF3 to the data 175 for the actual communication quality contained in the signal 70, and set it as the RAN actual communication quality data 168 of the signal 74. Here, for example, the PCF3 adds the latency time measured by the PCF3 to the latency time measured by BS contained in the data 175, and sets it as the RAN actual communication quality data 168. The PCF3 may also, for example, apply the data loss rate measured by the PCF3 to the data loss rate measured by BS contained in the BS actual communication quality data 175, and set it as the RAN actual communication quality data 168. The PDSN2 transmits a signal 73, for verifying reception of the signal 72, to the PCF3. The PCF3 transmits the signal 74 to the PDSN2 and transfers the RAN actual communication quality data 168 to the PDSN2. The PDSN2 transmits a signal 75 for verifying reception of the signal 74, to the PCF3. The PDSN2 transmits a message which requests a stopping of the accounting until then to AAA5 by means of a signal 76. The AAA5 transmits a response 77 to the signal 76, to the PDSN2. The PDSN2 copies the RAN actual communication quality data 168 contained in the signal 74, to actual communication quality data 126 of a signal 78.

Alternatively, the PDSN2 may add the data on communication quality measured by the PDSN2 to the RAN actual communication quality data 168 contained in the signal 74 and set it as the actual communication quality data 126 of the signal 78. Here, for example, the PDSN2 adds the latency time measured by the PDSN2 to the latency time contained in the RAN actual communication QoS data 168, and it sets it as the actual communication QoS data 126. The PDSN2 also, for example, applies the data loss rate measured by the PDSN2 to the data loss rate contained in the RAN actual communication quality data 168, and it sets it as 126. The PDSN2 transmits a message which requests accounting according to the QoS parameter after update to the AAA5 by the signal 78. A UDR, which contains data concerning the actual communication quality, is also sent by the signal 78. The AAA5 transmits a response 79 to the signal 78, to the PDSN2. The AAA5 starts accounting based on the signal 78.

Figure 11:
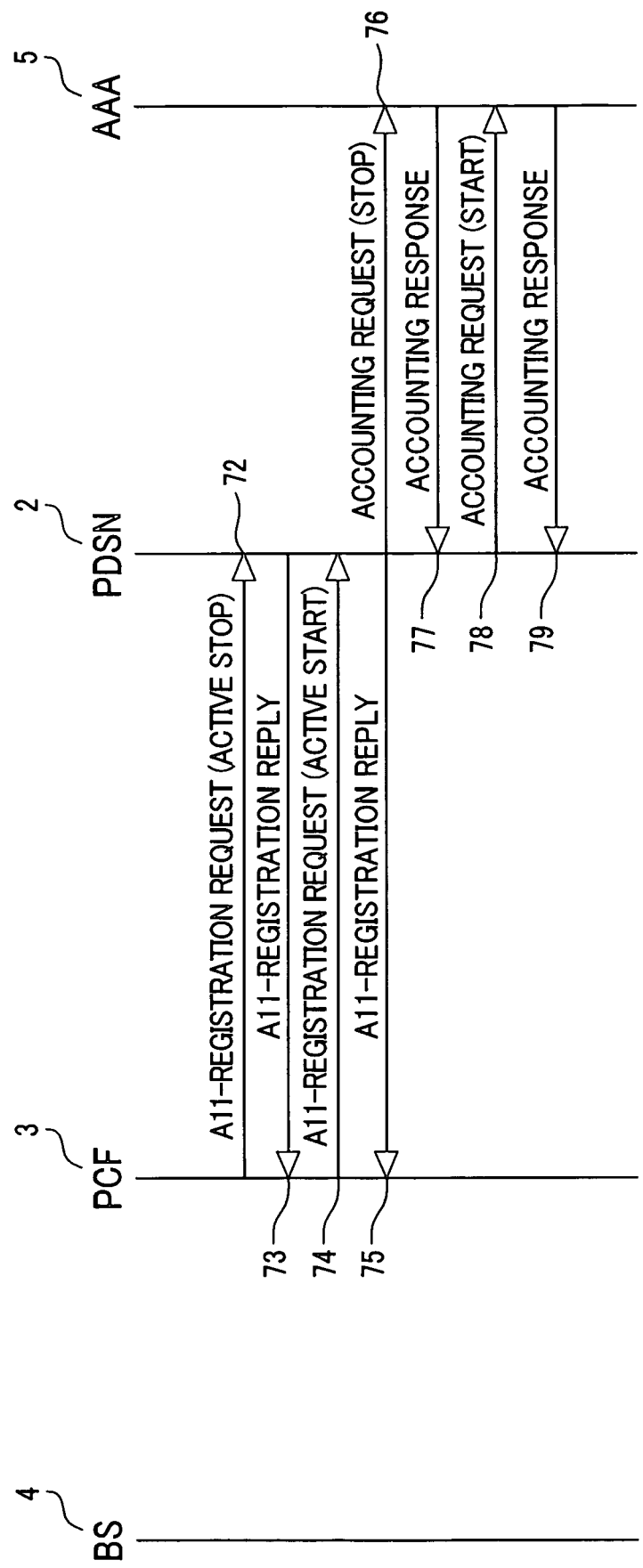
FIG. 11 is a process flow diagram which shows an example of the accounting process call flow according to the present invention.

Another example of the accounting update processes 56, 58 of the present invention is shown in FIG. 11. Assume that deterioration or recovery of the actual communication quality was detected by the PCF3. The PCF3 transmits a signal 72, which shows that the QoS parameter was updated, to the PDSN2. The PDSN2 transmits a response 73 to the signal 72, to the PCF3. The PCF3 transmits a signal 74, containing a QoS parameter of the RAN actual communication quality, to the PDSN2. The PDSN2 transmits a message which requests stop of the accounting until then to the AAA5 by means of a signal 76. The AAA5 transmits a response 77 to the signal 76, to the PDSN2. The PDSN2 transmits a message, which requests accounting according to the QoS parameter after update, to the AAA5 by means of a signal 78. A UDR which contains data on the actual communication quality is also sent by the signal 78. The AAA5 transmits a response 79 to the signal 78, to the PDSN2. The MA5 starts accounting based on the signal 78.

Figure 12:
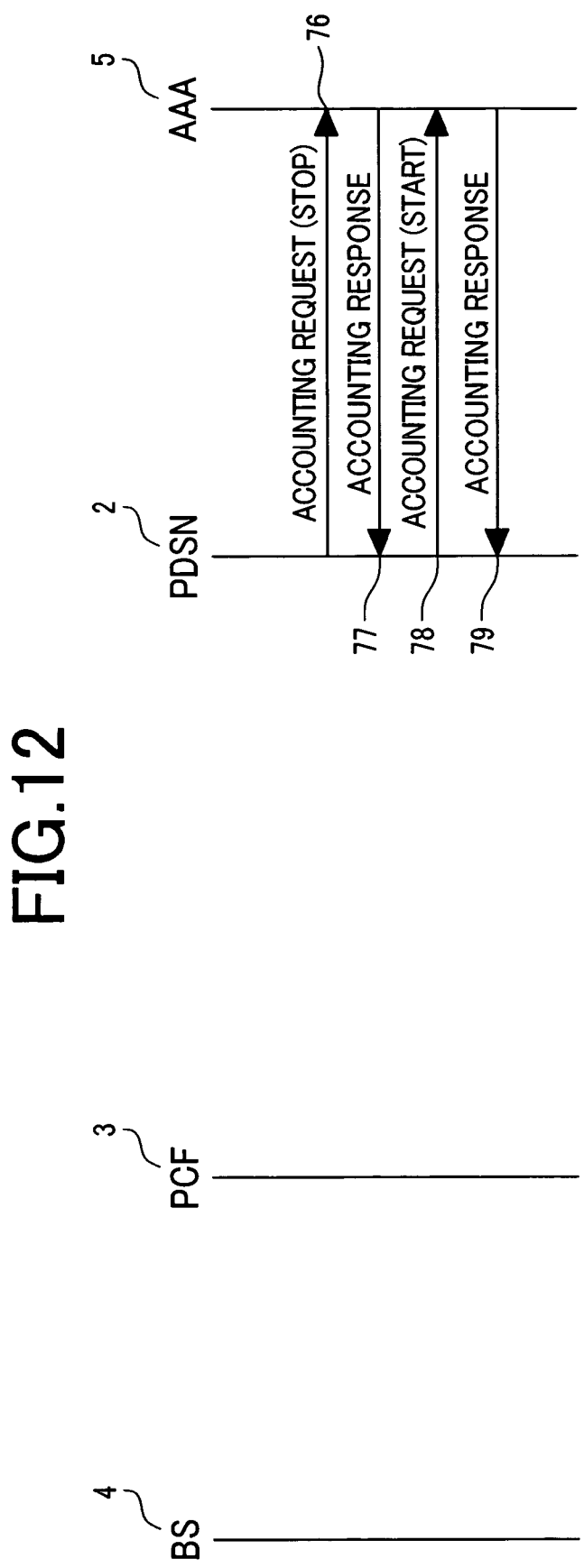
FIG. 12 is a process flow diagram which shows an example of the accounting process call flow according to the present invention.

Another example of the accounting update processes 56, 58 of the present invention is shown in FIG. 12. Assume that deterioration or recovery of actual communication quality was detected by the PDSN2. The PDSN2 transmits a message, which requests the stopping of accounting until then, to the AAA5 by means of a signal 76. The AAA5 transmits a response 77 to the signal 76, to the PDSN2. The PDSN2 transmits a message which requests accounting according to the QoS parameter after update to the AAA5 by means of a signal 78. A UDR, which contains data concerning actual communication quality, is also sent by the signal 78. The AAA5 transmits a response 79 to the signal 78, to the PDSN2. The AAA5 starts accounting based on the signal 78.

The radio system of the present invention performs accounting update according to one of the procedures of FIG. 10, FIG. 11 and FIG. 12. FIG. 10 shows an example of the update process based on the actual communication quality measured by one of the BS4, PCF3 and PDSN2. FIG. 11 shows an example of the update process based on the actual communication quality measured by one of the PCF3 and PDSN2. FIG. 12 shows an example of the update process based on the actual communication quality measured by the PDSN2.

[Example of Message Format]

Figure 24:
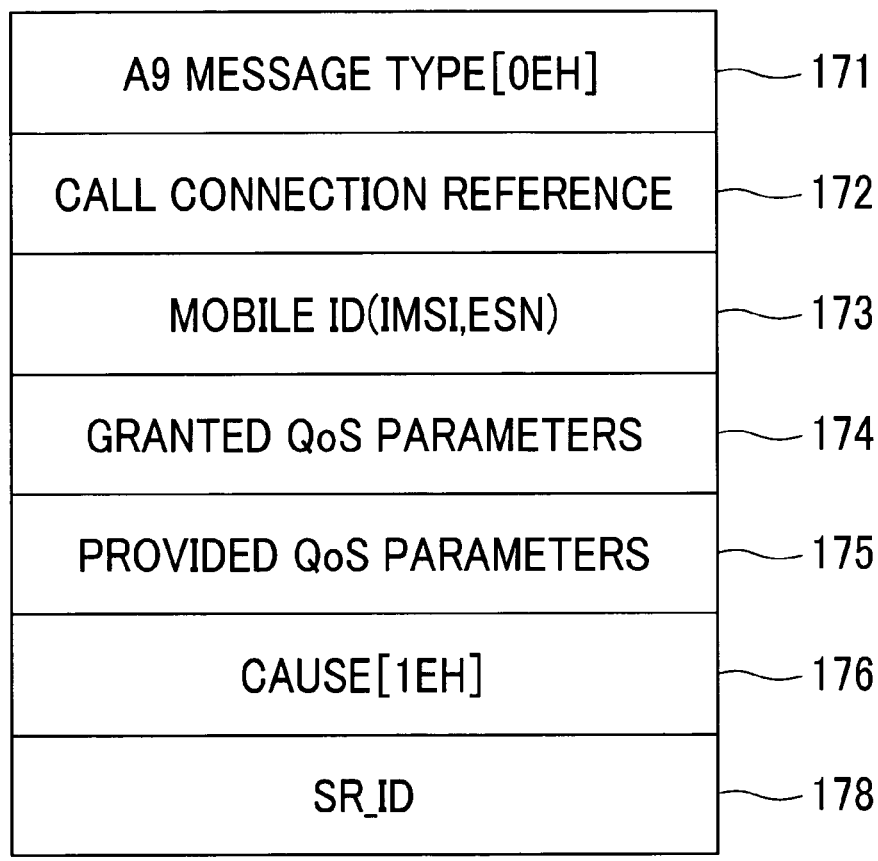
FIG. 24 is a diagram which shows an example of a message format.

An example of a message format of a BS data transmission (A9-Update-A8) signal 70 is shown in FIG. 24. A code expressing the type of message is stored in 171. A call connection identifier is stored in 172. An identifier of the MS7 is stored in 173. A granted QoS parameter is stored in 174, and the measured, actually provided QoS parameter, is stored in 175. A code expressing update of accounting data is stored in 176. An identifier (SR_ID) of the SI is stored in 178. The details of 171, 172, 173, 176, 178 are described in, for example, 3GPP2, A.S0016-B, Version 1 (April 2004).

Figure 25:
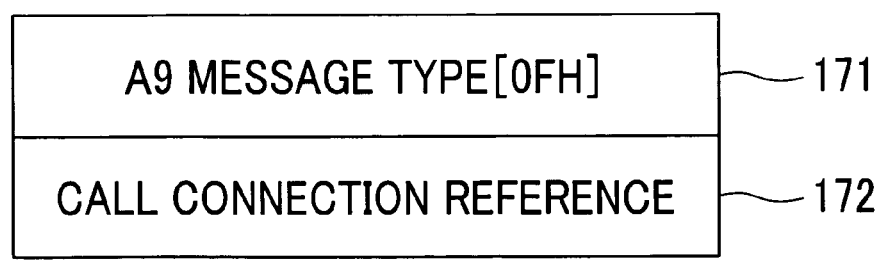
FIG. 25 is a diagram which shows an example of a message format.

An example of a message format of a BS data transmission identification (A9-Update-A8 Ack) signal 71 is shown in FIG. 25. A code which expresses the type of message is stored in 171. A call connection identifier is stored in 172.

Figure 20:
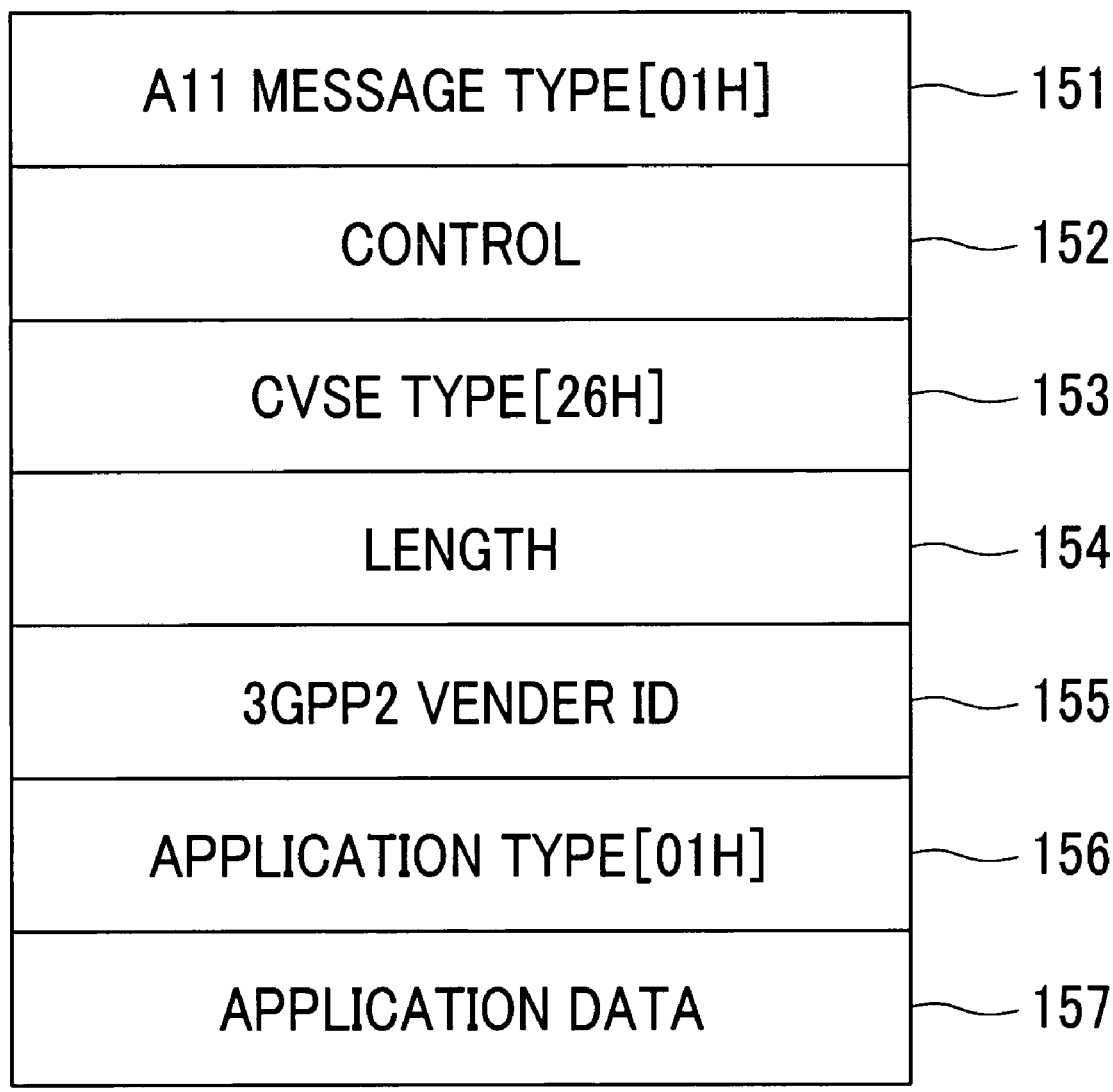
FIG. 20 is a diagram which shows an example of a message format.

An example of the message format of RAN information transmission (A11 Registration Request) signals 72, 74 is shown in FIG. 20. A code expressing the type of message is stored in 151.

Control data is stored in 152. Airlink Records used for accounting are stored in application data 157 of a CVSE (Critical Vender Specific Extension) and are transmitted. A code expressing the type of CVSE is stored in 153. The length of the data 157 is stored in 154. The identifier of a header assigned by an Internet Assigned Number Authority (IANA) is stored in 155. The formats of the application data 157 differ for the signal 72 and signal 74. This message format is described in, for example, 3GPP2, A.S0017-B, Version 1 (April 2004).

Figure 22:
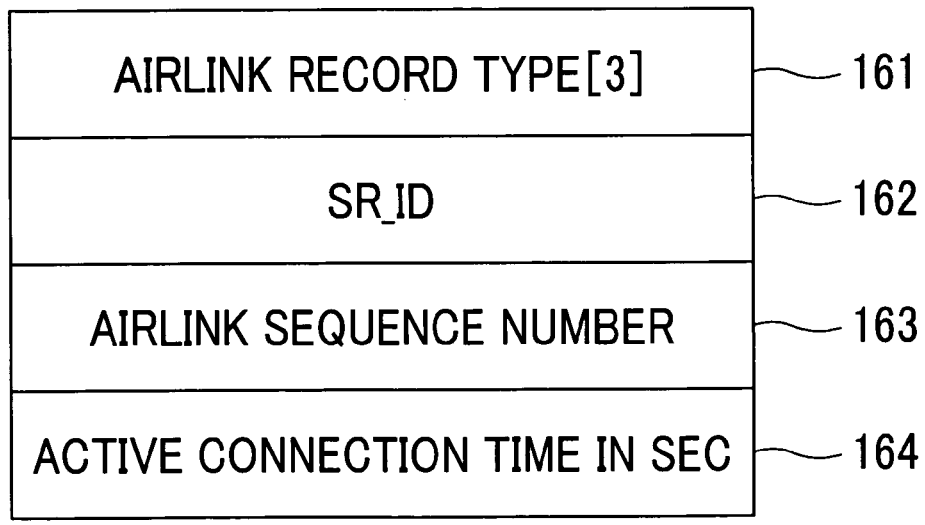
FIG. 22 is a diagram which shows an example of a message format.

The format of an Airlink Record stored in the application data 157 of the RAN data transmission (A11 Registration Request) signal 72 is shown in FIG. 22. A code expressing the type of Airlink Record is stored in 161. A SR_ID corresponding to the R-P connection relating to the Airlink Record is stored in 162. The sequence number of the Airlink Record transmitted for the R-P connection is stored in 163. This sequence number increases whenever the Airlink Record of the same R-P connection is sent. The connect time is stored in second units in 164.

Figure 23:
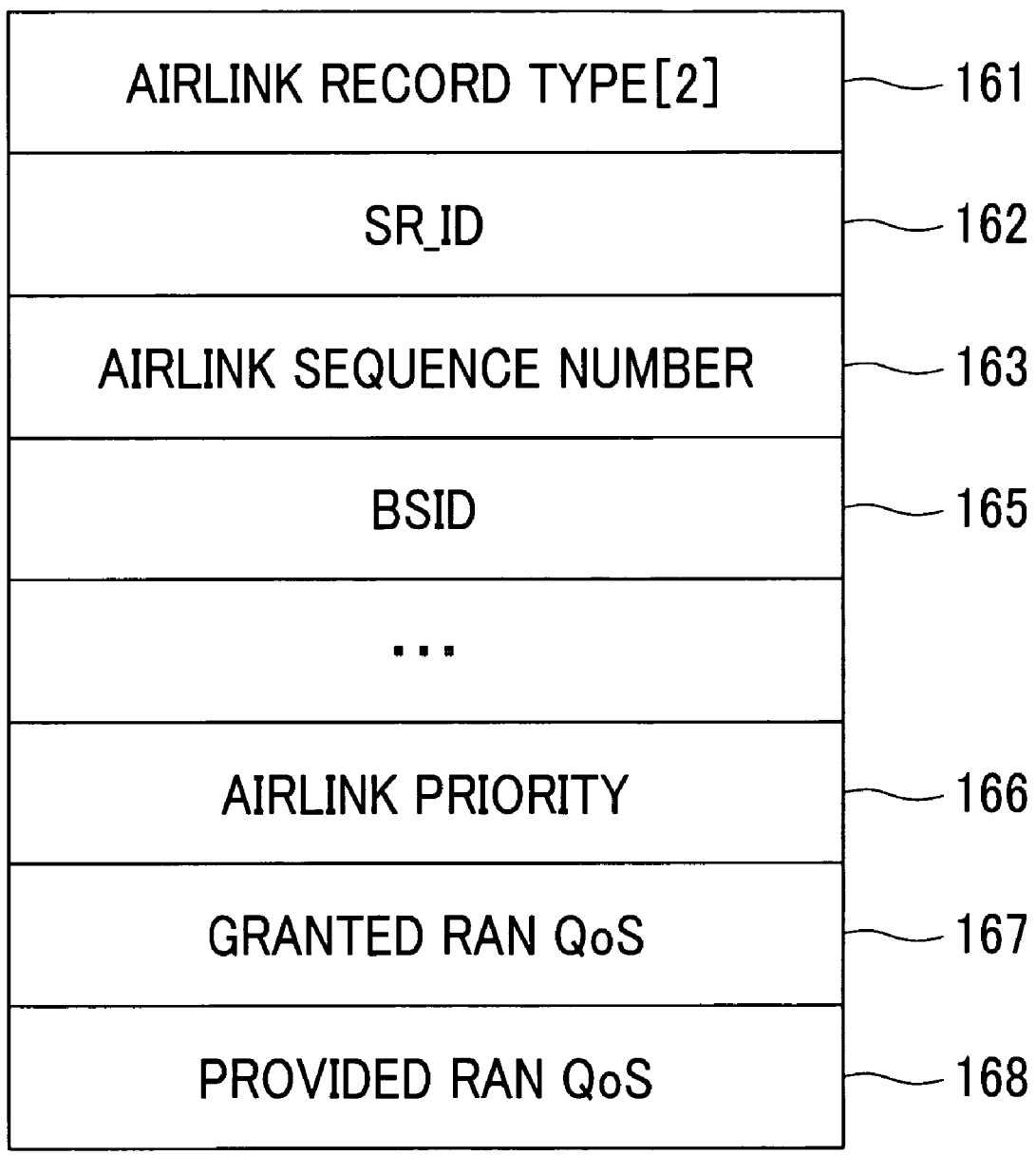
FIG. 23 is a diagram which shows an example of a message format.

The format of the Airlink Record stored in the application data 157 of the RAN information transmission (A11 Registration Request) signal 74 is shown in FIG. 23. A code expressing the type of Airlink Record is stored in 161. A SR_ID corresponding to the R-P connection relating to the Airlink Record is stored in 162. The sequence number of the Airlink relating to the R-P connection is stored in 163. This sequence number increases whenever an Airlink Record of the same R-P connection is sent. An identifier of the BS4 is stored in 165. The priority of the communications service for each user is stored in 166. The granted RAN QoS parameter is stored in 167. The RAN QoS parameter which was actually provided is stored in 168.

Figure 21:
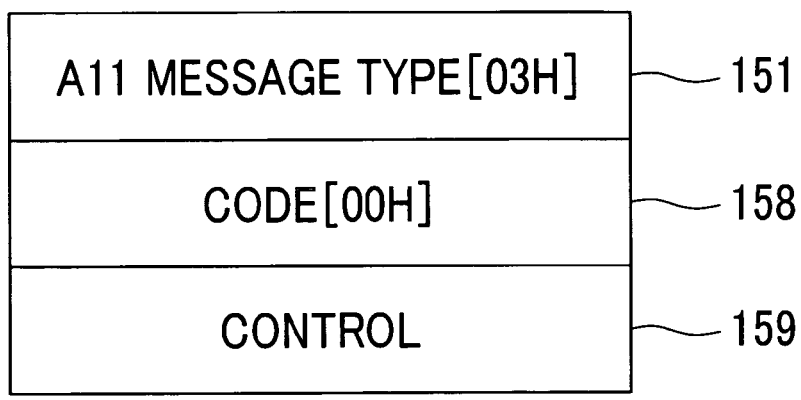
FIG. 21 is a diagram which shows an example of a message format.

An example of the message formats of RAN information transmission identification (A11 Registration Reply) signals 73, 75 is shown in FIG. 21. A code expressing the type of message is stored in 151. A code signifying that the signals 72, 74 were received is stored in 158. Control data is stored in 159. This message format is described in, for example, 3GPP2, A.S0017-B, Version 1 (April 2004).

Figure 13:
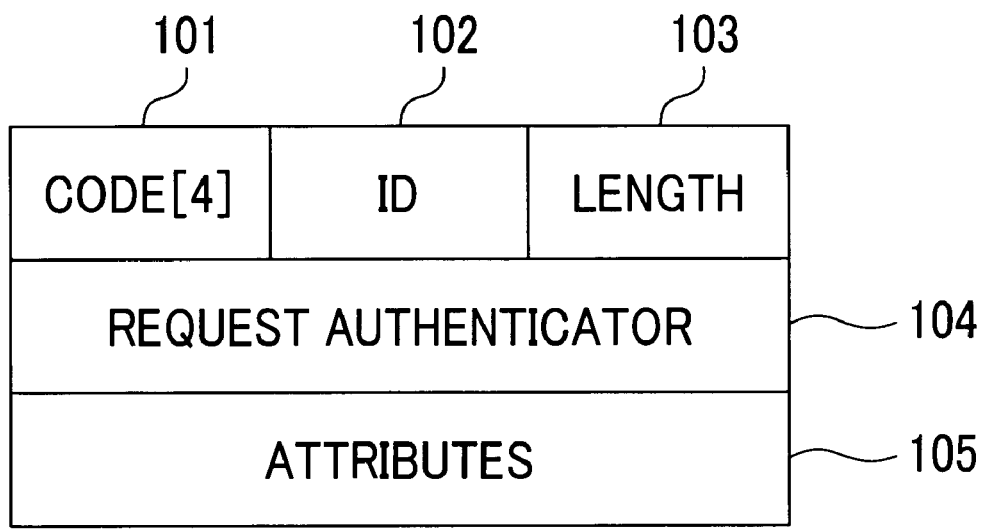
FIG. 13 is a diagram which shows an example of a message format.
Figure 14:
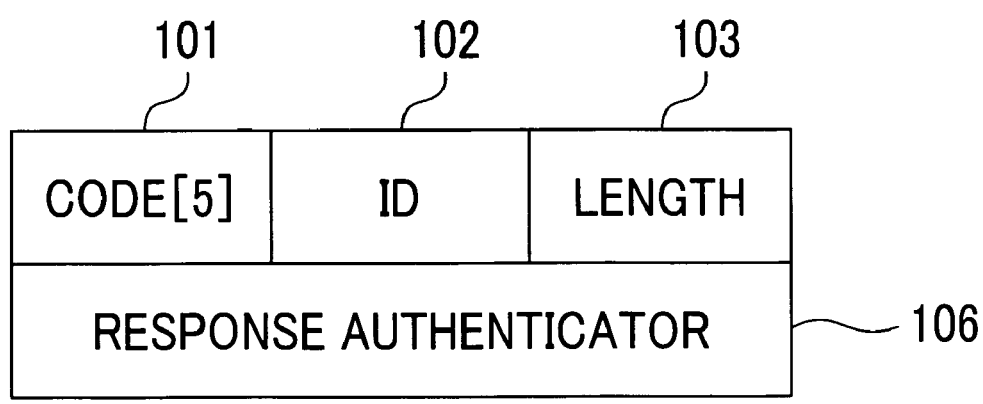
FIG. 14 is a diagram which shows an example of a message format.

An example of the message format of the accounting request signals 76, 78 is shown in FIG. 13, and an example of the message format of the accounting response signals 77, 79 is shown in FIG. 14. Code 101 stores a value showing the message type, i.e., an accounting request or an accounting response. ID102 stores the same data for an Accounting Request and an Accounting Response which responds to this message, and it uses them for verification of data coincidence. In the case of an Accounting Request, a length 103 stores the length of the sum total of the data 101, 102, 103, 104, 105. In the case of an Accounting Response, the length 103 stores the length of the sum total of the data 101, 102, 103, 106. 104 and 106 are authentication data. In the case of an Accounting Request (Start) which requests an accounting start, the data of FIG. 17 are stored in Attributes 105. In the case of an Accounting Request (Stop) which requests an accounting stop, the data of FIG. 16 are stored in Attributes 105.

Figure 16:
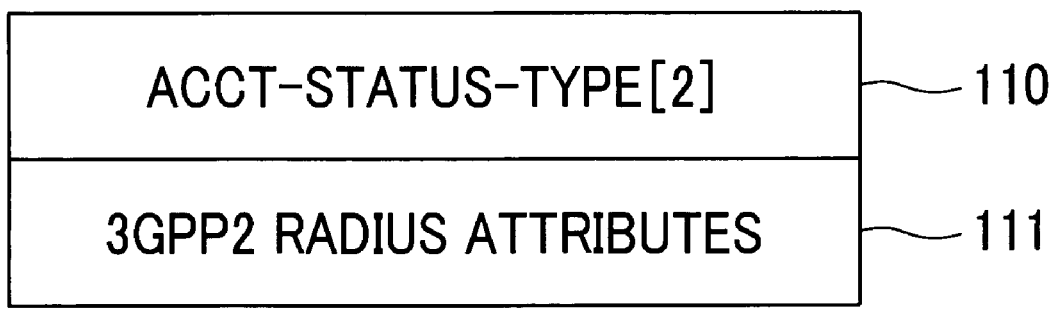
FIG. 16 is a diagram which shows an example of a message format.
Figure 17:
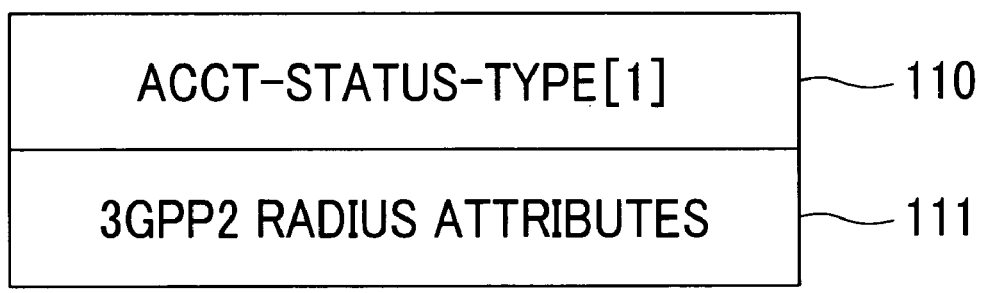
FIG. 17 is a diagram which shows an example of a message format.

The format of the data stored in Attributes 105 of the signal 76 is shown in FIG. 16. Acct-Status-Type 110 is data which shows service start or stop. In FIG. 16, according to this aspect, in order to stop accounting by the accounting format used until then because the QoS actually provided has varied, a value which shows a service stop is stored. A UDR is stored in 3GPP2 RADIUS attributes 111. Even if a signal 76 having a value showing a service stop is processed, the connection with the terminal MS7 is not cut.

The format of the data stored in the Attributes 105 of the signal 78 is shown in FIG. 17. Acct-Status-Type 110 is data which show a service start or stop. In FIG. 17, according to this aspect, in order to start accounting by a new accounting format because the QoS actually provided has varied, a value which shows a service start is stored. A UDR is stored in the 3GPP2 RADIUS attributes 111.

Figure 15:
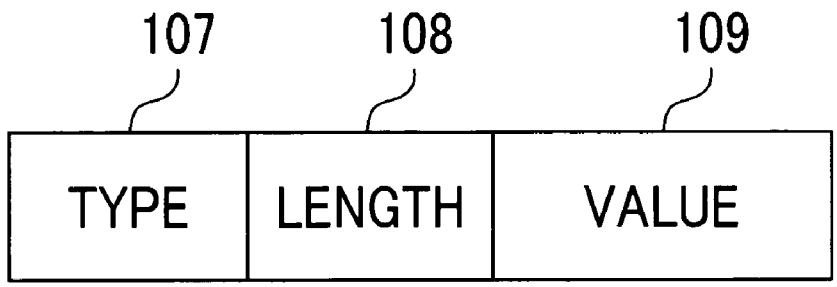
FIG. 15 is a diagram which shows an example of a message format.

The format of Acct-Status-Type 110 is shown in FIG. 15. A code which expresses that it is an Acct-Status-Type is stored in 107. The length of the data which combines 107, 108, 109 is stored in 108. The lengths of 107, 108 are both one octet, and the length of 109 is 4 octets. In the case of a service start, 1 is stored in 109, and in the case of a stop, 2 is stored in 109.

Figure 19:
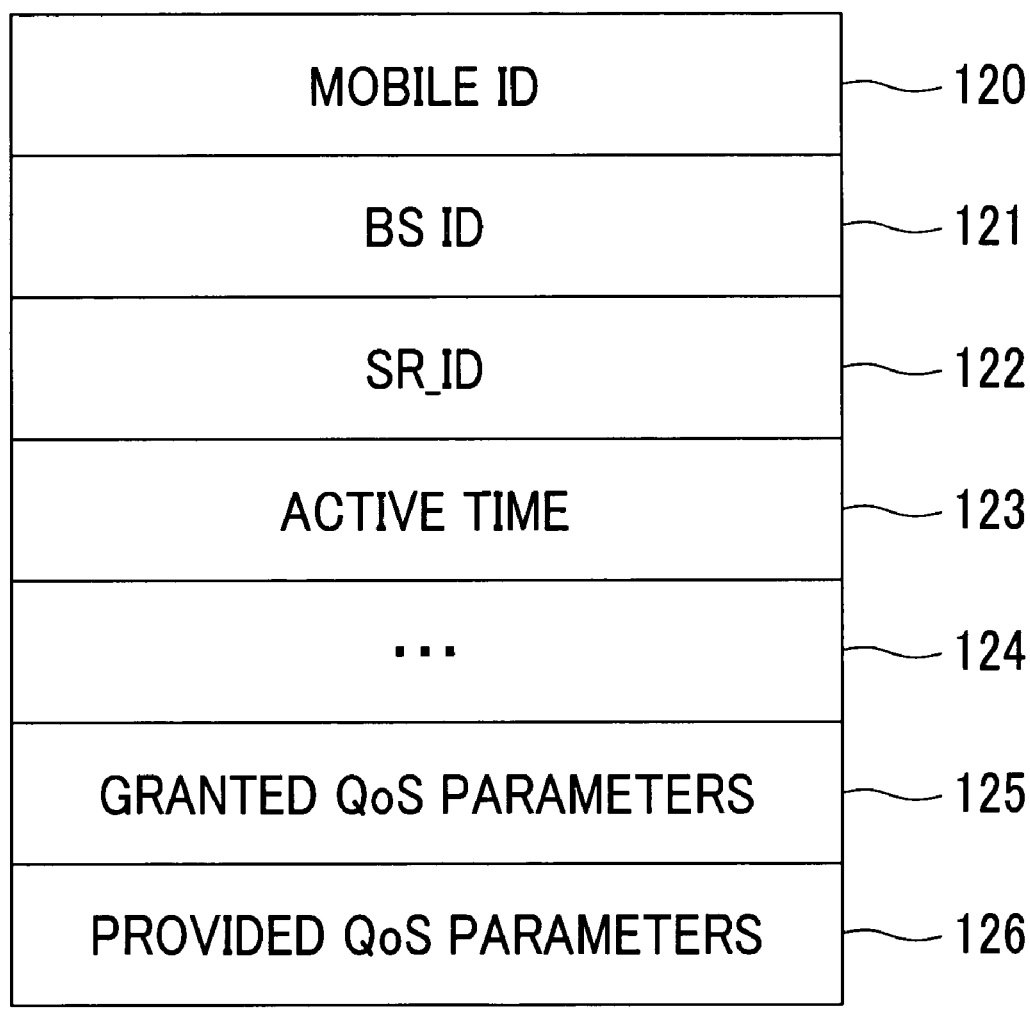
FIG. 19 is a diagram which shows an example of a message format.

The format of the 3GPP2 RADIUS attributes 111 is shown in FIG. 19. The identifier of the MS7 is stored in 120. The identifier of the BS4 is stored in 121. The identifier (SR_ID) of the SI is stored in 122. The effective connect time is stored in units of a second in 123. The granted RAN QoS parameter, is stored in 125. The RAN QoS parameter which was actually provided, is stored in 126. The variables of the 3GPP2 RADIUS attributes are described in, for example, Table 6 of 3GPP2, X.P0011-005-D, v.0.4 (July 2004). The variables given in this Table 6, other than the variables stored in 120, 121, 122, 123, 125, 126, are stored in 124.

Figure 18:
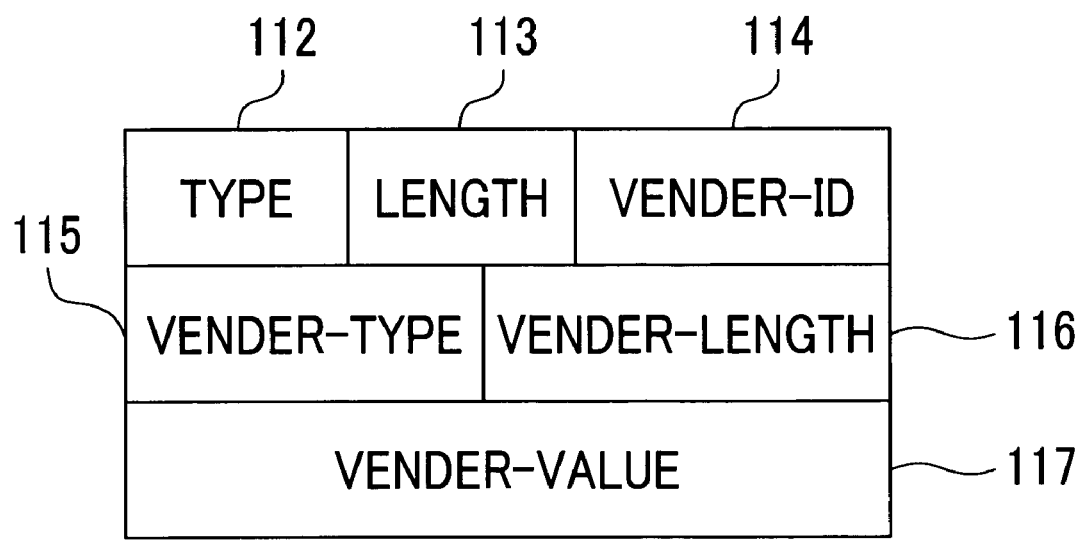
FIG. 18 is a diagram which shows an example of a message format.

The format of the variables of the 3GPP2 RADIUS attributes stored in 120, 121, 122, 123, 125, 126 is shown in FIG. 18. FIG. 18 shows the format of each variable of 120, 121, 122, 123, 125, 126 shown in FIG. 19. A code showing that it is a 3GPP2 RADIUS attribute is stored in 112. The total data length of 112, 113, 114, 115, 116, 117 is stored in 113. An identifier of the header expressing 3GPP2 is stored in 114. A code expressing the type of the variable stored in 117, is stored in 115. A value according to each variable of 120, 121, 122, 123, 125, 126 is stored in 115. The total data length of 115, 116, 117 is stored in 116. The variables of the 3GPP2 RADIUS attributes are stored in 117.

Figure 26:
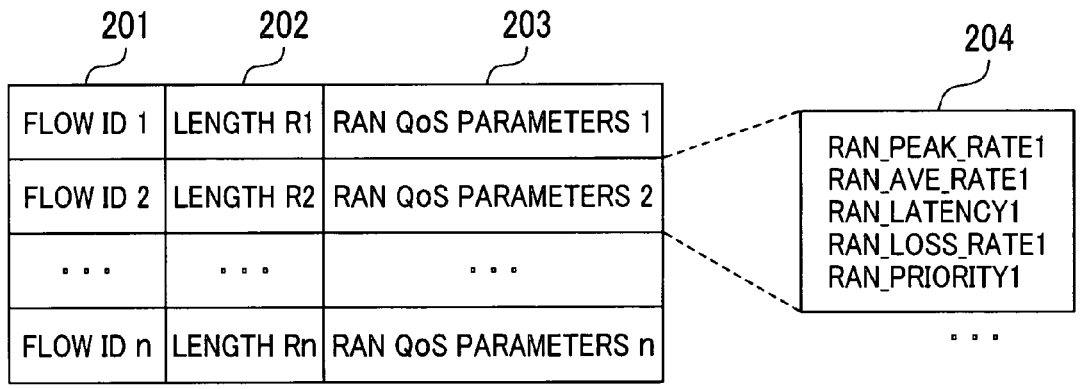
FIG. 26 is a diagram which shows an example of a message format.

An example of the format of the parameter of RAN QoS 168 which is actually provided (measured) in the RAN network is shown in the table of FIG. 26. The column 201 shows a flow identifier. The column 202 shows the data length of the QoS parameter stored in the column 203. The column 203 provides RAN QoS parameters corresponding to the flow identifier 201. Plural QoS parameters shown in, for example, the entry 204, are stored in 203.

Figure 27:
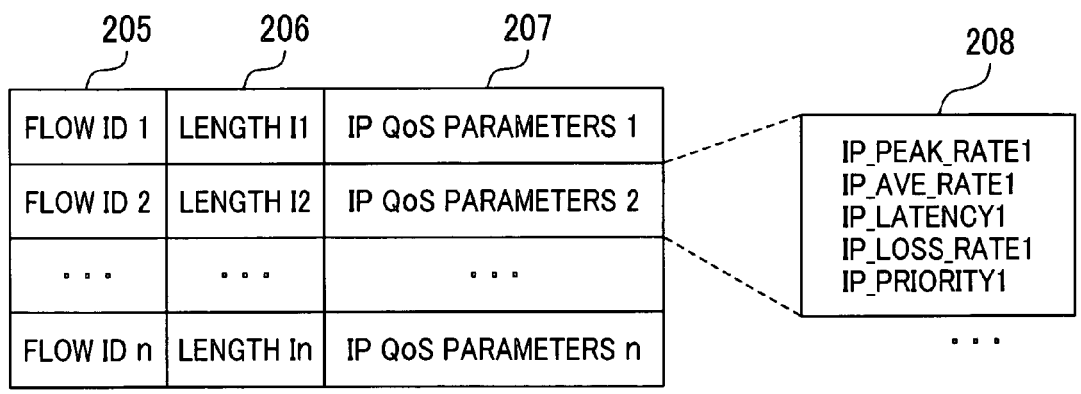
FIG. 27 is a diagram which shows an example of a message format.

An example of the format of the IP QoS parameters, which are actually provided (measured) in the IP network, is shown in the table of FIG. 27.

The column 205 provides a flow identifier. The column 206 shows the data length of the QoS parameters stored in column 207. The column 207 has IP QoS parameters corresponding to the flow identifier 205. Plural QoS parameters shown, for example, in the entry 208 are stored in the column 207.

Figure 28:
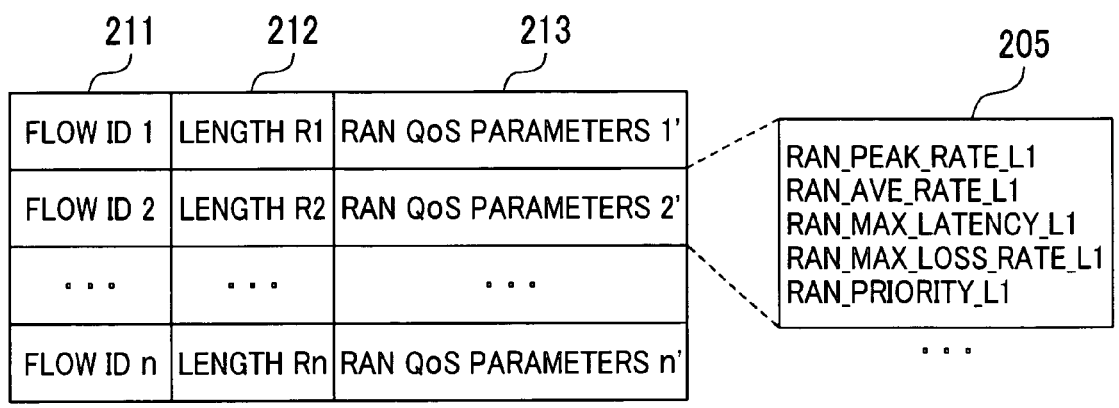
FIG. 28 is a diagram which shows an example of a message format.

An example of the format of the parameters of a granted RAN QoS 167 is shown in the table of FIG. 28. The column 211 provides a flow identifier. The column 212 shows the data length of the QoS parameters stored in the column 213. The column 213 has RAN QoS parameters corresponding to the flow identifier 211. Plural QoS parameters shown, for example, in the entry 205 are stored in the column 213.

Figure 29:
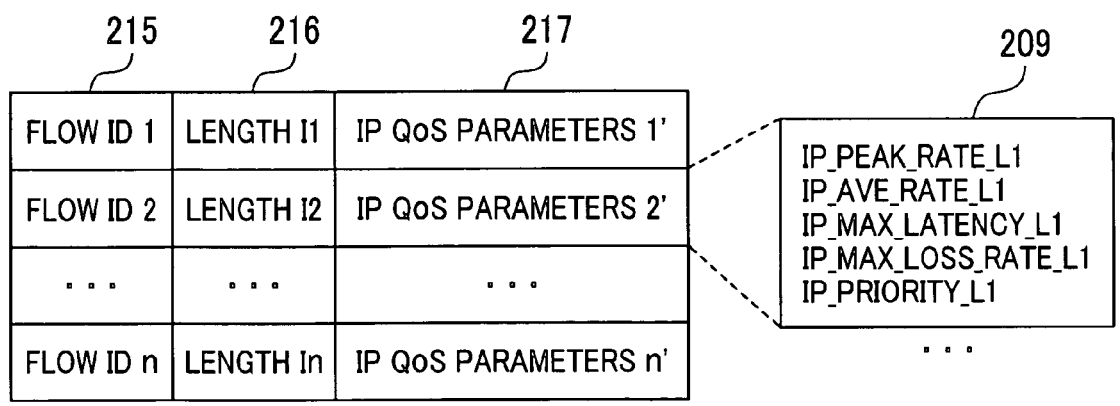
FIG. 29 is a diagram which shows an example of a message format.

An example of the format of granted IP QoS parameters is shown in the table of FIG. 29. The column 215 provides a flow identifier. The column 216 shows the data length of the QoS parameters stored in the column 217. The column 217 has IP QoS parameters corresponding to the flow identifier of column 215. Plural QoS parameters shown, for example, in the entry 209 are stored in the column 217.

[Examples of Tables]

An example of a table of RAN QoS values controlled by the BS4 and PCF3 is shown in FIG. 30. Column 223 shows a flow identifier. Column 224 shows an identifier of the SI. Column 221 has the RAN QoS parameter which is provided (implemented). The values 225 are the data length of the QoS parameters stored in 226. The values 226 are RAN QoS parameters corresponding to the flow identifier 223. Plural QoS parameters shown, for example, in 200 are stored in 226. The values 222 shows the granted RAN QoS parameter.

The values 227 are the data length of the QoS parameters stored in 228. 228 are RAN QoS parameters corresponding to the flow identifier 223. The values 229 are the granted QoS level corresponding to the flow identifier 223. The values 230 represent an accounting level corresponding to the flow identifier 223.

An example of a table of RAN QoS values controlled by the PDSN2 is shown in FIG. 31. The column 233 shows a flow identifier. Column 234 shows an identifier of the SI. Column 231 has the provided RAN QoS parameters. The values 235 shows the data length of the QoS parameters stored in 236. The values 236 are RAN QoS parameters corresponding to the flow identifier 233. The values 232 shows granted RAN QoS parameters. The values 237 are the data length of the QoS parameters stored in 238. The values 238 are RAN QoS parameters corresponding to the flow identifier 233. The values 239 are the granted QoS level corresponding to the flow identifier 233. The values 240 are an accounting level corresponding to the identifier of the flow 233.

An example of a table of IP QoS values controlled by the PDSN2 is shown in FIG. 32. The column 243 shows a flow identifier. Column 244 shows an identifier of the SI. Column 241 shows a provided IP QoS parameter. The values 245 are the data length of the QoS parameters stored in 246. The values 246 are IP QoS parameters corresponding to the flow identifier 243. The column 242 shows granted IP QoS parameters. The values 247 are the data length of the QoS parameters stored in 248. The values 248 are IP QoS parameters corresponding to the flow identifier 243. The values 249 are the granted QoS level corresponding to the flow identifier 243. The values 250 are an accounting level corresponding to the flow identifier 243.

The table shown in FIG. 31 is a RAN QoS parameter control table.

The table shown in FIG. 32 is an IP QoS parameter control table.

The PDSN2 measures the communication quality of transmitted/received IP packets and records it in the provided IP QoS parameter 241 of the table shown in FIG. 32 as an IP QoS parameter. Hereafter, an example will be described wherein the RAN QoS parameter is reflected in accounting as the communication quality, but the IP QoS parameter may also be reflected in accounting.

An example of a flow mapping table controlled by the PDSN2 and MS7, respectively, is shown in FIG. 33. The column 251 shows a flow identifier. The column 252 shows an identifier of the SI. The column 253 shows an identifier of the BS3. The column 254 shows an identifier of the MS7. When the flow is set up, exchange of the data in FIG. 33 is performed between the PDSN2 and MS7. For example, in the call flow of FIG. 9, exchange of these data between the PDSN2 and MS7 is performed by a signal 51.

[Example of Quality Evaluation Method in BS]

An example will now be described where the communication quality provided by BS is measured and compared with the granted communication quality, and, if the provided communication quality is less, an accounting update is performed.

The network operator first sets the data shown in FIG. 8 as data to be set in the memory unit 34 of the BS4, the memory unit 27 of the PCF3, the memory unit 12 of the PDSN2, and the memory unit 42 of the AAA5. Alternatively, the MS7 may transmit a signal which contains the table data of FIG. 8 to the BS4, PCF3 and PDSN2 to request a service, and the BS4, PCF3 and PDSN2 may register the table data of FIG. 8 into their memory units. An example wherein the MS7 transmits a desired QoS parameter to the BS4, PCF3 and PDSN2 to request a service is disclosed by Nonpatent document 2.

Here, assume that there is already a connection between the SI and Flow ID1, which has the identifier SR_ID1 in the MS7, and a connection between the SI and Flow ID2, which has the identifier SR_ID2 newly set by the signal 51 of FIG. 9. Assume that, at this time, the SI of SR_ID1 is QoS level L0, and the SI of SR_ID2 is QoS level L1. After exchange of the signal 51, the control unit 36 of the BS4 sets the data for the new flow (Flow ID2) as the table shown in FIG. 30 in the memory unit 34. The control unit 36 sets the flow identifier Flow ID2 as Flow ID223. The control unit 36 sets the identifier of the SI of the Flow ID2, SR_ID2, as SR_ID224. At this stage, the control unit 36 does not set a field 221 which stores the actually provided QoS parameter. The control unit 36 sets a field 224 which stores the granted QoS parameter. The control unit 36 sets the QoS parameter granted for the flow of Flow ID2 as the RAN QoS parameter 2' in 228, and it sets the data length of the RAN QoS parameter 2' in 227 in the line corresponding to Flow ID2. Since the SI of SR_ID2 is QoS level L1, the parameter shown by the RAN QoS parameter 251 in the line of the table shown in FIG. 8 for which the QoS level 250 is L1, is set as the RAN QoS parameter 2'. The control unit 36 sets L1 in 229 in the line corresponding to Flow ID2 as the QoS level granted for the flow of Flow ID2. The control unit 36 sets Grade1 in 230 in the line corresponding to Flow ID2 as the accounting grade of the flow of Flow ID2.

Figure 39:
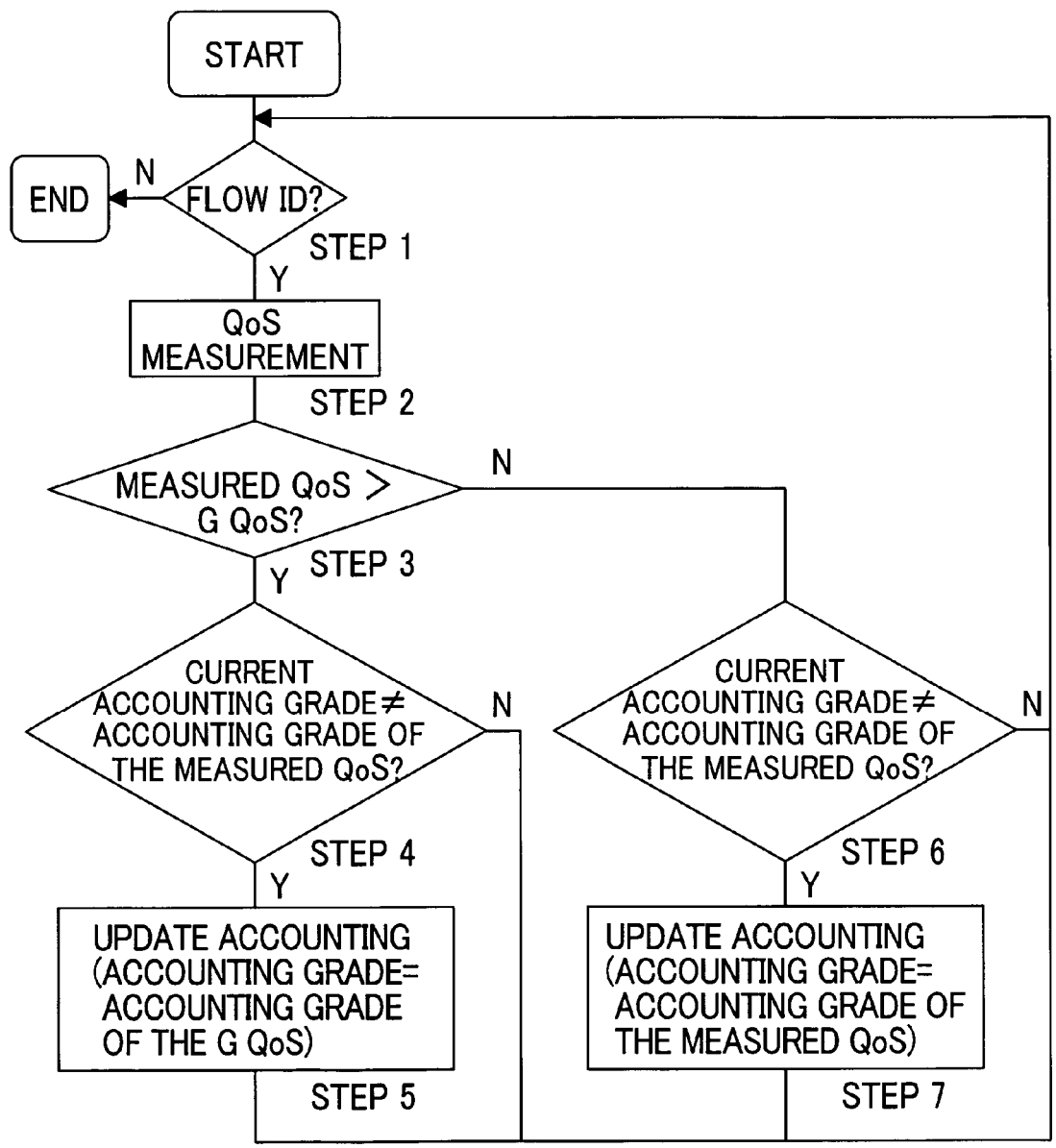
FIG. 39 is a flow chart which shows an example of an accounting update process algorithm according to the present invention.

An example of the accounting update algorithm performed hereafter by the control unit 36 of the BS4 is shown in FIG. 39. The accounting update algorithms performed by the control unit of the PCF3 and PDSN2 are identical.

In a Step 1, the flow ID of the control table of FIG. 30 is examined, and processing is performed on the flow of the Flow ID in the control table of FIG. 30. Specifically, for example, after the aforesaid exchange of the signal 51, if Flow ID2 is set in FIG. 30, processing is performed on the flow of Flow ID2 until the data of Flow ID2 is eliminated from the control table of FIG. 30 after exchange of a signal 61.

In a Step 2, measurement and recording of the communication quality are performed. An example of a measurement of the data rate by the BS4 will now be described.

Transmission of user data between the PCF3 and BS4 is performed by A8 packets. Assume that the control unit 36 of the BS4 looks up the control data of the received A8 packets and detects that the received packets are data for Flow ID2.

The control unit 36 first accumulates the received packets of Flow ID2 in the memory unit 35, and it assembles radio transmission units. The BS4 transmits the radio transmitting units to the radio transmission path. The control unit 36 counts user data for the received packets of Flow ID2, which is the number of bytes of data that have been transmitted, for a certain time. The control unit 36 measures the time to count the number of bytes by a timer 37. The control unit 36 computes the average data rate RAN_Ave_Rate_BS by dividing this number of bytes by the counting time. Also, the control unit 36 takes a much shorter time to count the number of bytes by the timer 37, and it computes the data rate by the same procedure. The maximum value of the data rate within this fixed time is set as a peak rate RAN_Peak_Rate_BS.

The BS4 may also compute the communication quality using radio control data, which varies with the transmission path state instead of measuring the communication quality itself, and this is reflected in the accounting. For example, with 1×Ev-DO, the CIR measured by the MS3 is sent to the BS4, and it is used for scheduling of packet data transmission. There is a relation between the CIR (Carrier to Interference Ratio) and the downlink data rate measured by the MS3. This is because the BS4 determines the data rate based on the measured CIR. The BS4 may also match the value of the CIR received from the MS3 with the data rate without measuring the downlink data rate. Further, the BS4 may also receive a RRI (Reverse Rate Indicator), which is control data transmitted together when the MS3 transmits an uplink data signal without measuring the uplink data rate, calculate the corresponding uplink data rate, and use the uplink data rate to determine the QoS level at that time. The uplink data rate (Reverse Rate) is generally a higher value, the better the transmission path conditions between the MS3 and BS4 are.

An example will now be described where the BS4 matches the value of the CIR with a data rate (DR).

Figures 45, 46, 47:
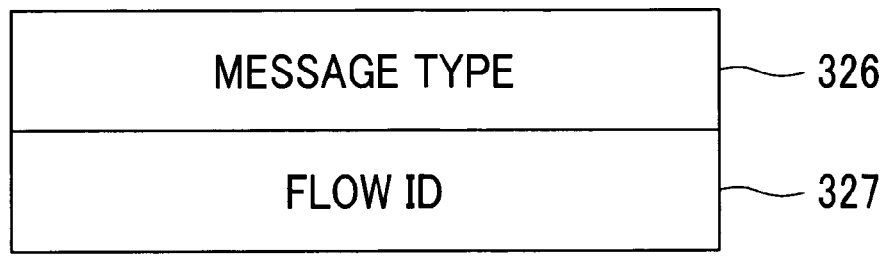
FIG. 45 is a diagram which shows an example of a message format.
FIG. 46 is a table which shows an example of a CIR correspondence values according to the present invention.
FIG. 47 is a table which shows an example of a RRI correspondence values according to the present invention.

FIG. 46 shows an example of a correspondence table between the CIR and DR. A DR332 corresponding to CIR331 is recorded in a CIR correspondence table 330. The memory unit 35 of the BS4 holds the CIR correspondence table 330, which is used for the control performed by the control unit 36. The MS3 transmits the CIR to the BS4 in a short time (typically, 1.25 ms). The control unit 36, when the CIR is received from the MS3 in the Step 2, computes the downlink rate by looking up the CIR correspondence table 330.

The CIR transmitted from the MS3 is quantized, and it takes one of the values CIR1, CIR2, . . . , CIRn. Now, assume that the value of the CIR received by the BS4 from the MS3 was CIR2. The control unit 36 sets a data rate which gives a value DR2 corresponding to CIR2 of the CIR correspondence table 330. The control unit 36 repeats the aforesaid processing at a fixed interval during the period in which the MS3 transmits the CIR, calculates the average of the data rate, and sets it as the RAN_Ave_Rate_B S. Alternatively, the maximum value of the data rate within this fixed interval is set as the peak rate RAN_Peak_Rate_BS.

If one of these data rates can be found, the QoS level can be determined based on the table of FIG. 8, so subsequent processing can be performed as in the other examples described heretofore.

The same is true of an example wherein the BS4 matches the value of the RRI with the data rate (DR).

FIG. 47 shows an example of a correspondence table between the RRI and DR. A DR337 corresponding to an RRI336 is recorded on a RRI correspondence table 335. The memory unit 35 of the BS4 holds the RRI correspondence table 335. The MS3 transmits the RRI to the BS4 in a short time (typically, 1.67 ms) via a control channel. The control unit 36, when the RRI is received from the MS3 in the Step 2, computes the uplink data rate by looking up the RR1 correspondence table 335. The RRI transmitted from the MS3 is quantized, and it takes one of the values RRI1, RRI2, . . . , RRIn. Now, assume that the value of the RRI received by the BS4 from the MS3 was RRI2. The control unit 36 sets a data rate which gives the value DR2 corresponding to RRI2 of the RRI correspondence table 335. The control unit 36 repeats the aforesaid processing at a fixed interval during the period in which the MS3 transmits the RRI, calculates the average of the data rate, and sets it as the RAN_Ave_Rate_B S. Alternatively, the maximum value of the data rate within this fixed interval is set as the peak rate RAN_Peak_Rate_BS.

In the case of the aforesaid example, the communication quality is computed using control data usually used for radio communications, so there is the advantage that there is no need to increase the data transmitted to the radio medium to calculate the communication quality in the BS4. An example wherein the data loss rate is measured by the BS4, will now be described. Transmission of user data between the PCF3 and BS4 is performed by A8 packets. Assume that the control unit 36 of BS4 looks up the control data of the received A8 packets, and detects that the received packet is data for Flow ID2. The control unit 36 first accumulates the received packets of Flow ID2 in the memory unit 35, and it assembles radio transmission units. The BS4 transmits the radio transmitting units to the radio transmission path. If space is lost in a region of the memory unit 35, the control unit 36 will discard the received packets of Flow ID2 accumulated in the memory unit 35. The control unit 36 counts user data for the received packets of Flow ID2, which is the number of bytes of lost data and the number of bytes of data accumulated in the memory unit 35. The control unit 36 computes the average data loss rate RAN_Loss_Rate_BS by dividing the number of lost bytes by the number of accumulated data bytes.

The BS4 may also estimate the data loss rate from radio control data which reflects the communication path state between radio sections instead of measuring the communication quality itself. The BS4 transmits packet data in slots of several ms units, and the MS3 which has received this packet data sends an ACK (acknowledgement) showing reception success to the BS4. When the BS4 does not perform resending control, and there is no reception success, the MS3 loses this packet data. The control unit of the BS4 counts the number of slots transmitted to the MS3, and the number of ACK received from the MS3.

The control unit of the BS4 divides a number obtained by subtracting the number of ACK received from the number of slots transmitted to the MS3, by the number of slots transmitted to the MS3, and it sets this value to the data loss rate RAN_Loss_Rate_BS.

In the case of the aforesaid example, the communication quality is estimated using control data usually used for radio communications, so there is the advantage that there is no need to increase the data transmitted to the radio medium to calculate the communication quality in the BS4.

A case will now be described where the latency time of user data is measured as a latency time in the BS4. Transmission of user data between the PCF3 and BS4 is performed by A8 packets. Assume that the control unit 36 of the BS4 looks up the control data of the received A8 packets and detects that the received packets are data for Flow ID2. The control unit 36 first accumulates the received packets of Flow ID2 in the memory unit 35 and assembles radio transmission units. The BS4 transmits the radio transmitting units to the radio transmission path. The memory unit 35, by means of the timer 37, measures a time T1 for which received packets of Flow ID2 were accumulated in the memory unit 35, and a time T2 for which radio transmitting units assembled from the user data of these received packets were inputted into the BB31. The control unit 36 computes a latency time RAN_Latency_BS in the BS4 by subtracting T1 from T2.

The BS4 may also estimate the latency or latency fluctuation from radio control data as a state which reflects communication path conditions between radio sections instead of measuring the communication quality itself. For example, when the BS4 resends data, the control unit 36 may compute an average number of resends using control data, match this with the latency amount, and reflect this in accounting. An example is given below.

The BS4 transmits packet data in slots of several ms units, and the MS3 which has received this packet data sends an ACK (acknowledgement) showing reception success to the BS4. When the BS4 performs resending control, the BS4 resends the packet data of the slots for which an ACK is not returned. The control unit 36 of the BS4 estimates an average number of resends. An estimate of the time required to send packet data to the MS3 from the BS4 is set to A. Since the time to send an ACK to the BS4 from the MS3 and the time to send packet data to the MS3 from the BS4 are added each time there is a resend, the latency time increases.

The added value whenever there is a resend is set to B.

The control unit 36 of the BS4 computes the latency time by the equation RAN_Latency_BS=A+B* (average number of resends). Assume that the service provider, or the manufacturer of the BS, first estimates the value of A and B beforehand by some means and uses them for control by the control unit 36. For example, A and B may be set as control variables of a program operated by the control unit 36. The control unit 36 of the BS4 may also, for example, compute the dispersion in the number of resends using control data, match this to the latency fluctuation, and reflect this in accounting.

In the case of the aforesaid example, the communication quality is computed using control data usually used for radio communications, so there is the advantage that there is no need to increase the data transmitted to the radio medium to calculate the communication quality in the BS4. The control unit 36 records the actually provided QoS parameters as RAN QoS parameters 2 of the table shown in FIG. 30. Assume that the RAN QoS parameters 2 have the same parameter structure 200 as the RAN QoS parameters 2'.

The control unit 36 records the RAN_Peak_Rate_BS as the RAN_Peak_Rate of the RAN QoS parameters 2. The control unit 36 records the RAN_Ave_Rate_BS as the RAN_Ave_Rate of the RAN QoS parameters 2. The control unit 36 records the RAN_Latency_BS as the RAN_Latency of the RAN QoS parameters 2. The control unit 36 records the RAN_Loss_rate_BS as the RAN_Loss_rate of the RAN QoS parameters 2. The control unit 36 records a value RAN_Priority_L1 held as the RAN_Priority of the RAN QoS parameters 2', which is a granted QoS parameter, as the RAN_Priority of the RAN QoS parameters 2.

Next, an example will be described where the control unit 36 of BS4 detects a deterioration of the communication quality of the flow specified by Flow ID2. In a Step 3, the control unit 36 compares the measured communication quality with the granted communication quality (G QoS). The control unit 36 looks up the granted QoS level 229, and it detects whether the granted QoS level for the Flow ID2 is L1. The control unit 36 compares the RAN QoS parameters 2 of the table shown in FIG. 30 with the parameters in the line L1 of the RAN QoS parameter 251 shown in FIG. 8. In the Step 3, if any of RAN_Ave_Rate_BS<RAN_Ave_Rate_L1, RAN_Latency_BS>RAN_Latency_L1, and RAN_Loss_rate_BS>RAN_Loss_rate_L1 are satisfied, it is determined that the communication quality actually provided has deteriorated compared with the granted communication quality.

In the comparison of latency time, the part of the RAN_Latency_L1 assigned to the BS is compared to the latency time in the BS. For example, 10% of the RAN_Latency_L1 is taken as the part assigned to the BS. If RAN_Latency_BS>(RAN_Latency_L 1×0.1) is satisfied instead of RAN_Latency_BS>RAN_Latency_L1, the control unit 36 determines that the actual communication quality has deteriorated. Although a higher precision accounting can be performed by comparing the value of each parameter, the value of each parameter may first be converted to a level, and the levels then compared.

A margin may be allowed and compared with the data rate or data loss rate. For data rate, for example, a margin of 10% is given to RAN_Ave_Rate_BS. At this time, if (RAN_Ave_Rate_BS+RAN_Ave_Rate_BS×0.1)<RAN_Ave_Rate_L1 is satisfied, the control unit 36 determines that the actual communication quality has deteriorated. For data loss rate, for example, a margin of 10% is given to RAN_Loss_Rate_BS. At this time, if (RAN_Loss_Rate_BS−RAN_Loss_Rate_BS×0.1)<RAN_Loss_Rate_L1 is satisfied, the control unit 36 determines that the actual communication quality has deteriorated.

In a Step 6, the control unit 36 compares the accounting grade, which is presently applied, with the accounting grade corresponding to the actually provided QoS estimated from the measured communication quality. If the control unit 36 has detected a deterioration, the QoS level is lowered by one, a comparison is again performed and the actually provided QoS level is examined.

Specifically, the control unit 36 compares the RAN QoS parameters 2 of the table shown in FIG. 30 with the parameters in the line L0 of the RAN QoS parameter 251 shown in FIG. 8. Here, assume that none of RAN_Ave_Rate_BS<RAN_Ave_Rate_L0, RAN_Latency_BS>RAN_Latency_L0 and RAN_Loss_rate_BS>RAN_Loss_rate_L0 are satisfied. The control unit 36 then determines that the actually provided QoS level is L0. The control unit 36 compares the value of the accounting grade 253 for the QoS level L0 in the table of FIG. 8 with the value of the accounting grade 230 for the present flow state specified by Flow ID2 in the table of FIG. 30.

Since the value of the accounting grade 253 for the provided quality is Grade 0, and the value of the present accounting grade 230 is Grade 1, which are different, the control unit 36 starts an accounting update process 56. Specifically, the BS4 sends the provided quality as a Provided QoS 175 in a provided quality notification signal 70. The Provided QoS175 is sent to the AAA5 via the PCF3 and PDSN2, and it is used in the accounting process described hereinafter. Since the PCF3, PDSN2 and AAA5 have stored the table shown in FIG. 8, each can compute the accounting grade corresponding to the Provided QoS175. The BS4 may also use the accounting grade 253 of the provided quality, instead of the Provided QoS175 in the provided quality notification signal 70, and send it to the AAA. The control unit 36, in a Step 7, then records Grade0 as the accounting grade 230 of the flow specified by Flow ID2, and updates the present accounting grade (accounting grade 230) of the BS control table shown in FIG. 30.

Figure 41:
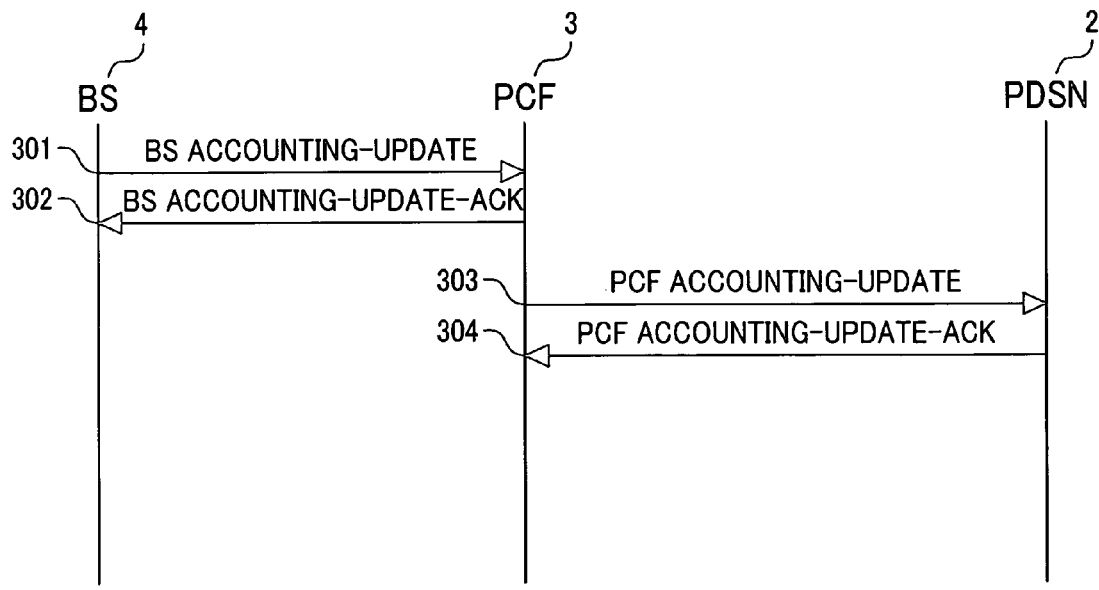
FIG. 41 is a process flow diagram which shows an example of an accounting update process call flow according to the present invention.

When one or more of the BS4, PCF3 and PDSN2 measure the communication quality and the accounting grade is updated, if the accounting grade is updated by the initiative of one or more of the BS4, PCF3 and PDSN2 in the Step 7 or Step 5, the accounting grade update is notified also to devices other than those that take the initiative, and the data stored in those devices is updated. The initiating device transmits an accounting update notification, and the devices which receive this notification update their accounting data and, if necessary, relay the notification. A flow example in the case where the BS4 notifies an accounting grade update to the PCF3 and PDSN2 is shown in FIG. 41. The BS4 transmits a BS Accounting-Update 301 to PCF3, and the PCF3 transmits a BS Accounting-Update-Ack 302 to BS4. The PCF3 transmits a PCF Accounting-Update 303 to PDSN2, and the PDSN2 transmits a PCF Accounting-Update-Ack 304 to the PCF3.

Figure 42:
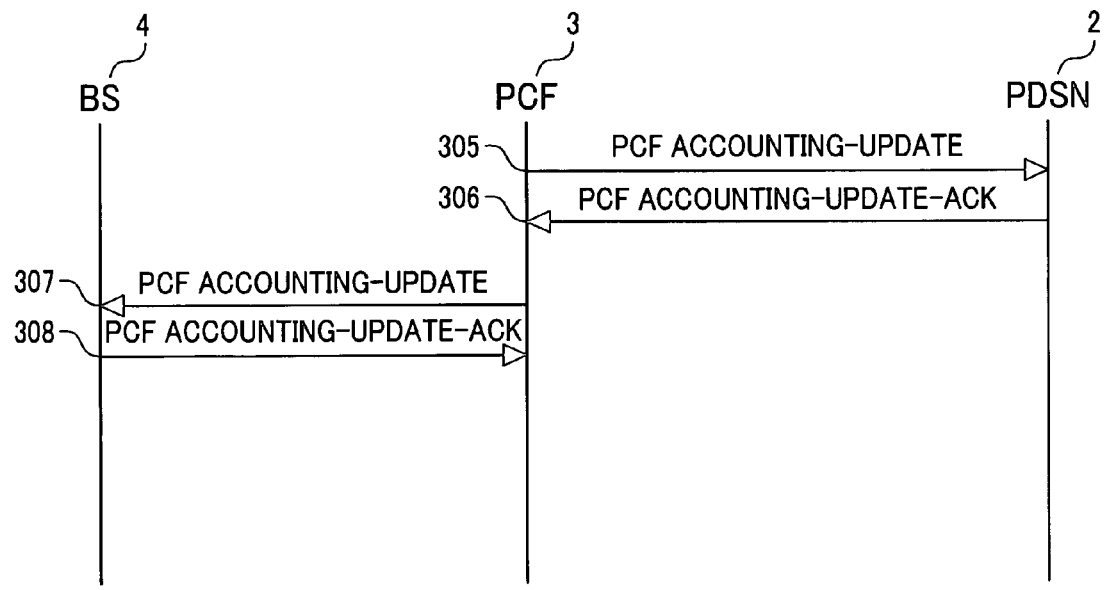
FIG. 42 is a process flow diagram which shows an example of an accounting update process call flow according to the present invention.

A flow example in the case where the PCF3 notifies an accounting grade update to the BS4 and PDSN2 is shown in FIG. 42. The PCF3 transmits a PCF Accounting-Update 305 to the PDSN2, and the PDSN2 transmits a PCF Accounting-Update-Ack 306 to the PCF3. The PCF3 transmits a PCF Accounting-Update 307 to the BS4, and the BS4 transmits a PCF Accounting-Update-Ack 308 to the PCF3.

Figure 43:
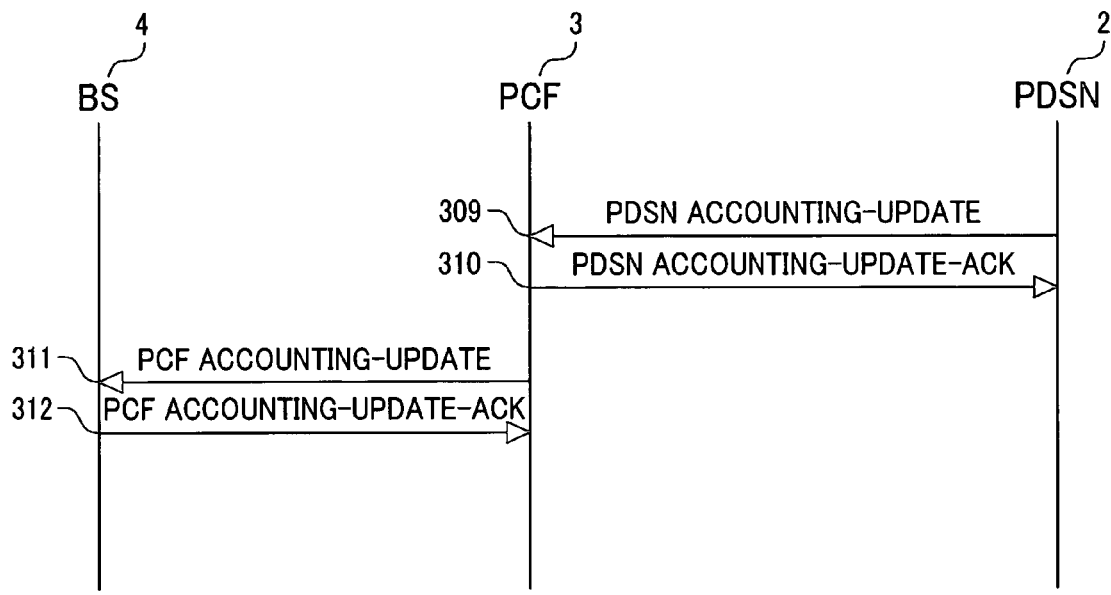
FIG. 43 is a process flow diagram which shows an example of an accounting update process call flow according to the present invention.

A flow example in the case where the PDSN2 notifies an accounting grade update to the BS4 and PCF3 is shown in FIG. 43. The PDSN2 transmits a PDSN Accounting-Update 309 to the PCF3, and the PCF3 transmits a PDSN Accounting-Update-Ack 310 to the PDSN2. The PCF3 transmits a PCF Accounting-Update 311 to the BS4, and the BS4 transmits a PCF Accounting-Update-Ack 312 to the PCF3.

Figure 44:
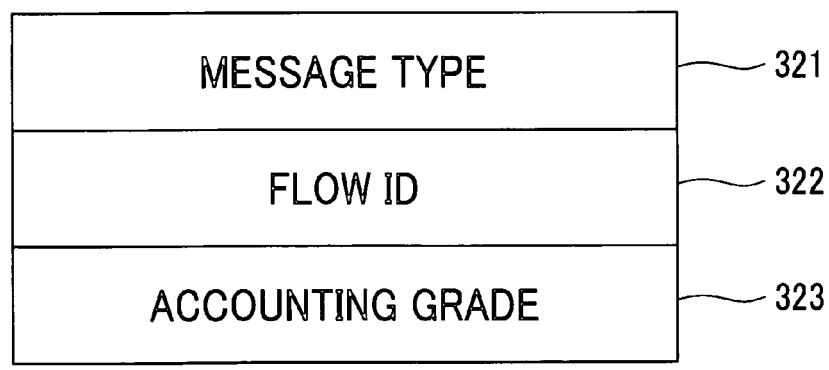
FIG. 44 is a diagram which shows an example of a message format.

An example of the message format of the BS accounting grade update notification 301, PCF accounting grade update notifications 303, 305, 307, 311, and PDSN accounting grade update notification 309, is shown in FIG. 44. A code which shows that a Message Type 321 is a BS accounting grade update notification, PCF accounting grade update notification or PDSN accounting grade update notification, is stored. A Flow ID322 stores the Flow ID of the flow for which accounting was updated. An Accounting Grade 323 stores the accounting grade after the update.

An example of the message format of the BS accounting grade update confirmation 302, PCF accounting grade update confirmations 304, 306, 308, 312 and PDSN accounting grade update confirmation 310, is shown in FIG. 45. A code which shows that a Message Type 326 is a BS accounting grade update confirmation, PCF accounting grade update confirmation or PDSN accounting grade update confirmation, is stored. A Flow ID327 stores the Flow ID of the flow for which the accounting was updated.

Figure 40:
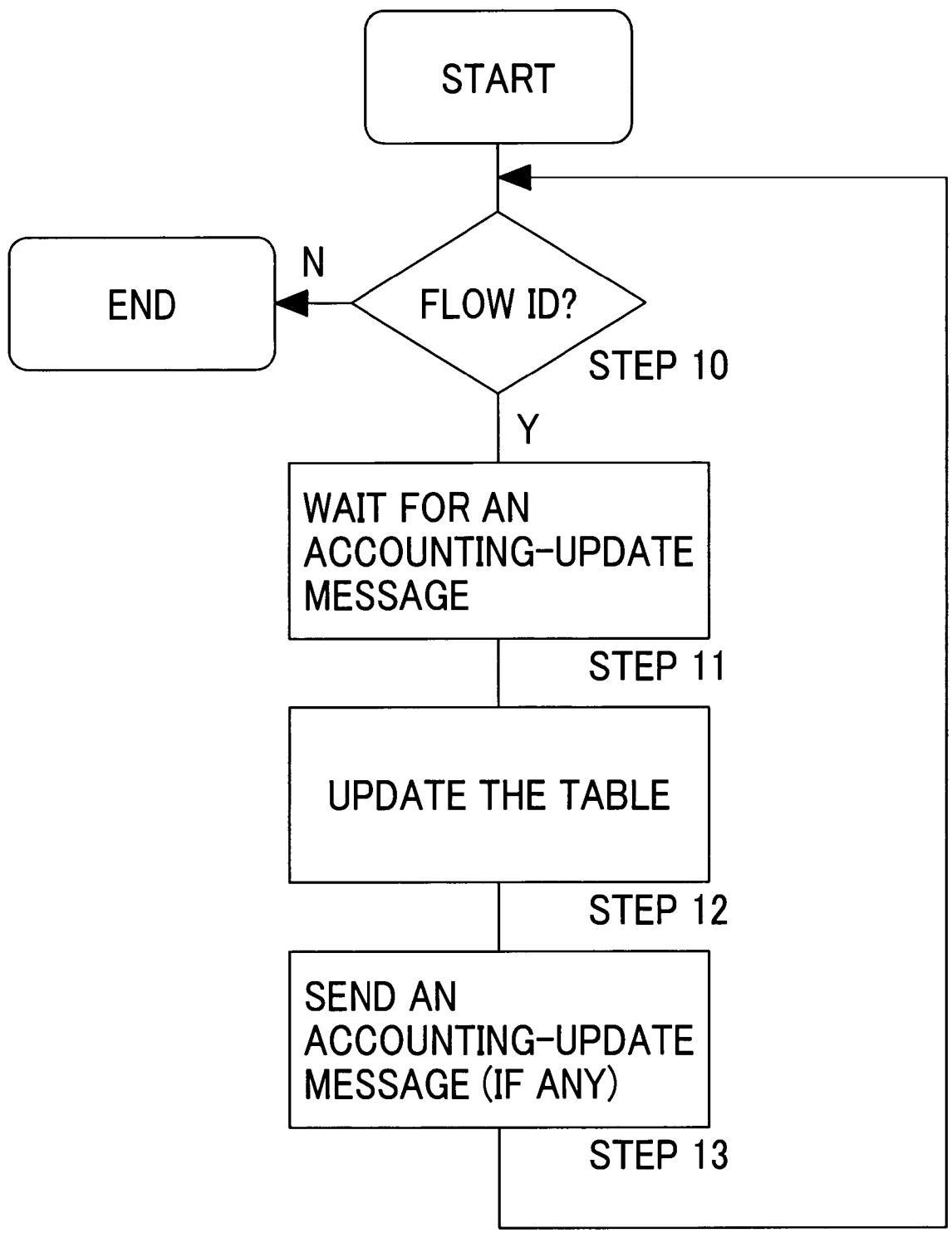
FIG. 40 is a flow chart which shows an example of an accounting update process algorithm according to the present invention.

An example of the accounting update algorithm executed by the control units of the BS4, PF3, PDSN2 is shown in FIG. 40. In a Step 10, the flow ID of the control table of FIG. 30 is examined, and processing is performed on the flow of the Flow ID in the control table of FIG. 30. Specifically, for example after the aforesaid exchange of the signal 51, if Flow ID2 is set in FIG. 30, processing is performed on the flow of Flow ID2 until the data of Flow ID2 is eliminated from the control table of FIG. 30 after exchange of the signal 61. In a Step 11, the system waits for reception of a BS accounting grade update notification or PCF accounting grade update notification. When the accounting grade update notifications are received, the BS4, PCF3 and PDSN2 return accounting grade update confirmations corresponding to each for verification. In a Step 12, the BS4, PCF3 and PDSN2 record an accounting grade 323 contained in each accounting grade update notification in the control table. Specifically, the control unit 36 of the BS4 records the accounting grade 323 in the line of the accounting grade 230 corresponding to Flow ID2 of the BS control table shown in FIG. 30. A control unit 23 of the PCF3 records the accounting grade 323 in a line of the accounting grade 230 corresponding to Flow ID2 of the PCF control table shown in FIG. 30. A control unit 13 of the PDSN2 records the accounting grade 323 in a line of the accounting grade 240 corresponding to the Flow ID2 of the control table shown in FIG. 31. In a Step 13, the BS4, PCF3 and PDSN2 transmit an accounting grade update notification if needed in order to relay data.

For example, as shown in FIG. 41, if the PCF3 has received a BS accounting grade update notification 301 from the BS4 in the Step 11, the PCF3 first records the accounting grade in the Step 12. The control unit of the PCF3, in the Step 13, rewrites the Message Type 321 of the BS accounting grade update notification 301 to a value which shows the PCF accounting grade update notification, and transmits it as the PCF accounting grade update notification 303.

As shown, for example, in FIG. 42, consider now the time when the PCF3 transmits the PCF accounting grade update notification 307 to the BS4, and the PCF3 transmits the PCF accounting grade update notification 305 to the PDSN2. In this case, since there is no need for relay in any of the BS4, PCF3 and PDSN2, there is no Step 13 in the processing of the respective control units.

Also, as shown, for example, in FIG. 43, if the PCF3 receives the PDSN accounting grade update notification 309 from the PDSN2 in the Step 11, the PCF3 first records the accounting grade in the Step 12. The control unit of the PCF3, in the Step 13, rewrites the Message Type 321 of the PDSN accounting grade update notification 309 to a value which shows the PCF accounting grade update notification, and transmits it as the PCF accounting grade update notification 311.

Thus, the BS, PCF and PDSN can follow an accounting grade update accompanying a change of actual communication quality also in the case where a change of actual communication quality was detected in one of these devices.

Although it differs from the precondition of this example, in the Step 6, if any one of RAN_Ave_Rate_BS<RAN_Ave_Rate_L1, RAN_Latency_BS>RAN_Latency_L1 and RAN_Loss_rate_BS>RAN_Loss_rate_L1 is satisfied, the control unit 36 lowers the QoS level by one, a comparison is again performed, and the actually provided QoS level is examined. The control unit 36 then compares the RAN QoS parameters 2 of the table shown in FIG. 30, with the parameters in the line L1 of the RAN QoS parameter 251 shown in FIG. 8. For example, assume that none of RAN_Ave_Rate_BS<RAN_Ave_Rate_L0, RAN_Latency_BS<RAN_Latency_L0 and RAN_Loss_rate_BS>RAN_Loss_rate_L0 are satisfied.

The control unit 36 then determines that the actually provided QoS level is L0. The control unit 36 looks up the accounting grade 253 of QoS level L0, and compares it with the accounting grade 230.

Since the value of the accounting grade 253 for the provided quality is Grade 0, and the value of the present accounting grade 230 is Grade 0, which are identical, the control unit 36 determines that the present accounting is suitable. In this case, the control unit 36 does not perform the accounting update process 56.

An example will now be described where the communication quality provided by the BS is measured and compared with the granted communication quality, and if the provided communication quality has recovered, an accounting update is performed. As described in the aforesaid example, assume that the actual communication quality of the flow specified by Flow ID2 had deteriorated to the quality of QoS level L0. Now, assume that the actual communication quality of the flow specified by Flow ID2 has recovered to the original granted communication quality (quality of QoS level L1).

The control unit 36, in the Step 2, measures the average data rate RAN_Ave_Rate_BS, peak rate RAN_Peak_Rate_BS, data loss rate RAN_Loss_Rate_BS, and latency time RAN_Latency_BS.

The control unit 36 further records the actually provided QoS parameters estimated from the communication quality measured in the Step 2, as the RAN QoS parameters 2 of the table shown in FIG. 30. Assume that the RAN QoS parameters 2 have the same parameter structure 200 as the RAN QoS parameters 2'. The control unit 36 records RAN_Peak_Rate_BS as the RAN_Peak_Rate of the RAN QoS parameters 2. The control unit 36 records RAN_Ave_Rate_BS as the RAN_Ave_Rate of the RAN QoS parameters 2. The control unit 36 records RAN_Latency_BS as the RAN_ Latency of the RAN QoS parameters 2. The control unit 36 records RAN_Loss_rate_BS as the RAN_Loss_rate of the RAN QoS parameters 2. The control unit 36 records a value RAN_Priority_L1 held as the RAN_Priority of the RAN QoS parameters 2', which is a granted QoS parameter, as the RAN_Priority of the RAN QoS parameters 2.

Next, an example will be described where the control unit 36 of the BS4 detects a recovery of communication quality of the flow specified by Flow ID2. In the Step 3, the control unit 36 compares the measured communication quality with the granted communication quality (G QoS). The control unit 36 looks up the granted QoS level 229, and detects whether the granted QoS level for the flow of the Flow ID2 is L1. The control unit 36 compares the RAN QoS parameters 2 of the table shown in FIG. 30 with the parameters in the line L1 of the RAN QoS parameter 251 shown in FIG. 8. The control unit 36 examines for deterioration of communication quality. Here, assume that none of RAN_Ave_ Rate_BS<RAN_Ave_Rate_L1, RAN_Latency_BS>RAN_Latency_L1 and RAN_Loss_rate_BS>RAN_Loss_rate_L1 are satisfied. The control unit 36 then determines that the communication quality actually provided by the flow of Flow ID2 has not deteriorated relative to the granted communication quality. Also, when the actually provided communication quality is higher than the granted communication quality (L1), accounting is still performed for the granted communication quality (Grade 1 accounting).

In a Step 4, the control unit 36 compares the value of the accounting grade 253 for the granted QoS level L1 in the table of FIG. 8 with the value of the accounting grade 230 for the present flow state specified by Flow ID2 in the table of FIG. 30. Since the value of the accounting grade 253 for the provided quality is Grade 1, and the value of the current accounting grade 230 is Grade 0, which are different, the control unit 36, in a Step 5, starts the accounting update process 58. The control unit 36 then records Grade 1 as the accounting grade 230 of the flow specified by Flow ID2, and updates the present accounting grade of the BS control table shown in FIG. 30.

[Example of Accounting by AAA5]

An example will be described where the AAA5 performs accounting for each service instance (SI) of each MS. An example of a control table of the memory unit 42 of the AAA5 is shown in FIG. 34. A message shown in FIG. 13 is inputted into a NW IF41 of the AAA5. The control unit 43 of the AAA5 analyzes the data contained in the message shown in FIG. 13, and it generates the table of FIG. 34. MS ID255 is an identifier of the MS. Here, assume the identifier of the MS7, for which accounting is being performed, is MS_ID1. SR ID256 is an identifier of the SI. Assume the identifier of the SI which is being charged is SR_ID2. BS ID257 is an identifier of the BS3 to which the MS7 connects. Here, assume the identifier of the BS3 is BS_ID1. An Active Time 258 is the effective connect time. Here, assume that the MS7 performs the communication shown in FIG. 9. An effective connect time Tac1 of a period 62, an effective connect time Tac2 of a period 63 and an effective connect time Tac3 of a period 64 are recorded in the Active Time 258. An Accounting Grade 259 is the accounting grade. The control unit 43 compares the measured value 126 of the communication QoS contained in the message with the communication quality 251 recorded in the memory unit 42, and computes the accounting grade. The control unit 43 records Grade 1 as the accounting grade of the period 62, Grade 0 as the accounting grade of the period 63 and Grade 1 as the accounting grade of the period 64, in 259.

The control unit 43 calculates Tac1*F(Grade 1)+Tac2*F (Grade 0)+Tac3*F (Grade 1) as the accounting amount. F(x) is a function of unit time accounting amount relative to an argument of an accounting grade x. The service provider requests the accounting amount calculated by the AAA5 from the user of the MS7.

This example is an example wherein the AAA5 computes the accounting grade from measurement data for the communication quality contained in the message. The BS4, PCF3 and PDSN2 may use the accounting grade computed from the measured communication quality in the message instead of the communication quality itself, and transmit it to the AAA5. The AAA5 may also perform accounting using an accounting grade contained in the message.

[Example of Quality Evaluation Method in PCF]

An example will now be described where the communication quality provided by the PCF3 is measured, and an accounting update is performed if the present accounting does not match the provided communication quality.

The network operator first sets the data shown in FIG. 8 as data to be set in the memory unit 34 of the BS4, memory unit 27 of the PCF3, memory unit 12 of the PDSN2 and memory unit 42 of the AAA5. Alternatively, the MS7 may transmit a signal which contains the table data of FIG. 8 to the BS4, PCF3 and PDSN2 to request a service, and the BS4, PCF3 and PDSN2 may register the table data of FIG. 8 into their memory units. An example wherein the MS7 transmits a desired QoS parameter to the BS4, PCF3 and PDSN2 to request a service is disclosed by Nonpatent document 2.

Here, assume that there is already a connection between the SI and Flow ID1 which has the identifier SR_ID1 in the MS7, and a connection between the SI and Flow ID2 which has the identifier SR_ID2 is newly set by the signal 51 of FIG. 9. Assume that, at this time, the SI of SR_ID1 is QoS level L0, and the SI of SR_ID2 is QoS level L1. After exchange of the signal 51, the CPU 28 of the PCF3 sets the data for the new flow (Flow ID2) as the table shown in FIG. 30 in the memory unit 27. The CPU 28 sets the flow identifier Flow ID2 as a Flow ID223. The CPU 28 sets the identifier of the SI of Flow ID2, SR_ID2, as SR_ID224. At this stage, the CPU 28 does not set the field 221 which stores the actually provided QoS parameters. The CPU 28 sets a field 224 which stores the granted QoS parameter. The CPU 28 sets the QoS parameters granted for the flow of Flow ID2 as the RAN QoS parameters 2' in 228, and sets the data length of the RAN QoS parameters 2' in 227 in the line corresponding to Flow ID2. Since the SI of SR_ID2 is QoS level L1, the parameters shown by the RAN QoS parameter 251 in the line of the table shown in FIG. 8 for which the QoS level 250 is L1, are set as the RAN QoS parameters 2'. The CPU 28 sets L1 in 229 in the line corresponding to Flow ID2 as the QoS level granted for the flow of Flow ID2. The control unit 36 sets Grade1 to the line corresponding to Flow ID2 of 230 as the accounting grade of the flow of Flow ID2.

An example of measurement of the data rate by the PCF3 will now be described. Transmission of user data between the PDNS2 and PCF3 is performed by A10 packets. Assume that the CPU 28 of the PCF3 looks up the control data of the received A10 packets, and it is determined that the received packets are data for Flow ID2.

The CPU 28 first accumulates the received packets of Flow ID2 in the memory unit 27, and assembles A8 packets. PCF3 transmits the A8 packets to the transmission path via the NW IF21. The CPU 28 counts user data for the received packets of Flow ID2, which is the number of bytes of data which have been transmitted to the transmission path, for a certain time. The CPU 28 measures the time to count the number of bytes by a timer 29. The CPU 28 computes the average data rate RAN_Ave_Rate_PCF by dividing this number of bytes by the counting time. Also, the CPU 28 takes a much shorter time to count the number of bytes by the timer 29, and computes the data rate by the same procedure. The maximum value of the data rate within this fixed time is taken as the peak rate RAN_Peak_Rate_PCF.

An example wherein the data loss rate is measured by the PCF3, will now be described. Transmission of user data between the PDSN2 and PCF3 is performed by A10 packets. Assume that the CPU 28 of PCF3 looks up the control data of the received A10 packets, and detects that the received packets are data for Flow ID2. The CPU 28 first accumulates the received packets of Flow ID2 in the memory unit 27, and assembles A8 packets.

The PCF3 transmits the A8 packets to the transmission path via the NW IF21. If space is lost in a region of the memory unit 27, the CPU 28 discards the received packets of Flow ID2 accumulated in the memory unit 27. The CPU 28 counts user data for the received packets of Flow ID2, which is the number of bytes of lost data and the number of bytes of data accumulated in the memory unit 27. The CPU 28 computes the average data loss rate RAN_Loss_Rate_PCF by dividing the number of lost bytes by the number of accumulated data bytes.

A case will now be described where the latency time of user data is measured as a latency time in the PCF3. Transmission of user data between the PDSN2 and the PCF3 is performed by A10 packets. Assume that the CPU 28 of the PCF3 looks up the control data of the received A10 packets, and it is determined that the received packets are data for Flow ID2. The CPU 28 first accumulates the received packets of Flow ID2 in the memory unit 27, and assembles A8 packets. The PCF3 transmits the A8 packets to the transmission path via the NW IF21. The memory unit 27, by use of the timer 29, measures a time T1 for which received packets of Flow ID2 were accumulated in the memory unit 27, and a time T2 for which A8 packets assembled from the user data of these received packets were outputted into the NW IF21. The CPU 28 computes a latency time RAN_Latency_PCF in the PCF3 by subtracting T1 from T2.

The CPU 28 records the actually provided QoS parameters as the RAN QoS parameters 2 of the table shown in FIG. 30. Assume that the RAN QoS parameters 2 have the same parameter structure 200 as the RAN QoS parameters 2'. The CPU 28 records the RAN_Peak_Rate_PCF as the RAN_Peak_Rate of the RAN QoS parameters 2. The CPU 28 records the RAN_Ave_Rate_PCF as the RAN_Ave_Rate of the RAN QoS parameters 2. The CPU 28 records the RAN_Latency_PCF as the RAN_Latency of the RAN QoS parameters 2. The CPU 28 records RAN_Loss_rate_PCF as the RAN_Loss_rate of RAN QoS parameters 2. The CPU 28 records a value RAN_Priority_L1 held as the RAN_Priority of the RAN QoS parameters 2', which is a granted QoS parameter, as the RAN_Priority of the RAN QoS parameters 2.

Next, an example will be described where the CPU 28 of PCF3 detects a deterioration of communication quality of the flow specified by Flow ID2. The CPU 28 looks up the granted QoS level 229, and detects whether the granted QoS level for Flow ID2 is L1.

The CPU 28 compares the RAN QoS parameters 2 of the table shown in FIG. 30, with the parameters in the line L1 of the RAN QoS parameter 251 shown in FIG. 8. If any one of RAN_Ave_Rate_PCF<RAN_Ave_Rate_L1, RAN_Latency_PCF>RAN_Latency_L1 and RAN_Loss_rate_PCF>RAN_Loss_rate_L1 are satisfied, the CPU 28 determines that the communication quality actually provided has deteriorated compared with the granted communication quality.

In the comparison of latency time, the part of the RAN_Latency_L1 assigned to the BS is compared to the latency time in the BS. For example, 30% of the RAN_Latency_L1 is taken as the part assigned to the BS. If RAN_Latency_BS>(RAN_Latency_L 1×0.1) is satisfied instead of RAN_Latency_BS>RAN_Latency_L1, the control unit 36 determines that the actual communication quality has deteriorated.

A margin may be allowed and compared with the data rate or data loss rate. For data rate, for example, a margin of 10% is given to RAN_Ave_Rate_PCF. At this time, if (RAN_Ave_Rate_PCF+RAN_Ave_Rate_PCF×0.1)<RAN_Ave_Rate_L1 is satisfied, the CPU 28 determines that the actual communication quality has deteriorated.

For data loss rate, for example, a margin of 20% is given to RAN_Loss_Rate_PCF. At this time, if (RAN_Loss_Rate_PCF−RAN_Loss_Rate_PCF×0.2)<RAN_Loss_Rate_L1 is satisfied, the CPU 28 determines that the actual communication quality has deteriorated.

The communication quality may also be compared by the PCF3 using the communication quality measured by the BS4.

For example, it may be determined, using the RAN_Latency_BS sent by a signal 70 from the BS4, that if (RAN_Latency_BS+RAN_Latency_PCF)>RAN_Latency_L1, the actually provided communication quality has deteriorated compared with the granted communication quality. It may further be determined, using the RAN_Loss_rate_BS sent by a signal 70 from the BS4, that if (RAN_Loss_rate_BS+RAN_Loss_rate_PCF)>RAN_Loss_rate_L1, the actually provided communication quality has deteriorated compared with the granted communication quality.

When the CPU 28 has detected a deterioration, the QoS level is lowered by one, a comparison is again performed, and the actually provided QoS level is examined. Specifically, the CPU 28 compares the RAN QoS parameters 2 of the table shown in FIG. 30, with the parameters in the line L0 of the RAN QoS parameter 251 shown in FIG. 8. Here, assume that none of
RAN_Ave_Rate_PCF<RAN_Ave_Rate_L0
RAN_Latency_PCF>RAN_Latency_L0 and
RAN_Loss_rate_PCF>RAN_Loss_rate_L0 are satisfied.

The CPU 28 then determines that the actually provided QoS level is L0. The CPU 28 compares the value of the accounting grade 253 for the QoS level L0 in the table of FIG. 8 with the value of the accounting grade 230 for the present flow state specified by Flow ID2 in the table of FIG. 30. Since the value of the accounting grade 253 for the provided quality is Grade 0, and the value of the present accounting grade 230 is Grade 1, which are different, the CPU 28 starts the accounting update process 56. The CPU 28 then records Grade 0 as the accounting grade 230 of the flow specified by Flow ID2.

An example will now be described where the communication quality provided by the PCF3 is measured and compared with the granted communication quality, and, if the provided communication quality has recovered, an accounting update is performed. As described hereinabove, assume that the actual communication quality of the flow specified by Flow ID2 had deteriorated to the quality of QoS level L0. Here, assume that the actual communication quality of the flow specified by Flow ID2 has recovered to the original granted communication quality (quality of QoS level L1).

The CPU 28, in the Step 2, measures the average data rate RAN_Ave_Rate_PCF, peak rate RAN_Peak_Rate_PCF, data loss rate RAN_Loss_Rate_PCF and latency time RAN_Latency_PCF.

The CPU 28 records the actually provided QoS parameter as the RAN QoS parameters 2 of the table shown in FIG. 30. Assume that the RAN QoS parameters 2 have the same parameter structure 200 as the RAN QoS parameters 2'. The CPU 28 records RAN_Peak_Rate_PCF as the RAN_Peak_Rate of the RAN QoS parameters 2. The CPU 28 records RAN_Ave_Rate_PCF as the RAN_Ave_Rate of the RAN QoS parameters 2. The CPU 28 records RAN_Latency_PCF as the RAN_Latency of the RAN QoS parameters 2. The CPU 28 records RAN_Loss_rate_PCF as the RAN_Loss_rate of RAN QoS parameters 2. The CPU 28 records a value RAN_Priority_L1 held as the RAN_Priority of the RAN QoS parameters 2', which is a granted QoS parameter, as the RAN_Priority of the RAN QoS parameters 2.

Next, an example will be described where the CPU 28 of PCF3 detects the recovery of communication quality of the flow specified by Flow ID2. The CPU 28 looks up the granted QoS level 229, and detects whether the granted QoS level for the flow of the Flow ID2 is L1. The CPU 28 compares the RAN QoS parameters 2 of the table shown in FIG. 30, with the parameters in the line L1 of the RAN QoS parameter 251 shown in FIG. 8. The CPU 28 examines for deterioration of communication quality.

Here, assume that none of RAN_Ave_Rate_PCF<RAN_Ave_Rate_L1 RAN_Latency_PCF>RAN_Latency_L1 and RAN_Loss_rate_PCF>RAN_Loss_rate_L1 are satisfied.

The CPU 28 then determines that the communication quality actually provided by the flow of the Flow ID2 has not deteriorated relative to the granted communication quality. Also, when the actually provided communication quality is higher than the granted communication quality (L1), accounting is still performed for the granted communication quality (Grade 1 accounting).

The CPU 28 compares the value of the accounting grade 253 for the granted QoS level L1 in the table of FIG. 8 with the value of the accounting grade 230 for the present flow state specified by the Flow ID2 in the table of FIG. 30. Since the value of the accounting grade 253 for the provided quality is Grade 1, and the value of the current accounting grade 230 is Grade 0, which are different, the CPU 28 starts the accounting update process 58. The CPU 28 then records Grade 1 as the accounting grade 230 of the flow specified by Flow ID2.

Although it differs from the precondition of this example, if one of
RAN_Ave_Rate_PCF<RAN_Ave_Rate_L1,
RAN_Latency_PCF>RAN_Latency_L1 and
RAN_Loss_rate_PCF>RAN_Loss_rate_L1
is satisfied, the control unit 36 lowers the QoS level by one, again performs a comparison, and examines the actually provided QoS level. At this time, the CPU 28 compares the RAN QoS parameters 2 of the table shown in FIG. 30, with the parameters in the line L0 of the RAN QoS parameter 251 shown in FIG. 8. For example, assume that none of RAN_Ave_Rate_PCF<RAN_Ave_Rate_L0, RAN_Latency_PCF<RAN_Latency_L0, and RAN_Loss_rate_PCF>RAN_Loss_rate_L0 are satisfied.

The CPU 28 then determines that the actually provided QoS level is L0. The CPU 28 looks up the accounting grade 253 of QoS level L0, and compares it with the accounting grade 230. Since the value of the accounting grade 253 for the provided quality is Grade 0, and the value of the present accounting grade 230 is Grade 0, which are identical, the CPU 28 determines that the present accounting is suitable. In this case, the CPU 28 does not perform the accounting update process 56.

[Example of Quality Evaluation Method in PDSN]

An example will now be described where the communication quality provided by the PDSN2 is measured, and an accounting update is performed if the present accounting does not match the provided communication quality.

The network operator first sets the data shown in FIG. 8 as data to be set in the memory unit 34 of the BS4, memory unit 27 of the PCF3, memory unit 12 of the PDSN2, and memory unit 42 of the AAA5. Alternatively, the MS7 may transmit a signal which contains the table data of FIG. 8 to the BS4, PCF3 and PDSN2 to request a service, and the BS4, PCF3, and PDSN2 may register the table data of FIG. 8 into their memory units. An example wherein the MS7 transmits a desired QoS parameter to the BS4, PCF3 and PDSN2 to request a service is disclosed by Nonpatent document 2.

Here, assume that there is already a connection between the SI and Flow ID1, which has the identifier SR_ID1 in the MS7, and a connection between the SI and Flow ID2, which has the identifier SR_ID2 is newly set by the signal 51 of FIG. 9. Assume that at this time, the SI of SR_ID1 is QoS level L0, and the SI of SR_ID2 is QoS level L1. After exchange of the signal 51, the control unit 13 of the PDSN2 sets the data for the new flow (Flow ID2) as the table shown in FIG. 31 in the memory unit 12. The control unit 13 sets the flow identifier of Flow ID2 as Flow ID223. The control unit 13 sets the identifier of the SI of Flow ID2, SR_ID2, as SR_ID224. At this stage, the control unit 13 does not set a field 231 which stores the actually provided QoS parameter. The control unit 13 sets a field 234 which stores the granted QoS parameter. The control unit 13 sets the QoS parameter granted for the flow of Flow ID2 in 238 as the RAN QoS parameter 2', and sets the data length of the RAN QoS parameter 2' in 237 in the line corresponding to Flow ID2.

Since the SI of SR_ID2 is QoS level L1, the parameters shown by the RAN QoS parameter 251 in the line in the table shown in FIG. 8 for which the QoS level 250 is L1, are set as the RAN QoS parameters 2'. The control unit 13 sets L1 in 239 in the line corresponding to Flow ID2 as the QoS level granted for the flow of Flow ID2. The control unit 13 sets Grade1 in 240 in the line corresponding to Flow ID2 as the accounting grade of the flow of Flow ID2.

An example of measurement of data rate by the PDSN2 will now be described. Transmission of user data between the IP NW1 and PDSN2 is performed by IP packets. Assume that the control unit 13 of the PDSN2 looks up the control data of the received IP packets, and detects that the received packets are data for Flow ID2.

The control unit 13 first accumulates the received packets of Flow ID2 in the memory unit 12, and assembles A10 packets. The PDSN2 transmits the A10 packets to the transmission path via the NW IF11. The control unit 13 counts user data for the A10 packets of Flow ID2, which is the number of bytes of data which have been transmitted to the transmission path, for a certain time. The control unit 13 measures the time to count the number of bytes by use of a timer 15. The control unit 13 computes the average data rate RAN_Ave_Rate_PDSN by dividing this number of bytes by the counting time. Also, the control unit 13 takes a much shorter time to count the number of bytes by the timer 15, and computes the data rate by the same procedure. The maximum value of the data rate within this fixed time is taken as the peak rate RAN_Peak_Rate_PDSN. An example wherein the data loss rate is measured by the PDSN2, will now be described. Transmission of user data between the IP NW1 and PDSN2 is performed by IP packets. Assume that the control unit 13 of the PDSN2 looks up the control data of the received IP packets and detects that the received packets are data for Flow ID2. The control unit 13 first accumulates the received packets of Flow ID2 in the memory unit 12 and assembles A10 packets. The PDSN2 transmits the A10 packets to the transmission path via the NW IF11. If space is lost in a region of the memory unit 12, the control unit 13 will discard the received packets of Flow ID2 accumulated in the memory unit 12. The control unit 13 counts user data for the received packets of Flow ID2, which count representes the number of bytes of lost data and the number of bytes of data accumulated in the memory unit 12. The control unit 13 computes the average data loss rate RAN_Loss_Rate_PDSN by dividing the number of lost bytes by the number of accumulated data bytes.

A case will now be described where the latency time of user data is measured as the latency time in the PDSN2. Transmission of user data between the IP NW1 and PDSN2 is performed by IP packets. Assume that the control unit 13 of the PDSN2 looks up the control data of the received IP packets and detects that the received packets are data for the Flow ID2. The control unit 13 first accumulates the received packets of Flow ID2 in the memory unit 12 and assembles A10 packets. The PDSN2 transmits the A10 packets to the transmission path via the NW IF11. The memory unit 13 measures a time T1 of the timer 15 for which the received packets of Flow ID2 were accumulated in the memory unit 13, as well as a time T2 for which A10 packets assembled from the user data of these received packets were outputted into the NW IF11. The control unit 13 computes a latency time RAN_Latency_PDSN in the PDSN2 by subtracting T1 from T2.

The control unit 13 records the actually provided QoS parameters as RAN QoS parameters 2 of the table shown in FIG. 31. Assume that the RAN QoS parameters 2 have the same parameter structure 200 as the RAN QoS parameters 2'. The control unit 13 records RAN_Peak_Rate_PDSN as the RAN_Peak_Rate of the RAN QoS parameters 2. The control unit 13 records RAN_Ave_Rate_PDSN as the RAN_Ave_Rate of the RAN QoS parameters 2. The control unit 13 records RAN_Latency_PDSN as the RAN_Latency of the RAN QoS parameters 2. The control unit 13 records RAN_Loss_rate_PDSN as the RAN_Loss_rate of RAN QoS parameters 2. The control unit 13 records a value RAN_Priority_L1 held as the RAN_Priority of the RAN QoS parameters 2', which is a granted QoS parameter, as the RAN_Priority of the RAN QoS parameters 2.

Next, an example will be described where the control unit 13 of the PDSN2 detects a deterioration of communication quality of the flow specified by Flow ID2. The control unit 13 looks up the granted QoS level 239, and it detects whether the granted QoS level for the Flow ID2 is L1. The control unit 13 compares the RAN QoS parameters 2 of the table shown in FIG. 31 with the parameters in the line L1 of the RAN QoS parameter 251 shown in FIG. 8. If any one of
RAN_Ave_Rate_PDSN<RAN_Ave_Rate_L1,
RAN_Latency_PDSN>RAN_Latency_L1 and
RAN_Loss_rate_PDSN>RAN_Loss_rate_L1 are satisfied, it is determined that the communication quality actually provided has deteriorated compared with the granted communication quality.

In the comparison of latency time, the part of the RAN_Latency_L1 assigned to the PDSN is compared to the latency time in the PDSN.

For example, 20% of the RAN_Latency_L1 is taken as the PDSN assignment part. If RAN_Latency_PDSN>(RAN_Latency_L 1×0.2) is satisfied instead of RAN_Latency_PDSN>RAN_Latency_L1, the control unit 36 determines that the actual communication quality has deteriorated.

A margin may be allotted and compared with the data rate or data loss rate. For data rate, for example, a margin of 25% is given to RAN_Ave_Rate_PDSN. At this time, if (RAN_Ave_Rate_PDSN+RAN_Ave_Rate_PDSN×0.25)<RAN_Ave_Rate_L1 is satisfied, the control unit 13 determines that the actual communication quality has deteriorated. For data loss rate, for example, a margin of 10% is given to RAN_Loss_Rate_PDSN. At this time, if (RAN_Loss_Rate_PDSN−RAN_Loss_Rate_PDSN×0.15)<RAN_Loss_Rate_L1 is satisfied, the control unit 13 determines that the actual communication quality has deteriorated.

The communication quality may also be compared by the PDSN2 using the communication quality measured by the BS4 and PCF3.

For example, it may be determined, using the RAN_Latency_PCF sent by signals 74 from the PCF3, that if (RAN_Latency_PCF+RAN_Latency_PDSN)>RAN_Latency_L1, the actually provided communication quality has deteriorated compared with the granted communication quality. For example, it may also be determined, using the RAN_Loss-rate_PCF sent by signals 74 from the PCF3, that if (RAN_Loss_rate_PCF+RAN_Loss_rate_PDSN)>RAN_Loss_rate_L1, the actually provided communication quality has deteriorated compared with the granted communication quality.

When the control unit 13 has detected a deterioration, the QoS level is lowered by one, a comparison is again performed, and the actually provided QoS level is examined. Specifically, the control unit 13 compares the RAN QoS parameters 2 of the table shown in FIG. 31, with the parameters in the line L0 of the RAN QoS parameter 251 shown in FIG. 8. Here, assume that none of
RAN_Ave_Rate_PDSN<RAN_Ave_Rate_L0,
RAN_Latency_PDSN>RAN_Latency_L0 and
RAN_Loss_rate_PDSN>RAN_Loss_rate_L0 are satisfied.

The control unit 13 then determines that the actually provided QoS level is L0. The control unit 13 compares the value of the accounting grade 253 for the QoS level L0 in the table of FIG. 8 with the value of the accounting grade 240 for the present flow state specified by the Flow ID2 in the table of FIG. 31. Since the value of the accounting grade 253 for the provided quality is Grade 0, and the value of the present accounting grade 240 is Grade 1, which are different, the control unit 13 starts the accounting update process 56. The control unit 13 then records Grade 0 as the accounting grade 240 of the flow specified by Flow ID2.

An example will now be described where the communication quality provided by the PDSN2 is measured and compared with the granted communication quality, and if the provided communication quality has recovered, an accounting update is performed. As described in the aforesaid example, it will be assumed that the actual communication quality of the flow specified by Flow ID2 had deteriorated to the quality of QoS level L0.

Here, assume that the actual communication quality of the flow specified by Flow ID2 has recovered to the original granted communication quality (quality of QoS level L1).

The control unit 13 measures the average data rate RAN_Ave_Rate_PDSN, peak rate RAN_Peak_Rate_PDSN, data loss rate RAN_Loss_Rate_PDSN and latency time RAN_Latency_PDSN. The control unit 13 records the actually provided QoS parameters as the RAN QoS parameters 2 of the table shown in FIG. 31. Assume that the RAN QoS parameters 2 have the same parameter structure 200 as the RAN QoS parameters 2'. The control unit 13 records RAN_Peak_Rate_PDSN as the RAN_Peak_Rate of the RAN QoS parameters 2. The control unit 13 records RAN_Ave_Rate_PDSN as the RAN_Ave_Rate of the RAN QoS parameters 2. The control unit 13 records RAN_Latency_PDSN as the RAN_Latency of the RAN QoS parameters 2. The control unit 13 records RAN_Loss_rate_PDSN as the RAN_Loss_rate of the RAN QoS parameters 2. The control unit 13 records a value RAN_Priority_L1 held as the RAN_Priority of the RAN QoS parameters 2', which is a granted QoS parameter, as the RAN_Priority of the RAN QoS parameters 2.

Next, an example will be described where the control unit 13 of PDSN2 detects the recovery of communication quality of the flow specified by Flow ID2. The control unit 13 looks up the granted QoS level 239, and it detects whether the granted QoS level for the flow of Flow ID2 is L1. The control unit 13 compares the RAN QoS parameters 2 of the table shown in FIG. 31, with the parameters in the line L1 of the RAN QoS parameter 251 shown in FIG. 8.

The control unit 13 examines for deterioration of communication quality. Here, assume that none of RAN_Ave_Rate_PDSN<RAN_Ave_Rate_L1 RAN_Latency_PDSN>RAN_Latency_L1 and RAN_Loss_rate_PDSN>RAN_Loss_rate_L1 are satisfied. The control unit 13 then determines that the communication quality actually provided by the flow of the Flow ID2 has not deteriorated relative to the granted communication quality. Also, when the actually provided communication quality is higher than the granted communication quality (L1), accounting is performed for the actually provided communication quality (Grade 1 accounting).

The control unit 13 compares the value of the accounting grade 253 for the granted QoS level L1 in the table of FIG. 8 with the value of the accounting grade 240 for the present flow state specified by the Flow ID2 in the table of FIG. 31. Since the value of the accounting grade 253 for the provided quality is Grade 1, and the value of the present accounting grade 240 is Grade 0, which are different, the control unit 13 starts the accounting update process 58. The control unit 13 then records Grade 1 as the accounting grade 240 of the flow specified by Flow ID2.

Although it differs from the precondition of this example, if one of
RAN_Ave_Rate_PDSN<RAN_Ave_Rate_L1,
RAN_Latency_PDSN>RAN_Latency_L1 and
RAN_Loss_rate_PDSN>RAN_Loss_rate_L1 is satisfied, the control unit 13 lowers the QoS level by one, again performs a comparison, and examines the actually provided QoS level. At this time, the control unit 13 compares the RAN QoS parameters 2 of the table shown in FIG. 31, with the parameters in the line L1 of the RAN QoS parameter 251 shown in FIG. 8.

For example, assume that none of
RAN_Ave_Rate_PDSN<RAN_Ave_Rate_L0,
RAN_Latency_PDSN<RAN_Latency_L0 and
RAN_Loss_rate_PDSN>RAN_Loss_rate_L0 are satisfied.
The control unit 13 then determines that the actually provided QoS level is L0. The control unit 13 looks up the accounting grade 253 of QoS level L0 and compares it with the accounting grade 240.

Since the value of the accounting grade 253 for the provided quality is Grade 0, and the value of the present accounting grade 240 is Grade 0, which are identical, the control unit 13 determines that the present accounting is suitable. In this case, the control unit 13 does not perform the accounting update process 58.

[Example of Quality Evaluation Method in BS (Average Value)]

Figure 35:
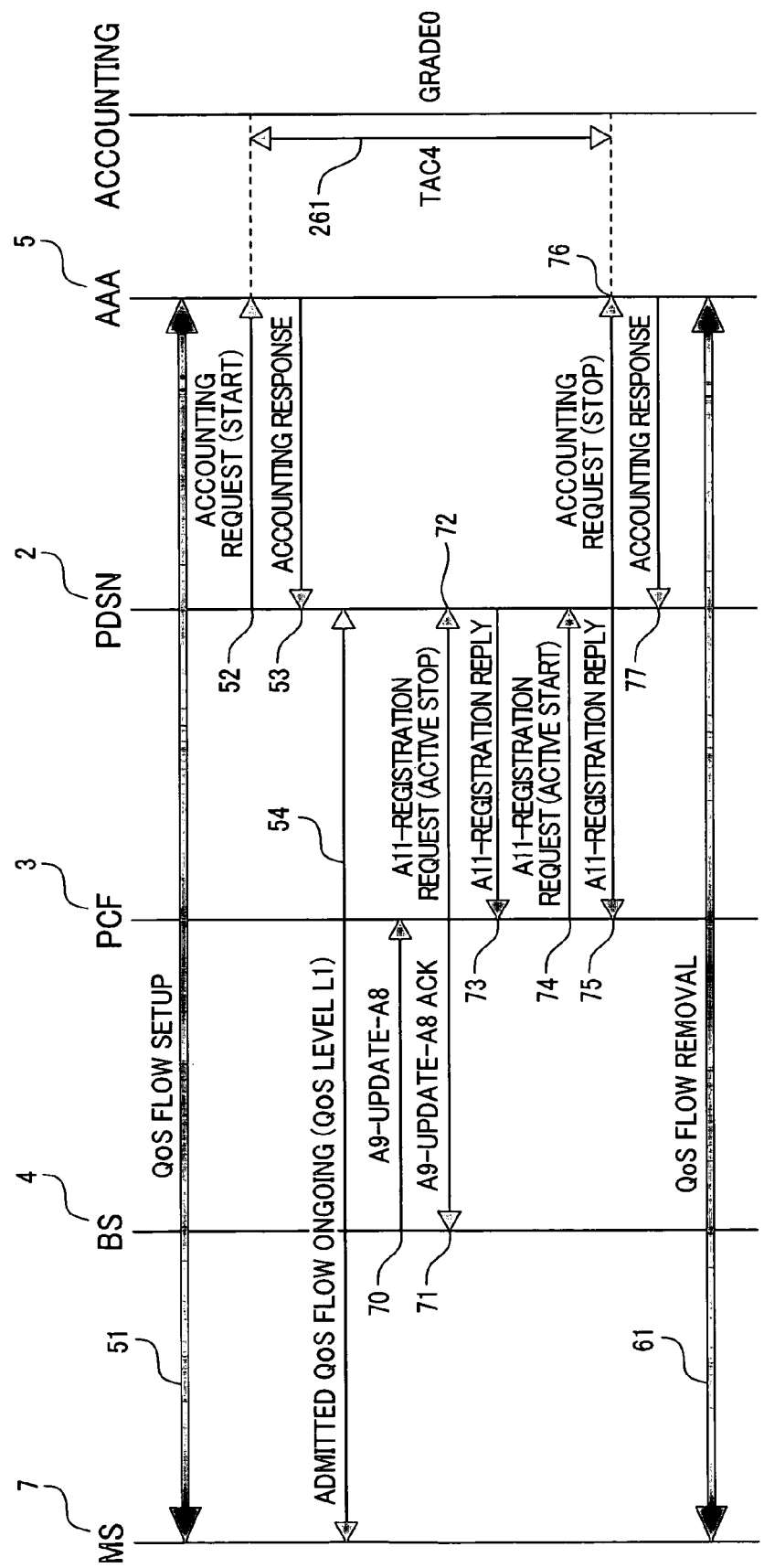
FIG. 35 is a process flow diagram which shows an example of the accounting process call flow according to the present invention.

An example wherein the average value of communication quality is monitored by the BS4, and, when the average value of communication quality cannot satisfy the required communication quality, as accounting update is performed, is shown in FIG. 35.

The flow setup of the QoS parameter required by the MS7 is performed by the signal 51. The signal 51 comprises plural signals, and the exchange procedure follows, for example, the call flow of Annex F, X.P0011-004-D, v0.4. After exchange of the signal 51, the MS7, BS4, PCF3 and PDSN2 hold tables of the QoS parameters required by the MS7 and the granted QoS parameters for each flow. Here, it will be assumed that the MS7 requests a flow of QoS level L1, and that the request was accepted so that a flow of QoS level 1 having the identifier of Flow ID2 is set up. The PDSN2 transmits a message for an accounting start request to the AM5 by a signal 52. The AM5 starts accounting by referring to the QoS parameter contained in the signal 52.

Since the granted QoS level is L1, the AAA5 begins Grade 1 accounting in proportion to the connect time. The AAA5 transmits a response message to the signal 52, to the PDSN2 by a signal 53.

In a Step 54, at least one of the BS4, PCF3 and PDSN2 monitors the communication quality in the period in which user data is transmitted and received, and the average value of the communication quality is calculated. Here, in the Step 54, the BS4 calculates the average value of the communication quality in the period in which user data is transmitted and received.

The BS4 transmits the average value of the actual communication quality to the AAA5 by exchange of the signals 70, 71, 72, 73, 74, 75, 76, 77. The AAA5 performs accounting based on the average value of the actual communication quality. In this example, a case will be described where accounting is performed at the accounting level of Grade 0 based on the average value of the communication quality even for a flow having a granted QoS level of L2. Cancellation of the flow specified by Flow ID2 is performed by the signal 61. The signal 61 comprises plural signals, and the exchange procedure follows, for example, the call flow of Annex F, X.P0011-004-D, v0.4.

The control unit 36 of the BS4 measures the average values of the average data rate RAN_Ave_Rate_BS, data loss rate RAN_Loss_Rate_BS and latency time RAN_Latency_BS of the data transmission/reception period in the Step 54. The control unit 36 records the average value of the communication quality as the RAN QoS parameters 2 of the table shown in FIG. 30. Assume that the RAN QoS parameters 2 have the same parameter structure 200 as the RAN QoS parameters 2'. The control unit 36 records the average value of RAN_Ave_Rate_BS as the RAN_Ave_Rate of the RAN QoS parameters 2. The control unit 36 records the average value of RAN_Latency_BS as the RAN_Latency of the RAN QoS parameters 2. The control unit 36 records the average value of RAN_Loss_rate_BS as the RAN_Loss_rate of the RAN QoS parameters 2.

The control unit 36 looks up the granted QoS level 229, and it determines that the granted QoS level for the Flow ID2 is L1.

The control unit 36 compares the RAN QoS parameters 2 of the table shown in FIG. 30, with the parameters in the line L1 of the RAN QoS parameter 251 shown in FIG. 8. If any one of RAN_Ave_Rate<RAN_Ave_Rate_L1, RAN_Latency>RAN_Latency_L1 and RAN_Loss_rate>RAN_Loss_rate L1 is satisfied, the control unit 36 determines that the actually provided communication quality has deteriorated compared with the granted communication quality.

In the comparison of latency time, the part of the RAN_Latency_L1 assigned to the BS is compared to the latency time in the BS.

For example, 10% of the RAN_Latency_L1 is taken as the part assigned to the BS. If RAN_Latency>(RAN_Latency_L1×0.1) is satisfied instead of RAN_Latency>RAN_Latency_L1, the control unit 36 determines that the actual communication quality has deteriorated. A margin may be allotted and compared with the data rate or data loss rate. For data rate, for example, a margin of 10% is given to RAN_Ave_Rate. At this time, if (RAN_Ave_Rate_BS+RAN_Ave_Rate_BS×0.1)<RAN_Ave_Rate_L1 is satisfied, the control unit 36 determines that the actual communication quality has deteriorated.

For data loss rate, for example, a margin of 10% is given to RAN_Loss_Rate. At this time, if (RAN_Loss_Rate_BS−RAN_Loss_Rate_BS×0.1)<RAN_Loss_Rate_L1 is satisfied, the control unit 36 determines that the actual communication quality has been deteriorated.

When the control unit 36 has detected a deterioration, the QoS level is lowered by one, a comparison is again performed, and the actually provided QoS level is examined. Specifically, the control unit 36 compares the RAN QoS parameters 2 of the table shown in FIG. 30 with the parameters in the line L0 of the RAN QoS parameter 251 shown in FIG. 8. Here, assume that none of RAN_Ave_Rate<RAN_Ave_Rate_L0, RAN_Latency>RAN_Latency_L0 and RAN_Loss_rate>RAN_Loss_rate_L0 are satisfied. The control unit 36 then determines that the actually provided QoS level is L0.

The control unit 36 compares the value of the accounting grade 253 for the QoS level L0 in the table of FIG. 8 with the value of the accounting grade 230 for the present flow state specified by Flow ID2 in the table of FIG. 30. Since the value of the accounting grade 253 for the provided quality is Grade 0, and the value of the present accounting grade 230 is Grade 1, which are different, the control unit 36 starts the accounting update process. The control unit 36 records Grade 0 as the accounting grade 230 of the flow specified by Flow ID2.

The BS4 sends a signal 70 containing actual communication quality data 175 to the PCF3. The control unit 36 sets the RAN QoS parameters 2 of the table shown in FIG. 30 as the data 175. The PCF3 sends a response 71 to the signal 70 to the BS4. The PCF3 transmits a signal 72 which shows that the QoS parameter was updated, to the PDSN2. The PDSN2 transmits a response 73 to the signal 72 to the PCF3. The PCF3 copies the actual communication quality data 175 contained in the signal 70, to 168 of a signal 74. Alternatively, the PCF3 may add the actual communication quality data 175 contained in the signal 70 to the communication quality data measured by the PCF3, and set it as 168 of the signal 74. Here, for example, the PCF3 adds the latency time measured by the PCF3 to the latency time measured by the BS4 contained in the data 175, and sets it as 168. The PCF3 may also, for example apply the data loss rate measured by the PCF3 to the data loss rate measured by the BS4 contained in the data 175 and set it in 168. The PCF3 transmits the signal 74 to the PDSN2. The PDSN2 transmits a message which requests stop of the previous accounting to the AAA5 by means of a signal 76. The AAA5 transmits a response 77 to the signal 76 to the PDSN2.

The PDSN2 copies the actual communication quality data 168, contained in the signal 74, to 126 of the signal 76. Alternatively, the PDSN2 may add the communication quality data measured by the PDSN2 to the actual communication quality data 168 contained in the signal 74, and set it as 126 of the signal 76. Here, for example, the PDSN2 adds the latency time measured by the PDSN2 to the latency time contained in 168 and sets it as 126. The PDSN2 also, for example, adds the data loss rate measured by the PDSN2 to the data loss rate contained in the data 168, and sets it as 126. The AAA5 performs accounting based on the actual communication quality data 168 of the signal 76.

A message shown in FIG. 13 is inputted into the NW IF41 of the AAA5 by means of the signal 76. The control unit 43 of the AAA5 analyzes the data contained in the message shown in FIG. 13, and generates the table of FIG. 36. MS ID255 is an identifier of the MS. Here, assume the identifier of the MS7, for which accounting is being performed, is MS_ID1. A SR ID256 is an identifier of the SI. Assume that the identifier of the SI for which accounting is being performed is SR_ID2. BS ID257 is an identifier of the BS3 to which the MS7 connects. Here, assume that the identifier of the BS3 is BS_ID1. The Active Time 258 is the effective connect time.

Here, assume that the MS7 performs the communication shown in FIG. 35. The Active Time 258 is the effective connect time Tac4 of a period 261. The Accounting Grade 259 is the accounting grade computed from the actual communication quality. The control unit 43 compares the measured value 126 of the communication QoS contained in the message with the communication quality 251 recorded in the memory unit 42, and it computes the accounting grade. The control unit 43 records Grade 0 in 259 as the accounting grade of the period 261.

The control unit 43 performs accounting using Accounting Grade 259 computed from the actual communication QoS. The control unit 43 calculates Tac4*F (Grade 0) as the accounting amount.

F(x) is a function of the unit time accounting amount relative to an argument of accounting grade x. The providing company then requests the accounting amount calculated by the AAA5 from the user of the MS7.

[Example of Quality Evaluation Method in PCF]

Figure 37:
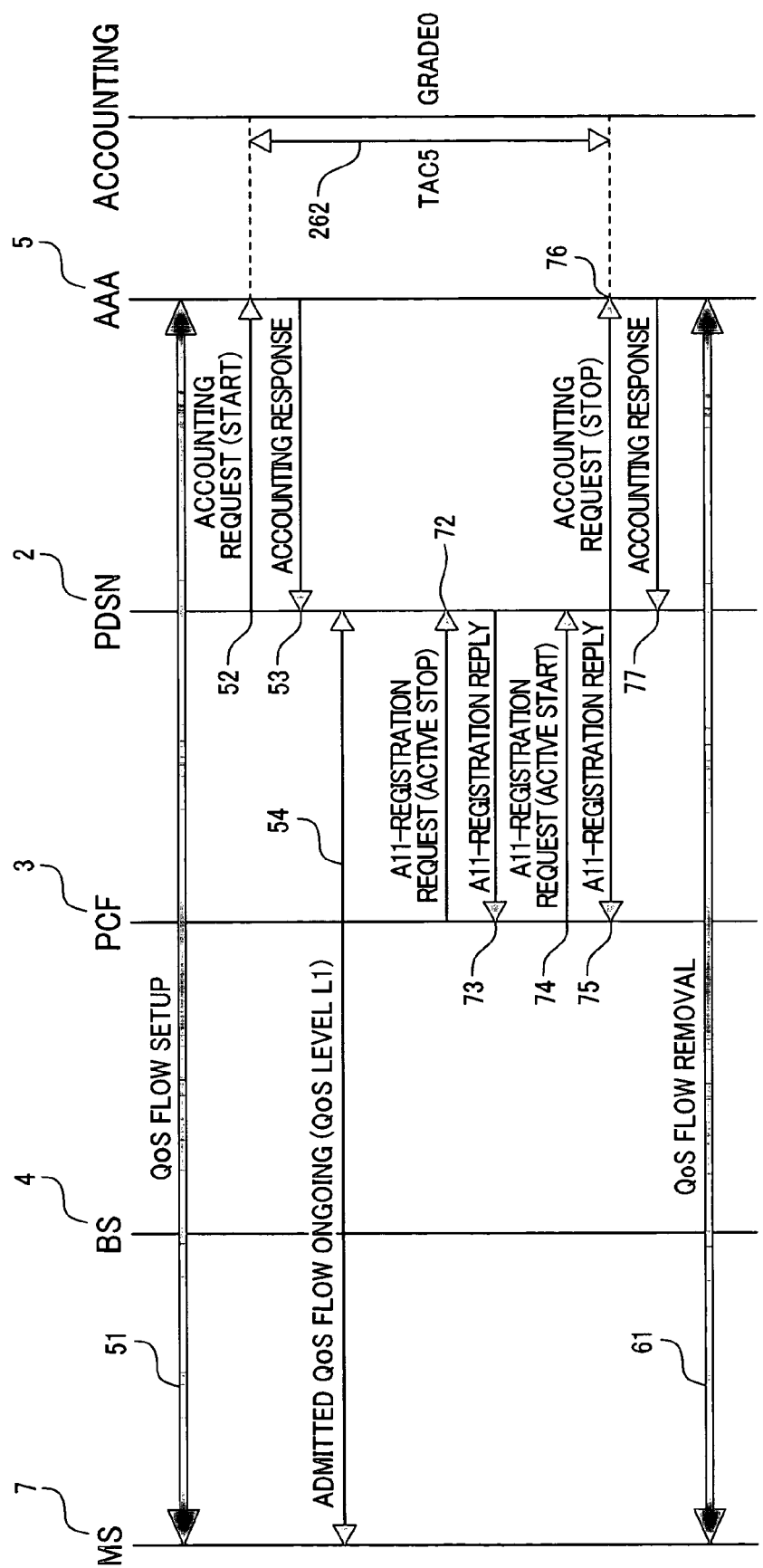
FIG. 37 is a process flow diagram which shows an example of the accounting process call flow according to the present invention.

An example wherein the average value of the communication quality is monitored by the PCF3, and, when the average value of the communication quality cannot satisfy the required communication quality, an accounting update is performed, as shown in FIG. 37. The flow setup of the QoS parameter required by the MS7 is performed by the signal 51. The signal 51 comprises plural signals, and the exchange procedure follows, for example, the call flow of Annex F, X.P0011-004-D, v0.4. After exchange of the signal 51, the MS7, BS4, PCF3 and PDSN2 hold tables of the QoS parameters required by the MS7 and the granted QoS parameters for each flow. Here, it will be assumed that the MS7 requests a flow of QoS level L1, and the request was accepted, so that a flow of QoS level 1 having the identifier of Flow ID2 is set up. The PDSN2 transmits the message for an accounting start request to the AAA5 by the signal 52. The AAA5 starts accounting, referring to the QoS parameters contained in 52.

Since the granted QoS level is L1, the AAA5 begins Grade 1 accounting in proportion to the connect time. The AAA5 transmits a response message to the signal 52, to the PDSN2 by means of a signal 53. In the Step 54, at least one of the BS4, PCF3 and PDSN2 monitors the communication quality in the period in which user data is transmitted and received, and the average value of the communication quality is calculated. Here, the PCF3 calculates the average value of communication quality in the period in which user data is transmitted and received by means of the signal 54.

The PCF3 transmits the average value of the actual communication quality to the AAA5 by exchange of the signals 70, 71, 72, 73, 74, 75, 76, 77. The AAA5 performs accounting based on the average value of the actual communication quality. In this example, a case will be described where accounting is performed at the accounting level of Grade 0 based on the average value of communication quality even for a flow having a granted QoS level of L2. Cancellation of the flow specified by Flow ID2 is performed by the signal 61. The signal 61 comprises plural signals, and the exchange procedure follows, for example, the call flow of Annex F, X.P0011-004-D, v0.4.

The CPU 28 of the PCF3 measures the average values of the average data rate RAN_Ave_Rate_PCF, data loss rate RAN_Loss_Rate_PCF and latency time RAN_Latency_PCF of the data transmission/reception period in the signal 54. The CPU 28 records the average value of the communication quality as the RAN QoS parameters 2 of the table shown in FIG. 30. Assume that the RAN QoS parameters 2 have the same parameter structure 200 as the RAN QoS parameters 2'. The CPU 28 records the average value of RAN_Ave_Rate_PCF as the RAN_Ave_Rate of the RAN QoS parameters 2. The CPU 28 records the average value of RAN_Latency_PCF as the RAN_Latency of the RAN QoS parameters 2. The CPU 28 records the average value of RAN_Loss_rate_PCF as the RAN_Loss_rate of RAN QoS parameters 2.

The CPU 28 looks up the granted QoS level 229, and determines that the granted QoS level for the Flow ID2 is L1.

The control unit 36 compares the RAN QoS parameters 2 of the table shown in FIG. 30 with the parameters in the line L1 of the RAN QoS parameter 251 shown in FIG. 8.

If any one of RAN_Ave_Rate_BS<RAN_Ave_Rate_L1, RAN_Latency_BS>RAN_Latency_L1 and
RAN_Loss_rate_BS>RAN_Loss_rate_L1 are satisfied, the control unit 36 determines that the communication quality actually provided has deteriorated compared with the granted communication quality.

In the comparison of latency time, the part of the RAN_Latency_L1 assigned to the BS is compared to the latency time in the BS. For example, 10% of the RAN_Latency_L1 is taken as the part assigned to the PCF. If RAN_Latency>(RAN_Latency_L 1×0.1) is satisfied instead of RAN_Latency>RAN_Latency_L1, the CPU 28 determines that the actual communication quality has deteriorated.

A margin may be allowed and compared with the data rate or data loss rate. For data rate, for example, a margin of 10% is given to the RAN_Ave_Rate. At this time, if (RAN_Ave_Rate_BS+RAN_Ave_Rate_BS×0.1)<RAN_Ave_Rate_L1 is satisfied, the CPU 28 determines that the actual communication quality has deteriorated. For data loss rate, for example, a margin of 10% is given to the RAN_Loss_Rate. At this time, if (RAN_Loss_Rate_BS−RAN_Loss_Rate_BS×0.1)< RAN_Loss_Rate_L1 is satisfied, the CPU 28 determines that the actual communication quality has deteriorated.

When the CPU 28 has detected a deterioration, the QoS level is lowered by one, a comparison is again performed, and the actually provided QoS level is examined. Specifically, the CPU 28 compares the RAN QoS parameters 2 of the table shown in FIG. 30 with the parameters in the line L0 of the RAN QoS parameter 251 shown in FIG. 8. Here, assume that none of RAN_Ave_Rate<RAN_Ave_Rate_L0, RAN_Latency>RAN_Latency_L0, and RAN_Loss_rate>RAN_Loss_rate_L0 are satisfied. The CPU 28 then determines that the actually provided QoS level is L0. The CPU 28 compares the value of the accounting grade 253 for the QoS level L0 in the table of FIG. 8 with the value of the accounting grade 230 for the present flow state specified by Flow ID2 in the table of FIG. 30. Since the value of the accounting grade 253 for the provided quality is Grade 0, and the value of the present accounting grade 230 is Grade 1, which are different, the CPU 28 starts an accounting update process. The CPU 28 records Grade 0 as the accounting grade 230 of the flow specified by Flow ID2.

The PCF3 transmits a signal 72, showing that the QoS parameter was changed, to the PDSN2. The PDSN2 transmits a response 73 to the signal 72, to the PCF3. The PCF3 transmits a signal 74 containing the data 168 of actual communication quality to the PDSN2. The CPU 28 sets the RAN QoS parameters 2 of the table shown in FIG. 30 as the data 168. The PDSN2 transmits a message which requests a stopping of the previous accounting to the AAA5 by means of a signal 76. The AAA5 transmits a response 77 to the signal 76, to the PDSN2. The PDSN2 copies the actual communication quality data 168 contained in the signal 74, to 126 of the signal 76. Alternatively, the PDSN2 may add the communication quality data measured by the PDSN2 to the actual communication quality data 168 contained in the signal 74, and set it as 126 of the signal 76. Here, for example, the PDSN2 adds the latency time measured by the PDSN2 to the latency time contained in 168, and sets it as 126. The PDSN2 also, for example, adds the data loss rate measured by the PDSN2 to the data loss rate contained in the data 168, and sets it as 126. The AAA5 performs accounting based on the actual communication quality data 168 of the signal 76. A message shown in FIG. 13 is inputted into the NW IF41 of the AAA5 by means of the signal 76. The control unit 43 of the AAA5 analyzes the data contained in the message shown in FIG. 13, and generates the table of FIG. 36. MS ID255 is an identifier of the MS. Here, assume that the identifier of the MS7, for which accounting is being performed, is MS_ID1. SR ID256 is an identifier of the SI. Assume that the identifier of the SI for which accounting is being performed is SR_ID2. BS ID257 is an identifier of the BS3 to which the MS7 connects. Here, assume that the identifier of the BS3 is BS_ID1. The Active Time 258 is the effective connect time. Here, assume that the MS7 performs the communication shown in FIG. 35. The Active Time 258 is the effective connect time Tac4 of the period 262. The Accounting Grade 259 is the accounting grade computed from the actual communication quality. The control unit 43 compares the measured value 126 of the communication QoS contained in the message with the communication quality 251 recorded in the memory unit 42, and it computes the accounting grade. The control unit 43 records Grade 0 in 259 as the accounting grade of the period 262.

The control unit 43 performs accounting using the accounting grade 259 computed from the actual communication QoS. The control unit 43 calculates Tac5*F (Grade 0) as the accounting amount. F(x) is a function of unit time accounting amount relative to an argument of accounting grade x. The providing company requests the accounting amount calculated by the AAA5 from the user of the MS7.

[Example of Quality Evaluation Method in PDSN (Average Value)]

Figure 38:
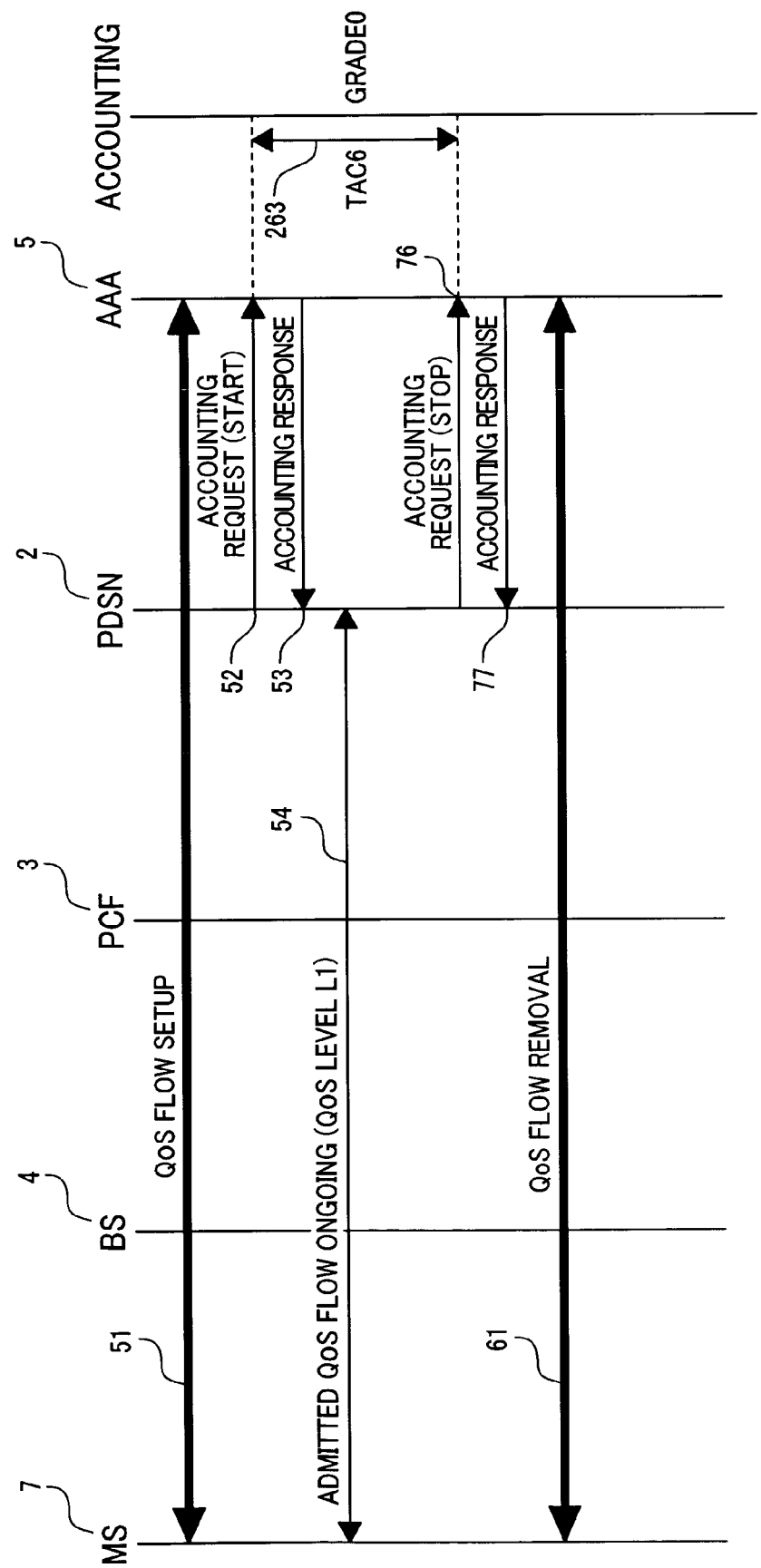
FIG. 38 is a process flow diagram which shows an example of the accounting process call flow according to the present invention.

An example wherein the average value of the communication quality is monitored by the PDSN2, in the case where the average value of communication quality cannot satisfy the required communication quality, and an accounting update is performed, is shown in FIG. 38. The flow setup of the QoS parameter required by the MS7 is performed by the signal 51. The signal 51 comprises plural signals, and the exchange procedure follows for example, the call flow of Annex F, X.P0011-004-D, v0.4. After exchange of the signal 51, the MS7, BS4, PCF3 and PDSN2 hold tables of the QoS parameters required by the MS7 and the granted QoS parameters for each flow. Here, it will be assumed that the MS7 requests a flow of QoS level L1, and the request was accepted, so that a flow of QoS level 1 having the identifier of Flow ID2 is set up. The PDSN2 transmits the message for an accounting start request to the AAA5 by the signal 52. The AAA5 starts accounting by referring to the QoS parameter contained in 52.

Since the granted QoS level is L1, the AAA5 begins Grade 1 accounting in proportion to the connect time. The AAA5 transmits a message, in response to the signal 52, to the PDSN2 by the signal 53. In the Step 54, at least one of the BS4, PCF3 and PDSN2 monitors the communication quality in the period in which user data is transmitted and received, and the average value of the communication quality is calculated. Here, the PDSN2 calculates the average value of communication quality in the period in which user data is transmitted and received by means of the signal 54.

The PDSN2 transmits the average value of the actual communication quality to the AAA5 by exchange of the signals 76 and 77. The AAA5 performs accounting based on the average value of the actual communication quality. In this example, a case will be described where accounting is performed at the accounting level of Grade 0 based on the average value of communication quality even for a flow having a granted QoS level of L2. Cancellation of the flow specified by Flow ID2 is performed by the signal 61. The signal 61 comprises plural signals, and the exchange procedure follows, for example, the call flow of Annex F, X.P0011-004-D, v0.4.

The control unit 13 of the PDSN2 measures the average values of the average data rate RAN_Ave_Rate_PDSN2, data loss rate RAN_Loss_Rate_PDSN2 and latency time RAN_Latency_PDSN2 of the data transmission/reception period of the signal 54. The CPU 28 records the average value of the communication quality as the RAN QoS parameters 2 of the table shown in FIG. 31. Assume that the RAN QoS parameters 2 have the same parameter structure 200 as the RAN QoS parameters 2'. The control unit 13 records the average value of RAN_Ave_Rate_PDSN as the RAN_Ave_Rate of the RAN QoS parameters 2. The control unit 13 records the average value of RAN_Latency_PDSN as the RAN_Latency of the RAN QoS parameters 2. The control unit 13 records the average value of RAN_Loss_rate_BS as the RAN_Loss_rate of the RAN QoS parameters 2.

The control unit 13 looks up the granted QoS level 239, and determines that the granted QoS level for the Flow ID2 is L1.

The control unit 13 compares the RAN QoS parameters 2 of the table shown in FIG. 31, with the parameters in the line L1 of the RAN QoS parameter 251 shown in FIG. 8. If any one of RAN_Ave_Rate<RAN_Ave_Rate_L1, RAN_Latency>RAN_Latency_L1 and RAN_Loss_rate>RAN_Loss_rate L1 is satisfied, the control unit 13 determines that the actually provided communication quality has deteriorated compared with the granted communication quality.

In the comparison of latency time, the part of the RAN_Latency_L1 assigned to the PDSN is compared to the latency time in the PDSN.

For example, 10% of the RAN_Latency_L1 is taken as the part assigned to PDSN. If RAN_Latency>(RAN_Latency_L1×0.1) is satisfied instead of RAN_Latency>RAN_Latency_ L1, the CPU 28 determines that the actual communication quality has deteriorated.

A margin may be allowed and compared with the data rate or data loss rate. For data rate, for example, a margin of 10% is given to RAN_Ave_Rate. At this time, if (RAN_Ave_Rate_BS+RAN_Ave_Rate_BS×0.1)<RAN_Ave_Rate_L1 is satisfied, the control unit 13 determines that the actual communication quality has deteriorated. For data loss rate, for example, a margin of 10% is given to RAN_Loss_Rate.

At this time, if (RAN_Loss_Rate_BS−RAN_Loss_Rate_BS×0.1)<RAN_Loss_Rate_L1 is satisfied, the control unit 13 determines that the actual communication quality has deteriorated.

When the control unit 13 has detected a deterioration, the QoS level is lowered by one, a comparison is again performed, and the actually provided QoS level is examined. Specifically, the control unit 13 compares the RAN QoS parameters 2 of the table shown in FIG. 31, with the parameters in the line L0 of the RAN QoS parameter 251 shown in FIG. 8. Here, assume that none of RAN_Ave_Rate<RAN_Ave_Rate_L0, RAN_Latency>RAN_Latency_L0 and RAN_Loss_rate>RAN_Loss_rate_L0 are satisfied. The control unit 13 then determines that the actually provided QoS level is L0.

The control unit 13 compares the value of the accounting grade 253 for the QoS level L0 in the table of FIG. 8 with the value of the accounting grade 240 for the present flow state specified by the Flow ID2 in the table of FIG. 31. Since the value of the accounting grade 253 for the provided quality is Grade 0, and the value of the current accounting grade 240 is Grade 1, which are different, the control unit 13 starts the accounting update process. The control unit 13 records Grade 0 as the accounting grade 240 of the flow specified by Flow ID2.

The PDSN2 transmits a message, which requests stop of the previous accounting containing data 126 for the actual communication quality, to the AAA5 by means of a signal 76. The AAA5 transmits a response 77 to the signal 76, to the PDSN2.

The control unit 13 sets the RAN QoS parameters 2 of the table shown in FIG. 31 as the data 126. The AAA5 performs accounting based on the actual communication quality data 168 of the signal 76.

A message shown in FIG. 13 is inputted into the NW IF41 of the AAA5 by means of the signal 76. The control unit 43 of the AAA5 analyzes the data contained in the message shown in FIG. 13, and it generates the table of FIG. 36. MS ID255 is an identifier of the MS. Here, assume that the identifier of the MS7, for which accounting is being performed, is MS_ID1. SR ID256 is an identifier of the SI. Assume that the identifier of the SI for which accounting is being performed is SR_ID2. BS ID257 is an identifier of the BS3 to which the MS7 connects. Here, assume that the identifier of the BS3 is BS_ID1. The Active Time 258 is the effective connect time.

Here, assume that the MS7 performs the communication shown in FIG. 35. The Active Time 258 is the effective connect time Tac6 of the period 263. The Accounting Grade 259 is the accounting grade computed from the actual communication quality. The control unit 43 compares the measured value 126 of the communication QoS contained in the message with the communication quality 251 recorded in the memory unit 42, and it computes the accounting grade. The control unit 43 records Grade 0 in 259 as the accounting grade of a period 263.

The control unit 43 performs accounting using the Accounting Grade 259 computed from the actual communication QoS. The control unit 43 calculates Tac6*F (Grade 0) as the accounting amount. F(x) is a function of unit time accounting amount relative to an argument of accounting grade x. The providing company requests the accounting amount calculated by the AAA5 from the user of the MS7.

This example is an example wherein the AAA5 computes the accounting grade from measurement data for the communication quality contained in the message. The BS4, PCF3 and PDSN2 may use the accounting grade computed from the measured communication quality in the message instead of the communication quality, and transmit it to the AAA5. The AAA5 may also perform accounting using the accounting grade contained in the message.

What is claimed is:

1. A wireless communication system comprising a base station which performs communication with a mobile terminal, a packet control function apparatus which performs communication with the base station by a Radio Access Network (RAN) protocol, a node apparatus which performs communication with the packet control function apparatus by a Radio Access Network (RAN) protocol, and an accounting server which is connected to this node apparatus via a network, the wireless communication system exchanging a message via a wireless network between said base station and said mobile terminal to establish said connection with said granted communication quality wherein a connection is made with the mobile terminal with a granted communication quality, and accounting is performed corresponding to the quality of said communication with the mobile terminal, wherein:
    at least one of said base station, packet control function apparatus and node apparatus which performs communication by said Radio Access Network (RAN) protocol, measures the communication quality supplied to the mobile terminal based on said Radio Access Network (RAN) protocol, notifies said measured communication quality to said accounting server only when said measured communication quality is different from the communication quality being charged in the accounting system at that time, and
    the accounting server performs account processing using said notified communication quality.

2. The wireless communication system according to claim 1, wherein:
    at least one of said base station, packet control function apparatus and node apparatus which performs communication by said RAN protocol, computes the time average of the measured communication quality, and assumes that this average communication quality is the measured communication quality.

3. The wireless communication system according to claim 1, wherein:
    at least one of said base station, packet control function apparatus and node apparatus which performs communication by said RAN protocol, stores the communication quality granted during the connection in a memory unit, and transmits a message when the measured communication quality is different from the granted communication quality stored in said memory unit, and
    the accounting server updates the accounting system using this message.

4. The wireless communication system according to claim 3, wherein, when at least one of said base station, packet control function apparatus and node apparatus which performs communication by said RAN protocol transmits said message notifying that the accounting system corresponding to said measured communication quality is different from the accounting system corresponding to the granted communication quality stored in said memory unit, it stores said measured communication quality in said memory unit as a provided communication quality, and determines whether or not to transmit the next message by comparing the accounting system corresponding to said measured communication quality with the accounting system corresponding to the provided communication quality stored in said memory unit.

5. The wireless communication system according to claim 1, wherein said communication quality comprises at least one of a transmission rate, data loss rate and a transmission latency.

6. The wireless communication system according to claim 1, wherein said base station performs measurement of said communication quality based on control data which shows the state of a radio transmission path between said base station and said mobile station.

7. The wireless communication system according to claim 6, wherein said base station uses at least one of a Carrier to Interference Ratio (CIR) and uplink data rate to said base station as control data showing the state of the radio transmission path between said base station and said mobile station.

8. An accounting control method in a wireless communication system comprising a base station which performs communication with a mobile terminal, a packet control function apparatus which performs communication with the base station by a Radio Access Network (RAN) protocol, a node apparatus which performs communication with the packet control function apparatus by a Radio Access Network (RAN) protocol, and an accounting server which is connected to this node apparatus via a network and performs accounting corresponding to the communication quality, said method comprising:
    setting up a connection of granted communication quality with the base station, and in at least one of said base station, packet control function apparatus and node apparatus which performs communication by said Radio Access Network (RAN) protocol, and exchanging a message via a wireless network between said base station and said mobile terminal to establish said connection with said granted communication quality;
    measuring the communication quality supplied to the base station and based on said Radio Access Network (RAN) protocol;
    determining whether or not the measured communication quality is different from the communication quality being charged in the accounting system at that time;
    notifying said measured communication quality to said accounting server only when the measured communication quality is different from the communication quality being charged in the accounting system at that time; and
    performing account processing in said accounting server using said notified communication quality.

9. The accounting control method according to claim 8, said method comprising, in at least one of said base station, packet control function apparatus and node apparatus which performs communication by said RAN protocol, computing the time average of the measured communication quality, and taking this average communication quality as the measured communication quality.

10. The accounting control method according to claim 8, said method comprising, in at least one of said base station, packet control function apparatus and node apparatus which performs communication by said RAN protocol, storing the granted communication quality for the connection in the memory unit, and transmitting a message when the measured communication quality is different from the granted communication quality stored in said memory unit, and in said accounting server, updating the accounting system using said message.

11. The accounting control method according to claim 10, comprising, in at least one of said base station packet control function apparatus and node apparatus which performs communication by said RAN protocol, and transmits said message notifying that the accounting system corresponding to said measured communication quality is different from the accounting system corresponding to the communication quality stored in said memory unit, storing said measured communication quality in said memory unit as a provided communication quality, and determining whether or not to transmit the next message by comparing the accounting system corresponding to said measured communication quality with the accounting system corresponding to the provided communication quality stored in said memory unit.

12. The accounting control method according to claim 8, wherein said communication quality comprises at least one of a transmission rate, data loss rate and transmission latency.

13. The accounting control method according to claim 8, wherein in said base station, said communication quality is measured based on control data showing the state of a radio transmission path between the base station and said mobile station.

14. The accounting control method according to claim 13, wherein said base station uses at least one of a Carrier to Interference Ratio (CIR) and uplink data rate to said base station as control data showing the state of the radio transmission path between said base station and said mobile station.

15. A base station which performs radio communication with a mobile station in a wireless communication system which sets up a connection having a granted communication quality with said mobile station via exchanging a message via a wireless network between a base station and said mobile terminal to establish said connection with said granted communication quality, and performs accounting based on the granted communication quality during said connection and the communication quality measured during the communication, said base station comprising:

a control unit which measures the communication quality supplied to the base station based on said Radio Access Network (RAN) protocol, and a notification unit which notifies the measured communication quality to an accounting server which controls accounting only when the measured communication quality is different from the communication quality being charged in the accounting system at that time.

16. The base station according to claim 15, wherein:

said control unit computes the time average of the measured communication quality, and assumes that this average communication quality is the measured communication quality.

17. The base station according to claim 15, wherein:

said control unit stores the communication quality granted during the connection in a memory unit, and transmits a message when the measured communication quality is different from the granted communication quality stored in said memory unit.

18. The base station according to claim 15, wherein said control unit measures at least one of a transmission rate, data loss rate and a transmission latency as said communications quality.

19. The base station according to claim 15, wherein said control unit performs measurement of said communication quality based on control data which shows the state of a radio transmission path between said base station and said mobile station.

20. The base station according to claim 19, wherein said control unit uses at least one of a Carrier to Interference Ratio (CIR) and uplink data rate to said base station as control data showing the state of the radio transmission path between said base station and said mobile station.

* * * * *